(12) United States Patent
Berg et al.

(10) Patent No.: US 12,442,014 B2
(45) Date of Patent: Oct. 14, 2025

(54) OOMYCETE RESISTANCE IN CUCUMBER AND TOMATO

(71) Applicant: NUNHEMS B.V., Nunhem (NL)

(72) Inventors: Jeroen Anne Berg, Wageningen (NL); Hendrik Jacob Schouten, Wageningen (NL); Frank Beenders, Nunhem (NL); Freddy Hermans, Nunhem (NL); Wim Vriezen, Nunhem (NL)

(73) Assignee: NUNHEMS B.V., Nunhem (NL)

( * ) Notice: Subject to any disclaimer, the term of this patent is extended or adjusted under 35 U.S.C. 154(b) by 688 days.

(21) Appl. No.: 17/613,413

(22) PCT Filed: May 18, 2020

(86) PCT No.: PCT/EP2020/063808
§ 371 (c)(1),
(2) Date: Nov. 22, 2021

(87) PCT Pub. No.: WO2020/239495
PCT Pub. Date: Dec. 3, 2020

(65) Prior Publication Data
US 2022/0243219 A1  Aug. 4, 2022

(30) Foreign Application Priority Data

May 24, 2019  (EP) .................................... 19176545

(51) Int. Cl.
*C12N 15/82*  (2006.01)
*C07K 14/415*  (2006.01)

(52) U.S. Cl.
CPC ........ *C12N 15/8282* (2013.01); *C07K 14/415* (2013.01)

(58) Field of Classification Search
None
See application file for complete search history.

(56) References Cited

FOREIGN PATENT DOCUMENTS

| WO | 2008/092505 A1 | 8/2008 | |
|---|---|---|---|
| WO | WO-2008142036 A2 * | 11/2008 | ......... C12N 15/8271 |
| WO | 2009/129314 A2 | 10/2009 | |
| WO | 2011/050296 A1 | 4/2011 | |
| WO | 2013/148559 A1 | 10/2013 | |

OTHER PUBLICATIONS

Sonawala, et al. Plant Science. 277:79-88. (Year: 2018).*
Li et al. Plant Disease. 102:1240-1245. (Year: 2018).*
"Sequence 615 from Patent WO2008142036", Database EPO Proteins [Online], retrieved from EBI accession No. GM965283, XP002793181, Dec. 17, 2008, 1 page.
"Stress tolerant transgenic plant related sequence, SEQ ID 611", Database Geneseq [Online], Database accession No. ATT20336, XP002793180, Jan. 19, 2012, 1 page.
"CucCAP: Leveraging applied genomics to improve diseases resistance in cucurbit crops", Second Annual CucCAP Team Meeting, Mar. 27-28, 2017, pp. 1-73.
Berg, et al., "A transposable element insertion in the susceptibility gene CsaMLO8 results in hypocotyl resistance to powdery mildew in cucumber", BMC Plant Biology, vol. 15, Issue 1, Article No. 243, Oct. 9, 2015, pp. 1-17.
Chandrasekaran, et al., "Development of broad virus resistance in non-transgenic cucumber using CRISPR/Cas9 technology", Molecular Plant Pathology, vol. 17, Issue 7, Jan. 25, 2016, pp. 1140-1153.
European Search Report for EP Patent Application No. 19176545.2, Issued on Aug. 5, 2019, 4 pages.
Henikoff, et al., "Amino acid substitution matrices from protein blocks", Proceedings of the National Academy of Sciences of the United States of America, vol. 89, Issue 22, Nov. 15, 1992, pp. 10915-10919.
Huang, et al., "The genome of the cucumber, Cucumis sativus L.", Nature Genetics, vol. 41, Issue 12, Nov. 1, 2009, pp. 1275-1281.
Inga Meadows., "2018 Fungicide Spray Guide for Tomato in North Carolina", Department of Entomology & Plant Pathology, North Carolina State University, 2018, 2 pages.
International Search Report for PCT Patent Application No. PCT/EP2020/063808, Issued on Jul. 21, 2020, 6 pages.
Jeroen A. Berg, "Cucumber mildew resistance: Identification of cucumber genes involved in susceptibility and resistance to powdery and downy mildew", PhD Thesis, Wageningen University, Oct. 11, 2019, 260 pages.
Li, et al., "QTL Analysis for Downy Mildew Resistance in Cucumber Inbred Line PI 197088", Plant Disease, vol. 102, Issue 7, Apr. 27, 2018, pp. 1240-1245.
McCallum, et al., "Targeting Induced LocalLesions IN Genomes (TILLING) for plant functional genomics", Plant Physiology, vol. 123, Issue 2, Jun. 2000, pp. 439-442.
Michael J. Thomson, "High-Throughput SNP Genotyping to Accelerate Crop Improvement", Plant Breeding and Biotechnology, vol. 2, Issue 3, Sep. 30, 2014, pp. 195-212.
Pan, et al., "Staygreen (CsSGR) is a candidate for the anthracnose (Colletotrichum orbiculare) resistance locus cla in Gy14 cucumber", Theoretical and Applied Genetics, vol. 131, Apr. 21, 2018, pp. 1577-1587.
Rodriguez-Leal, et al., "Engineering Quantitative Trait Variation for Crop Improvement by Genome Editing", Cell, vol. 171, Issue 2, Oct. 5, 2017, pp. 470-480.
Taler, et al., "Plant eR Genes That Encode Photorespiratory Enzymes Confer Resistance against Disease", Plant Cell, vol. 16, Issue 1, Jan. 1, 2004, pp. 172-184.
Ueta, et al., "Rapid breeding of parthenocarpic tomato plants using CRISPR/Cas9", Scientific Report, vol. 7, Issue 1, Article No. 507, Mar. 30, 2017, pp. 1-8.
Wang, et al., "Analysis of Genes Underlying Soybean Quantitative Trait Loci Conferring Partial Resistance to Phytophthora sojae", The Plant Genome, vol. 3, Issue 1, Jul. 1, 2010, pp. 23-40.

(Continued)

*Primary Examiner* — Shubo Zhou
*Assistant Examiner* — David R Byrnes
(74) *Attorney, Agent, or Firm* — ArentFox Schiff LLP

(57) ABSTRACT

The present invention is directed to cucumber and tomato plants comprising reduced susceptibility to pathogenic oomycetes due to the modification of a susceptibility gene of the plant.

Figure 2:
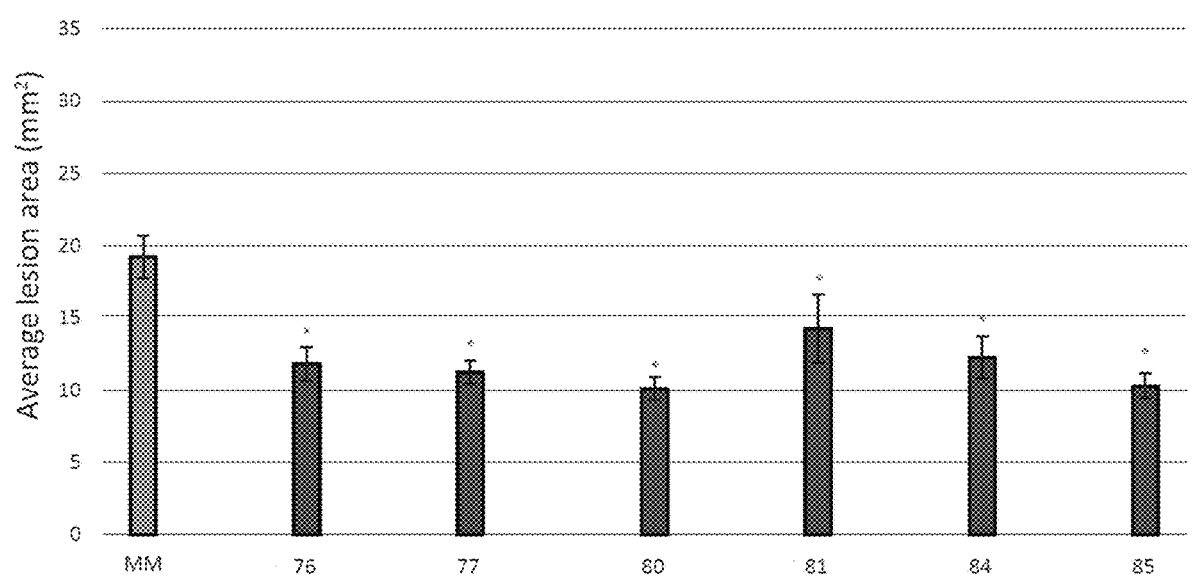

12 Claims, 4 Drawing Sheets
Specification includes a Sequence Listing.

(56) References Cited

OTHER PUBLICATIONS

Wang, et al., "*Arabidopsis* Amino Acid PERMEASE1 Contributes to Salt Stress-Induced Proline Uptake from Exogenous Sources", Frontiers in Plant Science, vol. 8, Article No. 2182, Dec. 2017, pp. 1-12.

Wang, et al., "QTL mapping of downy and powdery mildew resistances in PI 197088 cucumber with genotyping-by-sequencing in RIL population", Theoretical and Applied Genetics, vol. 131, Nov. 20, 2017, pp. 597-611.

Yoshioka, et al., "Identification of quantitative trait loci for downy mildew resistance in cucumber (Cucumis sativus L.)", Euphytica, vol. 198, Issue 2, Mar. 20, 2014, pp. 265-276.

Zhang, et al., "Tissue Culture-Induced Heritable Genomic Variation in Rice, and Their Phenotypic Implications", PLoS One, vol. 9, Issue 5, May 7, 2014, pp. 1-10.

\* cited by examiner

Figure 1

```
                                                        ┌─────────────────────┐
                                                        │   Aa_trans domain   │
                                                        └──────────┬──────────┘
CUC2A       --------MAVLPLN------DSSSFDDDGHPKRTGTI↓WTASAHIITTVIGSGVLSLAWAI
CUC2B       --------MAVLPVN------DSASFDDDGCPKRTGTFWTASAHIITAVIGSGVLSLAWAI
TOM5A       --------MADKPHQVFEVYGESKCFDDDGRIKRTGSVWTASAHIITAVIGSGVLSLAWAT
TOM5B       MGDSTNFAAKHPVSI--NITESKLFDDDGRIKRSGSVWTASAHIITAVIGSGVLSLAWAV
                    *    *   .   :*  ****  *:*:*:,*********:************

CUC2A       AQLGWIVGPSVMLLFAFIGHYTSCLLADCYRSGDPLTGKRNPTYMHAVRSLLGEAHMVAC
CUC2B       AQLGWIAGPSVMILFAFIGYYTSCLLADCYRSGDPVNGKRNPTYMHAVRSLLGETHMVAC
TOM5A       AQLGWVAGPTVLLLFSFVTYYTSALLSDCYRTGDPVTGKRNYTYMDAVRANLGGFQVKIC
TOM5B       AQLGWIAGPIVMLLFSFVTYYTSSLLSDCYRSGDPLFGKRNYTYMDVVQANLSGLQVKIC
            *****:.** *::**:*: :***.**:****:***: **** *** .*.: *.  :: *

CUC2A       GVMQNINLMGITIGYQIASSISMMAIKRSNCFHSSGGKNPCHISSNPFMMSFG↓VEIILS
CUC2B       GIMQYINLIGITIGYTIASSISMMAIKRSNCFHSSGGKNPCHISSNPFMLSFGIVEIILS
TOM5A       GVIQYANLFGVAIGYTIASSISMVAVNRSNCFHKQGHHAACNVSSTPYMIMFGVMEIIFS
TOM5B       GWIQYVNLFGVAIGYTIASSISLMAVKRSDCFHKHGHKAPCLQPNTPYMIIFGVIEIIFS
            * :*  ** **:***  ****** :*:.:**:* :  :*   ...*:*: **::***:*

CUC2A       QIPNFDQIWWLSTLAAIMSFTYSFIGLSLGIAKVAESGRFKGTISGVSVGS-ISKTEKKL
CUC2B       QIPNFDQIWWLSIVAAIMSFTYSSIGLTLGIAKVAESGSFKGTLSGITVGT-VTQSEKIW
TOM5A       QIPDFDQISWLSIVAAVMSFTYSTIGLGLGVAQVAETGKIEGSLTGISIGTEVTEMQKIW
TOM5B       QIPDFDQIWWLSIVAAVMSFTYSTIGLGLGIAHVAETGKIGGSLTGVSIGT-VTEMQKVW
            ***.****  *** ;** ****** ***  ***.::***. : *::::::*:  ::: :*

CUC2A       RSFQALGDIAFAYSFAIVLIEIQDTIKCPPSEAKTMKKATRFSIILTTLFYILCGCSGYA
CUC2B       RSFQALGDIAFASSFAIVLIEVQDTIRSPPSETKTMKKAAGFSITLTTIFYMLCGCMGYA
TOM5A       RSFQALGAIAFAYSYSLILIEIQDTLKSPPAEAKTMKRATLISVAVTTVFYMLCGCFGYA
TOM5B       RTFQALGAIAFAYSYSLILIEIQDTIKSPPSEAKTMKNATIISVSVTTVFYMLCGCFGY↓A
            *:***** ****  *::::***:***:..**:*:****..:.*.:: : **:**** ***

CUC2A       AFGNNAPGNLLTGFGFYNPFWLIDIANVAIVVHLVGAYQVLSQPIFAFVEKKAAQAWPES
CUC2B       AFGNTAPGNLLTGFGFYNPFWLLDIANVSIVVHLVGAYQVFSQPVYAFVEKKVVQTWPDT
TOM5A       AFGDQSPGNLLTGFGFYNPYWLLDIANIAIVVHLVGAYQVYCQPLFAFVEKTAAEWYPDS
TOM5B       AFGDHAPDNLLTGFGFY↓↓WLLDIANIAIFVHLVGAYQVYCQPLFAFIEKTAAEWYPNS
            ***: :*.*********.:*::*****.:* ,*********  .**::**:**..: :*:

CUC2A       PFITKEYKLSISSSH-SYNINLFRLIWRSLFVCFTTTIAMLIPFFNDIVGIIGALQFWPL
CUC2B       PFFTKEYKLSLFSSRSSYNVNLFRLVWRTLFVCFTTIVAMLLPFFNDIVGFIGALQFWPM
TOM5A       KIITKEIDVPIPGFK-PFKLNLFRLVWRTIFVIITTVISMLMPFFNDVVGILGAFGFWPL
TOM5B       KIITKNISVPIPGFK-SYNIYLFRLVWRTIFVIISTIISMLLPFFSDIVGILGAFGFWPL
             ::*:   ::  .. . ..:::  ****:**:*: **  :::**:*:**:***::: ***:

CUC2A       TVYFPIQMYIVQKKIRQWSVKWICVQTMSMGCLLVSLAAAVGSISGVMLDLKVYKPFKTM
CUC2B       TVYFPVQMYVVQKKVPKWSVKWICVQTMSMGCLLISLAAAVGSISGIMLDLNVYKPFKTM
TOM5A       TVYFPVEMYIVQKRITKWSARWICLQILSGACLVISIAAAAGSFAGVVSDLKVYRPFQS-
TOM5B       TVYY↓EIYIVQKKIPKWSRKWFGLQILSVTCLIVSIAAAVGSFAGVVSDLKVYKPFKFT
            ***:**:::*:***.:  **  **   *:  *:  **  *:*::*:: **:**:**::

┌─────────────────────┐
                                              │   Aa_trans domain   │
                                              └─────────────────────┘
CUC2A       Y
CUC2B       Y
TOM5A       -
TOM5B       -
```

OOMYCETE RESISTANCE IN CUCUMBER AND TOMATO

CROSS-REFERENCE TO RELATED APPLICATIONS

This application is a National Stage Entry of PCT/EP2020/063808, filed May 18, 2020, which claims priority to EP application No. 19176545.2, filed May 24, 2019, the disclosures of each of which are hereby incorporated by reference in their entirety.

FIELD

The present invention is directed to plants and plant parts of the species *Cucumis sativus* comprising enhanced resistance against downy mildew caused by the Oomycete *Pseudoperonospora cubensis* and to plants and plant parts of the species *Solanum lycopersicum* comprising enhanced resistance against late blight caused by the Oomycete *Phytophthora infestans*.

BACKGROUND

Downy mildew of Cucurbits is caused by the Oomycete pathogen *Pseudoperonospora cubensis* (Berk. et Curt.) and is one of the most destructive diseases on *Cucurbitaceae*. *P. cubensis* is an obligate pathogen, which is spread through dispersal of sporangia by wind and rain. Symptoms first appear on adaxial surfaces of leaves as light green or yellow lesions restricted by the leaf veins. Later, the lesions become chlorotic and necrotic, which causes a severe reduction in photosynthesis and eventually the leaf dies. Light greyish-blue sporangiophores develop on the infected leaves. Each sporangiophore terminates with a sporangium, in which zoospores are produced, which can enter leaf tissue through stomata and establish infection. Plants which are severely infected produce small and misshapen fruits, which are not marketable. Late season infection results in fruits having a reduced sugar content, reducing fruit prices. Disease symptoms become visible about 4 to 12 days after infection.

Control of downy mildew is primarily through use of resistant varieties and/or fungicide spray programs. Fungicides are most effective when they are sprayed prior to the first symptoms appearing. In cucumber a single recessive gene named dm-1, derived from the Indian accession PI197087, has been used to develop downy mildew resistant cucumber varieties. Recently a missense mutation in the gene CsSGR (Staygreen gene) was found to be causal for the dm-1 resistance. As new strains of *P. cubensis* developed since 2004, which have partially overcome the dm-1 resistance, new sources of downy mildew resistance were sought after. Chen and Wang (2008, Plant Pathology Bulletin 17, 1, p76) found the accession PI197088 to contain high resistance against downy mildew and powdery mildew. Several groups discovered that downy mildew resistance in PI197088 is polygenic, as multiple QTLs (Quantitative trait loci) contribute to the resistance. However, different groups reached different conclusions regarding the number and chromosomal locations of QTLs which contribute to the overall resistance of PI197088.

Yoshioka et al. (Euphytica, 2014, 198: 265-276) mapped seven QTLs for downy mildew resistance from PI197088 on chromosomes 1, 3 and 5.

Li et al. (Plant Dis. 2017, 102:1-6) mapped 5 QTLs for downy mildew resistance from PI197088 on chromosomes 1, 3, 4 and 5.

Wang et al. (Theor Appl Genetic 2018, 131: 597-611) identified 11 QTLs for downy mildew resistance from PI197088 on chromosomes 1 to 6.

WO200912314 describes a QTL for downy mildew resistance from PI197088 on chromosome 5.

WO2011050296 describes QTLs for downy mildew resistance from PI197088 on chromosomes 2, 4 and 5.

In melon resistance to downy mildew was found to be present in PI124111 and PI124112. The resistance in PI124111 was attributed to a 45kD protein present in the resistant line, but absent in the susceptible line, and two aminotransferase encoding genes At1 and At2 were identified, which were responsible for the downy mildew resistance (Taler et al. 2004, Plant Cell 16: 172-184).

Apart from the problem that breeding for quantitative resistance requires the combination of multiple QTLs, using wild accessions or landraces in breeding for resistance poses the additional problem that large chromosome regions are introgressed into the cultivated material, thereby introducing undesirable traits in the form of what is referred to as linkage drag. Knowing causal genes, underlying QTLs, would enable the direct modification of those genes in elite, cultivated lines and would also overcome the problem of linkage drag. In addition, while introgression is species limited, knowledge of the resistance underlying genes enables identification of the orthologs in other species and modification of those orthologs to generate downy mildew resistance.

There is, thus, a need to identify genes which, when modified in cultivated plants, enhance resistance to oomycete pathogens such as downy mildew and late blight.

FIGURES

FIG. 1—alignment of cucumber CsAAP2A (abbreviated CUC2A; SEQ ID NO: 1) and CsAAP2B (abbreviated CUC2B; SEQ ID NO: 2) proteins and tomato SlAAP5A (abbreviated TOM5A; SEQ ID NO: 3) and SlAAP5B (abbreviated TOM5B; SEQ ID NO: 4) proteins. The small arrows indicate the position of mutants described herein, resulting in a truncated protein compared to the wild type protein, lacking the amino acids following the arrow. The amino acids highlighted in bold for TOM5A (SlAAP5A) are missing in the mutant slaap5a allele present in lines 80 and 81.

FIG. 2—Average lesion area in tomato lines (line 76, 77, 80, 81, 84, 85) comprising mutations in SlAAP5B and SlAAP5A alleles and infected with *P. infestans*. MM refers to the susceptible control variety Moneymaker.

Figure 3:
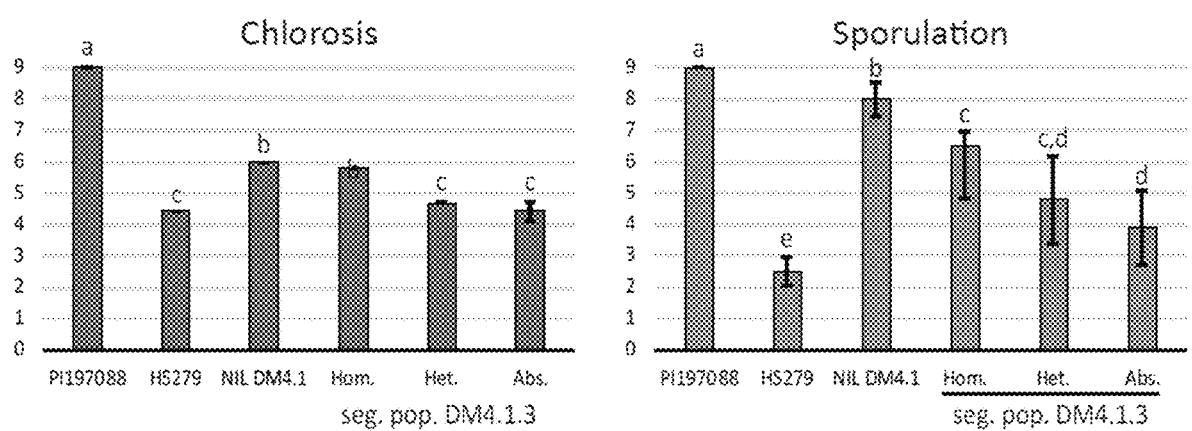

FIG. 3—Average yellowing (chlorosis) and average sporulation symptoms on different cucumber genotypes following *P. cubensis* inoculation: PI197088, HS279, NIL DM4.1, and a segregating population of Near Isogenic Lines comprising QTL 4.1.3 in homozygous form (Hom.), heterozygous form (Het.) or lacking the QTL (Abs.). The scale is 1 (susceptible) to 9 (resistant).

Figure 4:
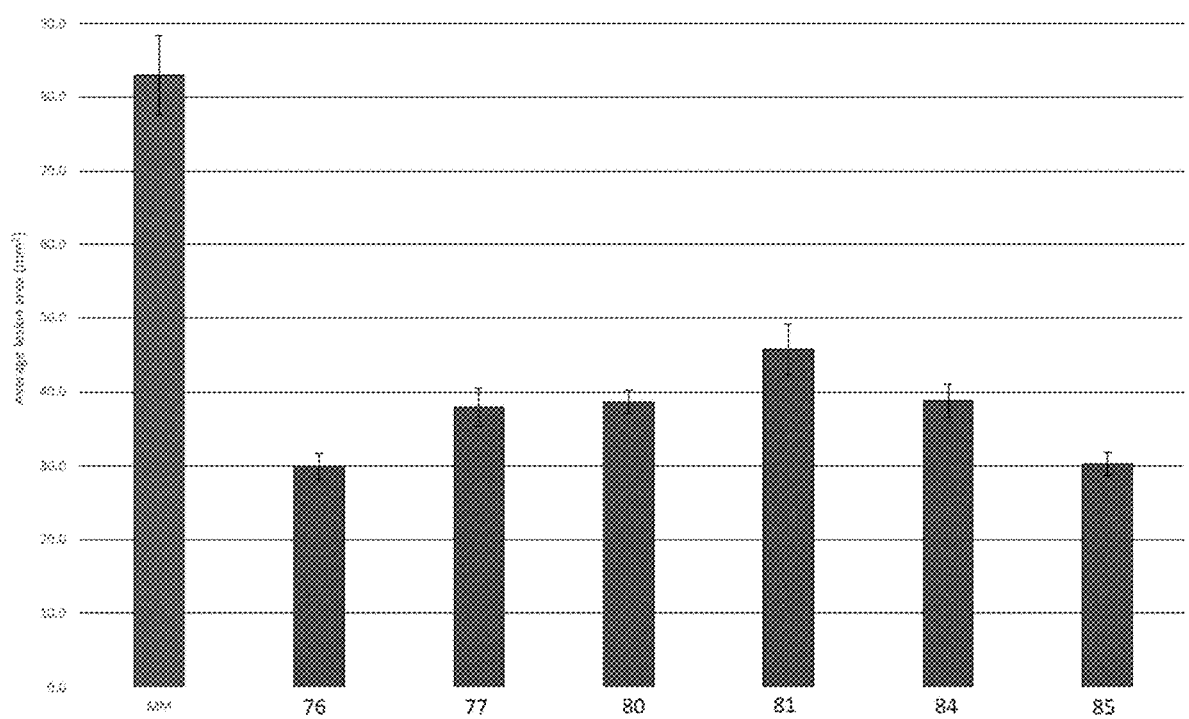

FIG. 4—Average lesion area in tomato lines (line 76, 77, 80, 81, 84, 85) comprising mutations in SlAAP5B and SlAAP5A alleles and infected with *P. infestans*. MM refers to the susceptible control variety Moneymaker.

GENERAL DEFINITIONS

The verb "to comprise" and its conjugations is used in its non-limiting sense to mean that items following the word are included, but items not specifically mentioned are not excluded. In addition, reference to an element by the indefinite article "a" or "an" does not exclude the possibility that more than one of the element is present, unless the context clearly requires that there be one and only one of the elements. The indefinite article "a" or "an" thus usually means "at least one", e.g. "a plant" refers also to several cells, plants, etc. Similarly, "a fruit" or "a plant" also refers to a plurality of fruits and plants.

A "plant line" or "breeding line" refers to a plant and its progeny. As used herein, the term "inbred line" refers to a plant line which has been repeatedly selfed, as a result of this selfing, plants of an inbred line are nearly identical to each other in genotype and phenotype.

As used herein, the term "mutant allele of a gene" refers to a mutant allele of a gene, said mutant allele either encodes a protein which, compared to the protein encoded by the wild type allele of the gene, comprises one or more amino acids replaced, deleted or inserted, whereby the mutant allele produces a mutant protein which has a "reduced-function" or "loss-of-function", or said mutant allele of the gene has a reduced gene expression or even no expression compared to the gene expression of the wild type (non-mutated) allele of the gene.

"Susceptibility gene" or "S-gene" of a plant refers to an endogenous, dominant gene of a plant, which plays a role in disease symptom development following pathogen infection. Consequently, when such a gene is mutated, the susceptibility of the plant is reduced (or, in other words, the resistance is increased) and less symptoms develop at least when the mutated recessive allele is in homozygous form compared to the plant comprising the wild type allele of the S-gene.

As used herein, "resistance against *Pseudoperonospora cubensis*" or "resistance against downy mildew of cucumber" refers to a plant line or variety comprising (statistically significant) reduced disease symptoms after infection or inoculation with *P. cubensis* compared to a susceptible control plant line or variety. "Resistance against *P. cubensis*" encompasses also in one aspect "partial resistance against *P. cubensis*" or "reduced susceptibility to *P. cubensis*", whereby e.g. at least leaf yellowing (chlorosis) is significantly less in the partial resistant/less susceptible line or variety compared to a susceptible control plant line or variety and/or whereby e.g. at least sporulation of *P. cubensis* is significantly reduced in the partial resistant/less susceptible line or variety compared to a susceptible control plant line or variety. A disease assays to measure resistance against *P. cubensis* is described in the Examples.

As used herein, "resistance against *Phytophthora infestans*" or "resistance against late blight of tomato" refers to a plant line or variety comprising (statistically significant) reduced symptoms after infection or inoculation with *P. infestans* compared to a susceptible control plant line or variety. "Resistance against *P. infestans*" encompasses also in one aspect "partial resistance against *P. infestans*" or "reduced susceptibility to *P. infestans*", whereby at least average lesion area is significantly less in the partial resistant/less susceptible line or variety compared to a susceptible control plant line or variety. A disease assays to measure resistance against *P. infestans* is described in the Examples.

As used herein, the term "plant" includes the whole plant or any parts or derivatives thereof, preferably having the same genetic makeup as the plant from which it is obtained, such as plant organs (e.g. harvested or non-harvested fruits, leaves, etc.), plant cells, plant protoplasts, plant cell- or tissue- cultures from which whole plants can be regenerated, plant calli, plant cell clumps, plant transplants, seeds from which the plant can be grown and seeds produced by the plant, seedlings, plant cells that are intact in plants, plant clones or micropropagations, or parts of plants, such as plant cuttings, embryos, pollen, ovules, fruits (e.g. harvested tissues or organs), flowers, leaves, clonally propagated plants, roots, stems, root tips, grafts (scions and/or root stocks) and the like. Also any developmental stage is included, such as seedlings, cuttings prior or after rooting, etc. As used herein, the term plant includes plant and plant parts comprising one or more of the mutant alleles of the invention.

In one aspect, the term plant part refers to plant cells, or plant tissues or plant organs that comprise one or more of the mutant alleles of the invention. In one aspect a plant part can grow into a plant and/or live on photosynthesis (i.e. synthesizing carbohydrate and protein from the inorganic substance, such as water, carbon dioxide and mineral salt). In another aspect, a plant part cannot grow into a plant and/or live on photosynthesis (i.e. synthesizing carbohydrate and protein from the inorganic substance, such as water, carbon dioxide and mineral salt). Thus, a plant part can be propagating or non-propagating.

As used herein, the term "variety" or "cultivar" or "plant variety" means a plant grouping within a single botanical taxon of the lowest known rank, which (irrespective of whether the conditions for the recognition of plant breeder's rights are fulfilled or not) can be defined on the basis of the expression of characteristics that result from a certain genotype or a combination of genotypes, can be distinguished from any other group of plants by the expression of at least one of those characteristics, and can be regarded as an entity, because it can be multiplied without any change. Therefore, the term "plant variety" cannot be used to denote a group of plants, even if they are of the same kind, if they are all characterized by the presence of one locus or gene or two loci or genes, but which can otherwise differ from one another enormously as regards the other loci or genes.

The term "allele(s)" means any of one or more alternative forms of a gene at a particular locus, all of which alleles relate to one trait or characteristic at a specific locus. In a diploid cell of an organism, alleles of a given gene are located at a specific location, or locus (loci plural) on a chromosome. One allele is present on each chromosome of the pair of homologous chromosomes. A diploid plant species may comprise a large number of different alleles at a particular locus. These may be identical alleles of the gene (homozygous) or two different alleles (heterozygous).

The term "locus" (loci plural) means a specific place or places or a site on a chromosome where for example a gene or genetic marker is found.

"Diploid plant" refers to a plant, vegetative plant part(s), or seed from which a diploid plant can be grown, having two sets of chromosome, designated herein as 2n.

"Vegetative propagation" refers to propagation of plants from vegetative tissue, e.g. by in vitro propagation or grafting methods (using scions).

"Average" or "mean" refers herein to the arithmetic mean and both terms are used interchangeably. The term "average" or "mean" thus refers to the arithmetic mean of several measurements. The skilled person understands that the phenotype of a plant line or variety depends to some extent on growing conditions and that, therefore, arithmetic means of at least 8, 9, 10, 15, 20, 30, 40, 50 or more plants (or plant parts) are measured, preferably in randomized experimental designs with several replicates and suitable control plants grown under the same conditions in the same experiment.

"Statistically significant" or "statistically significantly" different or "significantly" different refers to a characteristic of a plant line or variety that, when compared to a suitable control (e.g. the genetic control) show a statistically significant difference in that characteristic (e.g. the p-value is less than 0.05, p<0.05, using e.g. ANOVA) from the mean of the control.

The term "nucleic acid sequence" (or nucleic acid molecule) refers to a DNA or RNA molecule in single or double stranded form, particularly a DNA encoding a protein or protein fragment according to the invention. An "isolated nucleic acid sequence" refers to a nucleic acid sequence which is no longer in the natural environment from which it was isolated, e.g. the nucleic acid sequence in a bacterial host cell or in the plant nuclear or plastid genome.

The terms "protein" or "polypeptide" are used interchangeably and refer to molecules consisting of a chain of amino acids, without reference to a specific mode of action, size, 3-dimensional structure or origin. A "fragment" or "portion" of a protein may thus still be referred to as a "protein". An "isolated protein" is used to refer to a protein which is no longer in its natural environment, for example in vitro or in a recombinant bacterial or plant host cell.

The term "gene" means a DNA sequence comprising a region (transcribed region), which is transcribed into an RNA molecule (e.g. an mRNA or an RNAi molecule) in a cell, operably linked to suitable regulatory regions (e.g. a promoter). A gene may thus comprise several operably linked sequences, such as a promoter, a 5' leader sequence comprising e.g. sequences involved in translation initiation, a (protein) coding region (cDNA or genomic DNA) and a 3' non-translated sequence comprising e.g. transcription termination sites. A gene may be an endogenous gene (in the species of origin) or a chimeric gene (e.g. a transgene or cis-gene).

"Expression of a gene" refers to the process wherein a DNA region, which is operably linked to appropriate regulatory regions, particularly a promoter, is transcribed into an RNA.

An "active protein" or "functional protein" is a protein which has protein activity as measurable in vivo, e.g. by the phenotype conferred by the protein. A "wild type" protein is a fully functional protein, as present in the wild type plant. A "mutant protein" is herein a protein comprising one or more mutations in the nucleic acid sequence encoding the protein, whereby the mutation(s) results in (the mutant allele encoding) a "reduced-function" or "loss-of-function" protein, as e.g. measurable in vivo, e.g. by the phenotype conferred by the mutant allele (e.g. in homozygous form).

A "reduced function CsAAP2A or CsAAP2B protein" or "reduced activity CsAAP2A or CsAAP2B protein" refers to a mutant protein which has a reduced activity and confers P. cubensis resistance or at least partial resistance in a cucumber plant comprising such reduced function protein, at least when the allele encoding the mutant protein is present in homozygous form compared to a cucumber plant comprising the wild type allele in homozygous form. Likewise a loss-of-function CsAAP2A or CsAAP2B protein refers to a protein which has no activity and confers *P. cubensis* resistance or at least partial resistance in a cucumber plant comprising such loss-of-function protein, at least when the allele encoding the mutant protein is present in homozygous form compared to a cucumber plant comprising the wild type allele in homozygous form.

A "reduced function SlAAP5A or SlAAP5B protein" or "reduced activity SlAAP5A or SlAAP5B protein" refers to a mutant protein which has a reduced activity and confers *P. infestans* resistance or at least partial resistance in a tomato plant comprising such reduced function protein, at least when the allele encoding the mutant protein is present in homozygous form compared to a tomato plant comprising the wild type allele in homozygous form. Likewise a loss-of-function SlAAP5A or SlAAP5B protein refers to a protein which has no activity and confers *P. infestans* resistance or at least partial resistance in a tomato plant comprising such loss-of-function protein, at least when the allele encoding the mutant protein is present in homozygous form compared to a tomato plant comprising the wild type allele in homozygous form.

"Induced mutant" alleles are mutant alleles in which the mutation(s) is/are/have been induced by human intervention, e.g. by mutagenesis via physical or chemical mutagenesis methods or via e.g. tissue culture (as described in e.g. Zhang et al, Plos 9(5) e96879), including also genome editing techniques. Induced mutant alleles are thus not natural mutant alleles.

"Natural mutant" alleles are mutant alleles in which the mutation(s) have evolved in wild plants or wild relatives of a species or landraces. Such natural mutant alleles can be introgressed into cultivated plants by crossing and selection. For example an allele comprising a transposable element (TE) insertion is a natural mutant allele.

A "mutation" in a nucleic acid molecule coding for a protein is a change of one or more nucleotides compared to the wild type sequence, e.g. by replacement, deletion or insertion of one or more nucleotides. Examples of such a mutation are point mutation, nonsense mutation, missense mutation, splice-site mutation, frame shift mutation or a mutation in a regulatory sequence.

A "point mutation" is the replacement of a single nucleotide, or the insertion or deletion of a single nucleotide.

A "nonsense" mutation is a (point) mutation in a nucleic acid sequence encoding a protein, whereby a codon is changed into a stop codon. This results in a premature stop codon being present in the mRNA and in a truncated protein. A truncated protein may have reduced function or loss of function.

A "missense" or non-synonymous mutation is a (point) mutation in a nucleic acid sequence encoding a protein, whereby a codon is changed to code for a different amino acid. The resulting protein may have reduced function or loss of function.

A "splice-site" mutation is a mutation in a nucleic acid sequence encoding a protein, whereby RNA splicing of the pre-mRNA is changed, resulting in an mRNA having a different nucleotide sequence and a protein having a different amino acid sequence than the wild type. The resulting protein may have reduced function or loss of function.

A "frame-shift" mutation is a mutation in a nucleic acid sequence encoding a protein by which the reading frame of the mRNA is changed, resulting in a different amino acid sequence. The resulting protein may have reduced function or loss of function.

A mutation in a regulatory sequence, e.g. in a promoter of a gene, is a change of one or more nucleotides compared to the wild type sequence, e.g. by replacement, deletion or insertion of one or more nucleotides, leading for example to reduced or no mRNA transcript of the gene being made. In one aspect a mutation in a regulatory sequence of a protein includes a lower level of wild type protein (e.g. due to a lower expression of the allele) or no wild type protein being made (no expression of the allele). Rodriguez-Leal et al., 2017, Cell 171, 470-480 describe for example mutating cis-regulatory elements to create a continuum of mutant alleles with different expression.

A "mutation" in a protein is a change of one or more amino acid residues compared to the wild type sequence, e.g. by replacement, deletion or insertion of one or more amino acid residues.

"Silencing" refers to a down-regulation or complete inhibition of gene expression of the target gene or gene family.

A "target gene" in gene silencing approaches is the gene or gene family (or one or more specific alleles of the gene) of which the endogenous gene expression is down-regulated or completely inhibited (silenced) when a chimeric silencing gene (or 'chimeric RNAi gene') is expressed and for example produces a silencing RNA transcript (e.g. a dsRNA or hairpin RNA capable of silencing the endogenous target gene expression). In mutagenesis or targeted genome editing approaches, a target gene is the endogenous gene which is to be mutated (and/or in which mutations are selected by e.g. TILLING) or edited, leading to a change in (reduction or loss of) gene expression or a change in (reduction or loss of) function of the encoded protein.

As used herein, the term "operably linked" refers to a linkage of polynucleotide elements in a functional relationship. A nucleic acid is "operably linked" when it is placed into a functional relationship with another nucleic acid sequence. For instance, a promoter, or rather a transcription regulatory sequence, is operably linked to a coding sequence if it affects the transcription of the coding sequence. Operably linked means that the DNA sequences being linked are typically contiguous and, where necessary to join two protein encoding regions, contiguous and in reading frame so as to produce a "chimeric protein". A "chimeric protein" or "hybrid protein" is a protein composed of various protein "domains" (or motifs) which is not found as such in nature but which a joined to form a functional protein, which displays the functionality of the joined domains. A chimeric protein may also be a fusion protein of two or more proteins occurring in nature.

The term "heterozygous" refers to a plant or plant cell having dissimilar pairs of alleles of a gene for any hereditary characteristic. The term "homozygous" or in "homozygous form" refers to a plant or plant cell or plant part (e.g. a fruit) having identical alleles of a gene for any hereditary characteristic, e.g. a diploid cucumber plant or plant part homozygous for the mutant AAP2A and/or AAP2B allele comprises two copies of the allele in its genome, or a diploid tomato plant or plant part homozygous for the mutant AAP5A and/or AAP5B allele comprises two copies of the allele in its genome.

It is understood that comparisons between different plant lines involves growing a number of plants of a line (e.g. at least 8 plants, preferably at least 10 plants per line) under the same conditions as the plants of one or more control plant lines (e.g. plants comprising the wild type allele or plants having the same genetics as the line it is compared with except that the wild type allele is present in homozygous form instead of the mutant allele) and the determination of statistically significant differences between the plant lines when grown under the same environmental conditions and when treated in the same way, e.g. inoculated leaves with *P. cubensis* in a cucumber disease assay or *P. infestans* in a tomato disease assay and assessing the disease symptoms after a certain number of days, e.g. when the susceptible control shows prominent symptoms.

"Stringent hybridization conditions" can be used to identify nucleotide sequences, which are substantially identical to a given nucleotide sequence. Stringent conditions are sequence dependent and will be different in different circumstances. Generally, stringent conditions are selected to be about 5° C. lower than the thermal melting point (Tm) for the specific sequences at a defined ionic strength and pH. The Tm is the temperature (under defined ionic strength and pH) at which 50% of the target sequence hybridises to a perfectly matched probe. Typically stringent conditions will be chosen in which the salt concentration is about 0.02 molar at pH 7 and the temperature is at least 60° C. Lowering the salt concentration and/or increasing the temperature increases stringency. Stringent conditions for RNA-DNA hybridisations (Northern blots using a probe of e.g. 100 nt) are for example those which include at least one wash in 0.2×SSC at 63° C. for 20 min, or equivalent conditions. Stringent conditions for DNA-DNA hybridisation (Southern blots using a probe of e.g. 100 nt) are for example those which include at least one wash (usually 2) in 0.2×SSC at a temperature of at least 50° C., usually about 55° C., for 20 min, or equivalent conditions.

"Sequence identity" and "sequence similarity" can be determined by alignment of two peptide or two nucleotide sequences using global or local alignment algorithms. Sequences may then be referred to as "substantially identical" or "essentially similar" when they are optimally aligned by for example the programs GAP or BESTFIT or the Emboss program "Needle" (using default parameters, see below) share at least a certain minimal percentage of sequence identity (as defined further below). These programs use the Needleman and Wunsch global alignment algorithm to align two sequences over their entire length, maximizing the number of matches and minimises the number of gaps. Generally, the default parameters are used, with a gap creation penalty=10 and gap extension penalty=0.5 (both for nucleotide and protein alignments). For nucleotides the default scoring matrix used is DNAFULL and for proteins the default scoring matrix is Blosum62 (Henikoff & Henikoff, 1992, PNAS 89, 10915-10919). Sequence alignments and scores for percentage sequence identity may for example be determined using computer programs, such as EMBOSS, accessible at world wide web under ebi.ac.uk/Tools/emboss/. Alternatively sequence identity may be determined by searching against databases such as FASTA, BLAST, etc., but hits should be retrieved and aligned pairwise to compare sequence identity. Two proteins or two protein domains, or two nucleic acid sequences have "substantial sequence identity" if the percentage sequence identity is at least 90%, 91%, 93%, 94%, 95%, 96%, 97%, 98% or 99% or more (as determined by Emboss "needle" using default parameters, i.e. gap creation penalty=10, gap extension penalty=0.5, using scoring matrix DNAFULL for nucleic acids an Blosum62 for proteins). Such sequences are also referred to as 'variants' herein, e.g. other allelic variants of the CsAAP2A or CsAAP2B alleles and CsAAP2A or CsAAP2B proteins than the specific nucleic acid and protein sequences disclosed herein can be identified, or other allelic variants of the SlAAP5A or SlAAP5B alleles and SlAAP5A or SlAAP5B proteins than the specific nucleic acid and protein sequences disclosed herein can be identified. Mutations in such allelic variants have the same effect on resistance to P. cubensis (in case of cucumber) or P. infestans (in case of tomato) in plants comprising such variants and cultivated Cucumis sativus or Solanum lycopersicum plants comprising mutations in such variants are embodiments of the invention.

"AAP2A allele" refers to an allele encoding an amino acid permease protein. The two letter code preceding AAP2A may be used to indicate the species comprising the allele (*Cucumis sativus*).

"AAP2B allele" refers to an allele encoding an amino acid permease protein. The two letter code preceding AAP2B may be used to indicate the species comprising the allele (*Cucumis sativus*).

"AAP5A allele" refers to an allele encoding an amino acid permease protein. The two letter code preceding AAP5A may be used to indicate the species comprising the allele (*Solanum lycospersicum*).

"AAP5B allele" refers to an allele encoding an amino acid permease protein. The two letter code preceding AAP5B may be used to indicate the species comprising the allele (*Solanum lycospersicum*).

"Wild type CsAAP2A allele" (WT) refers herein to a version of a gene encoding a fully functional cucumber AAP2A protein (wild type CsAAP2A protein). Such a sequence encoding a fully functional CsAAP2A protein of SEQ ID NO: 1 is for example the wild type CsAAP2A cDNA (mRNA) sequence depicted in SEQ ID NO: 5, or the wild type CsAAP2A genomic sequence encoding the mRNA/cDNA sequence of SEQ ID NO: 5. The protein sequence encoded by this wild type CsAAP2A mRNA is depicted in SEQ ID NO: 1. It consists of 466 amino acids. Other fully functional CsAAP2A protein-encoding alleles (i.e. variant alleles, or allelic variants) may exist in other cucumber plants or wild cucumber or wild relatives of cucumber and may comprise substantial sequence identity with SEQ ID NO: 1, i.e. at least about 90%, 91%, 93%, 94%, 95%, 96%, 97%, 98% or 99% sequence identity with SEQ ID NO: 1. Such fully functional wild type CsAAP2A proteins are herein referred to as "variants" of SEQ ID NO: 1.

"Wild type CsAAP2B allele" (WT) refers herein to a version of a gene encoding a fully functional cucumber AAP2B protein (wild type CsAAP2B protein). Such a sequence encoding a fully functional CsAAP2B protein of SEQ ID NO: 2 is for example the wild type CsAAP2B cDNA (mRNA) sequence depicted in SEQ ID NO: 6, or the wild type CsAAP2B genomic sequence encoding the mRNA/cDNA sequence of SEQ ID NO: 6. The protein sequence encoded by this wild type CsAAP2B mRNA is depicted in SEQ ID NO: 2. It consists of 467 amino acids. Other fully functional CsAAP2B protein-encoding alleles (i.e. variant alleles, or allelic variants) may exist in other cucumber plants or wild cucumber or wild relatives of cucumber and may comprise substantial sequence identity with SEQ ID NO: 2, i.e. at least about 90%, 91%, 93%, 94%, 95%, 96%, 97%, 98% or 99% sequence identity with SEQ ID NO: 2. Such fully functional wild type CsAAP2B proteins are herein referred to as "variants" of SEQ ID NO: 2.

"Wild type SlAAP5A allele" (WT) refers herein to a version of a gene encoding a fully functional tomato AAPSA protein (wild type SlAAP5A protein). Such a sequence encoding a fully functional SlAAP5A protein of SEQ ID NO: 3 is for example the wild type SlAAP5A cDNA (mRNA) sequence depicted in SEQ ID NO: 7, or the wild type S1AAP5A genomic sequence encoding the mRNA/cDNA sequence of SEQ ID NO: 7. The protein sequence encoded by this wild type SlAAP5A mRNA is depicted in SEQ ID NO: 3. It consists of 471 amino acids. Other fully functional SlAAP5A protein-encoding alleles (i.e. variant alleles, or allelic variants) may exist in other tomato plants or wild tomato plants or wild relatives of tomato and may comprise substantial sequence identity with SEQ ID NO: 3, i.e. at least about 90%, 91%, 93%, 94%, 95%, 96%, 97%, 98% or 99% sequence identity with SEQ ID NO: 3. Such fully functional wild type SlAAP5A proteins are herein referred to as "variants" of SEQ ID NO: 3.

"Wild type SlAAP5B allele" (WT) refers herein to a version of a gene encoding a fully functional tomato AAPSB protein (wild type SlAAP5B protein). Such a sequence encoding a fully functional SlAAP5B protein of SEQ ID NO: 4 is for example the wild type S1AAP5B cDNA (mRNA) sequence depicted in SEQ ID NO: 8, or the wild type SlAAP5B genomic sequence encoding the mRNA/cDNA sequence of SEQ ID NO: 8. The protein sequence encoded by this wild type SlAAP5B mRNA is depicted in SEQ ID NO: 4. It consists of 476 amino acids. Other fully functional SlAAP5B protein-encoding alleles (i.e. variant alleles, or allelic variants) may exist in other tomato plants or wild tomato plants or wild relatives of tomato and may comprise substantial sequence identity with SEQ ID NO: 4, i.e. at least about 90%, 91%, 93%, 94%, 95%, 96%, 97%, 98% or 99% sequence identity with SEQ ID NO: 4. Such fully functional wild type SlAAP5B proteins are herein referred to as "variants" of SEQ ID NO: 4.

"Aa_trans domain" or "Amino Acid Transporter Domain" is a conserved protein domain which is involved in transmembrane amino acid transport. The protein is thus a transmembrane protein, i.e. it spans a membrane to transport amino acids across the membrane. It can be identified by having high sequence identity with the Pfam domain PF01490, e.g. by doing a sequence analysis on the world wide web at pfam.xfam.org or by analysing the sequence in InterPro, on the www site ebi.ac.uk/interpro/search/sequence-search. The CsAAP2A and CsAAP2B proteins of SEQ ID NO: 1 and 2 contain an Aa_trans domain starting at amino acid 20 and ending at amino acid 453 of CsAAP2A and at amino acid 454 of CsAAP2B. The SlAAP5A protein of SEQ ID NO: 3 contains an Aa_trans domain starting at amino acid 26 and ending at amino acid 460. The Aa_trans domain of the SlAAP5B protein of SEQ ID NO: 4 starts at amino acid 31 and ends at amino acid 464. See FIG. 1. In 3-D structure, the Aa_trans domain contains largely helices. For example both CsAAP2A and CsAAP2B have a predicted 3-D structure that is 67% helix, 0% beta sheet and 32% loop/coil (raptorx.uchicago.edu) and also SlAAP5A and SlAAP5B have a predicted 3-D structure that is 67% helix, 0% beta sheet and 32% loop/coil (raptorx.uchicago.edu).

"Cucumber plant" or "cultivated cucumber" or "domesticated cucumber" refers to plants of *Cucumis sativus* var. *sativus* i.e. varieties, breeding lines or cultivars, cultivated by humans and having good agronomic characteristics, especially producing edible and marketable fruits of good size and quality and uniformity; such plants are not "wild cucumber" or "primitive cucumber" plants , i.e. plants which generally have much poorer yields and poorer agronomic characteristics than cultivated plants and are less uniform genetically and in their physiological and/or morphological characteristics. "Wild plants" of "wild cucumber" include for example ecotypes, landraces or wild accessions or wild relatives of a species.

"Tomato plants" or "cultivated tomato plants" are plants of *Solanum lycopersicum*, i.e. varieties, breeding lines or cultivars of the species *Solanum lycopersicum*, cultivated by humans and having good agronomic characteristics; such plants are not "wild plants", i.e. plants which generally have much poorer yields and poorer agronomic characteristics than cultivated plants and e.g. grow naturally in wild populations. "Wild plants" include for example ecotypes, PI (Plant Introduction) lines, landraces or wild accessions or wild relatives of a species. The so-called heirloom varieties or cultivars, i.e. open pollinated varieties or cultivars commonly grown during earlier periods in human history and often adapted to specific geographic regions, are in one aspect of the invention encompassed herein as cultivated tomato plants.

"Landrace(s)" refers to primitive cultivars developed in local geographic regions, which often show a high degree of genetic variation in their genome and exhibit a high degree of morphological and/or physiological variation within the landrace (e.g. large variation in fruit size, etc.), i.e. are significantly less uniform than cultivated plants. Landraces are, therefore, herein included in the group "wild" plants, which is distinct from "cultivated" plants.

Wild relatives of tomato include *S. arcanum, S. chmielewskii, S. neorickii* (=*L. parviflorum*), *S. cheesmaniae, S. galapagense, S. pimpinellifolium, S. chilense, S. corneliomulleri, S. habrochaites* (=*L. hirsutum*), *S. huaylasense, S. sisymbriifolium, S. peruvianum, S. hirsutum* or *S. pennellii*.

"Wild relatives of cucumber" refer to *Cucumis sativus* var. *hardwickii, C. sativus* var *sikkimensis, Cucumis sativus* var. *xishuangbannesis*.

A "plant line" or "breeding line" refers to a plant and its progeny. As used herein, the term "inbred line" refers to a plant line which has been repeatedly selfed and is nearly homozygous. Thus, an "inbred line" or "parent line" refers to a plant which has undergone several generations (e.g. at least 5, 6, 7 or more) of inbreeding, resulting in a plant line with a high uniformity.

"Uniformity" or "uniform" relates to the genetic and phenotypic characteristics of a plant line or variety. Inbred lines are genetically highly uniform as they are produced by several generations of inbreeding. Likewise the F1 hybrids which are produced from crossing two such inbred lines are highly uniform in their genotypic and phenotypic characteristics and performance.

A "recombinant chromosome" refers to a chromosome having a new genetic makeup arising through crossing-over between homologous chromosomes. Herein, for example, recombinant chromosome is provided comprising an introgression fragment from a wild plant, which introgression fragment comprises a natural mutant allele.

The term "traditional breeding techniques" encompasses herein crossing, backcrossing, selfing, selection, double haploid production, embryo rescue, protoplast fusion, marker assisted selection, mutation breeding etc., all as known to the breeder (i.e. methods other than genetic modification/transformation/transgenic methods), by which, for example, a recombinant chromosome can be obtained, identified and/or transferred.

"Backcrossing" refers to a breeding method by which a (single) trait, such as a mutant allele, can be transferred from a generally (but not necessarily) inferior genetic background (e.g. a wild plant or wild relative; also referred to as "donor") into a generally (but not necessarily) superior genetic background (also referred to as "recurrent parent"), e.g. a cultivated plant. An offspring of a cross (e.g. an F1 plant obtained by crossing a donor plant with a e.g. superior genetic background plant; or an F2 plant or F3 plant, etc., obtained from selfing the F1) is e.g. "backcrossed" to the recurrent parent genetic background, e.g. to the cultivated parent. After repeated backcrossing, the trait of the donor genetic background will have been incorporated into the recurrent parent genetic background.

"Vegetative propagation", "vegetative reproduction" or "clonal propagation" are used interchangeably herein and mean the method of taking part of a plant and allowing that plant part to form at least roots where plant part is, e.g., defined as or derived from (e.g. by cutting of) leaf, pollen, embryo, cotyledon, hypocotyl, cells, protoplasts, meristematic cell, root, root tip, pistil, anther, flower, shoot tip, shoot, stem, fruit, petiole, etc. When a whole plant is regenerated by vegetative propagation, it is also referred to as a vegetative propagation. In one aspect propagation by grafting, e.g. a scion onto a rootstock, is included herein.

"Cell culture" or "tissue culture" refers to the in vitro culture of cells or tissues of a plant.

"Regeneration" refers to the development of a plant from cell culture or tissue culture or vegetative propagation.

"Non-regenerable cell" refers to a cell which cannot be regenerated into a whole plant.

DETAILED DESCRIPTION

Cucumber Plants and Plant Parts

The present invention relates in one aspect to the identification of an S-gene (susceptibility gene) class in cucumber and tomato plants.

It was found that cucumber contains an S-gene, which encoded an Amino Acid Permease protein, referred herein to as CsAAP2A, which when mutated resulted in reduced susceptibility (or partial resistance) to the oomycete *P. cubensis* when the mutant allele was in homozygous form (the wild type CsAAP2A allele is written in capital letters herein, and the mutant csaap2a allele in small letters).

It was further found that cucumber contained a second Amino Acid Permease gene on the same chromosome (chromosome 4), which encoded a protein that had very high amino acid sequence identity to the CsAAP2A protein (83.9%), and this second gene is referred to as CsAAP2B.

By fine mapping a QTL for downy mildew resistance located on chromosome 4 of the cucumber genome, it was found that the insertion of a transposable element (TE) in the CsAAP2A gene was causal for part of the resistance against Downy Mildew conferred by the QTL, which had been introgressed from accession PI197088. Especially leaf yellowing, one of the symptoms caused by *P. cubensis* infection, was significantly reduced due to TE insertion in the endogenous CsAAP2A gene and also sporulation was significantly reduced. The TE insertion resulted downregulation of the gene expression by a factor of 100, see Examples, which is effectively a knock-out of expression. The large TE was inserted in exon 4 of the coding region, and thus effectively resulting in a knock-out of the gene. The TE insertion also had the effect that (even if the gene were to be expressed) the encoded CsAAP2A protein was truncated, comprising only amino acids 1 to 160 of the wild type protein, followed by 29 other amino acids.

PI197088 is a landrace from India, donated to the US National Plant Germplasm System in 1951 (see www at npgsweb.ars-grin.gov) which has been used as a source of QTLs. For example the partially downy mildew resistant pickling cucumber varieties Citadel F1 and Peacemaker F1 have been developed from this landrace and are described to contain QTL5 of patent application WO2009129314. The present inventors found that these two varieties also contain the mutant csaap2a allele with the same TE insertion as found in PI197088. Further another landrace, PI330628 from Pakistan (also called Kshira), contained the TE in the csaap2a allele. It therefore seems that the TE insertion has either occurred independently several times in the evolutionary history of cucumber or a single TE insertion event has been selected for in landraces in India and Pakistan. In any case, the present invention allows for the generation of new mutant csaap2a alleles, which e.g. do not contain a TE inserted in the gene, e.g. in the region encoding exon 4 of the gene. Thus, in one aspect the mutant csaap2a allele of the invention is not the mutant allele present in PI197088 or in PI330628, e.g. in one aspect the mutant csaap2a allele does not comprise a TE inserted in the coding region of the csaap2a allele.

Apart from the de novo generation of (induced) mutant csaap2a and csaap2b alleles, the invention also enables screening of wild cucumber plants (e.g. landraces, PI accessions, CGN accessions, etc.) for the presence of "natural mutant" alleles. In one aspect such natural mutant alleles of the csaap2a gene are csaap2a alleles not comprising a TE insertion in e.g. exon 4 of the coding region, as found in PI197088 and PI330628. Such newly found natural mutant csaap2a and/or csaap2b alleles can then be introgressed into cultivated cucumber, to generate cultivated cucumber plants comprising reduced susceptibility to *P. cubensis*. The invention also relates to method for identifying wild accessions comprising mutant csaap2a and/or csaap2b alleles, comprising screening accessions for mutations in either or both of these alleles.

Analysis of free amino acids of leaves of plants containing the csaap2a mutant allele from PI197088 in homozygous form, compared to leaves of plants containing the wild type CsAAP2A allele in homozygous form, revealed that the concentration of *P. cubensis*-induced accumulation of free amino acids was lower in the leaves of the mutant, probably limiting the flow of nutrients towards the obligate biotrophic pathogen, reducing the pathogen's fitness and thereby reducing pathogen-induced symptom development (i.e. reducing susceptibility of the plant).

Thus, in one aspect a plant or plant part of the species *Cucumis sativus* is provided comprising at least one copy of a mutant allele of a gene named CsAAP2A, said gene encodes a CsAAP2A protein of SEQ ID NO: 1 or a protein comprising at least 90%, 91%, 92%, 93%, 94%, 95%, 96%, 97%, 98% or 99% sequence identity to SEQ ID NO: 1, wherein said mutant allele results in reduced expression or no expression of the CsAAP2A gene or wherein the mutant allele encodes a protein having a decreased function or a loss-of-function compared to the wild type CsAAP2A protein. In another aspect the plant comprises two copies of the mutant allele (homozygous).

As mentioned above, cucumber was found to contain a second gene, named CsAAP2B, on chromosome 4. The second gene encodes a protein with high sequence identity to CsAAP2A, it also has the same 2-dimensional structure (with a Aa trans domain being a large part of the protein) and 3-dimensional structure (as can for example be seen when analysing both proteins in raptorx.uchicago.edu), and it is expressed in the same tissues as CsAAP2A, namely in roots, hypocotyl, stem and to a lesser extent in cotyledon, leaf, flower and fruit tissue (data not shown). It is, therefore, very likely that CsAAP2A and CsAAP2B have the same function in the plant and that mutant CsAAP2B alleles have the same effect on reducing susceptibility to P. cubensis.

Thus, in one aspect a plant or plant part of the species *Cucumis sativus* is provided comprising at least one copy of a mutant allele of a gene named CsAAP2B, said gene encodes a CsAAP2B protein of SEQ ID NO: 2 or a protein comprising at least 90%, 91%, 92%, 93%, 94%, 95%, 96%, 97%, 98% or 99% sequence identity to SEQ ID NO: 2, wherein said mutant allele results in reduced expression or no expression of the CsAAP2B gene or wherein the mutant allele encodes a protein having a decreased function or a loss-of-function compared to the wild type CsAAP2B protein. In another aspect the plant comprises two copies of the mutant allele (homozygous).

In one aspect a plant or plant part of the species *Cucumis sativus* is provided comprising at least one copy of a mutant allele of a gene named CsAAP2A and/or of a mutant allele of a gene named CsAAP2B, wherein said CsAAP2A gene encodes a CsAAP2A protein of SEQ ID NO: 1 or a protein comprising at least 90%, 91%, 92%, 93%, 94%, 95%, 96%, 97%, 98% or 99% sequence identity to SEQ ID NO: 1, and said CsAAP2B gene encodes a CsAAP2B protein of SEQ ID NO: 2 or a protein comprising at least 90%, 91%, 92%, 93%, 94%, 95%, 96%, 97%, 98% or 99% sequence identity to SEQ ID NO: 2, and wherein said mutant csaap2a allele results in reduced expression or no expression of the CsAAP2A gene or wherein the mutant csaap2a allele encodes a protein having a decreased function or a loss-of-function compared to the wild type CsAAP2A protein, and wherein said mutant csaap2b allele results in reduced expression or no expression of the CsAAP2B gene or wherein the mutant csaap2b allele encodes a protein having a decreased function or a loss-of-function compared to the wild type CsAAP2B protein.

In another aspect the mutant csaap2a and/or the mutant csaap2b allele is in homozygous form.

Gene expression can be measured as known in the art, e.g. by measuring the mRNA transcript levels by quantitative real-time PCR (qRT-PCR). See for example Berg et al. BMC Plant Biology 2015, 15: 243, page 1-17, see page 15.

A plant may thus either have a mutant csaap2a or a mutant csaap2b allele (i.e. a single mutant allele), or both (double mutant). The plant comprising a single mutant csaap2a allele in homozygous form showed reduced susceptibility to the oomycete *Pseudoperonospora cubensis* compared to the susceptible control plant lacking any of the mutant alleles (i.e. comprising wild type alleles) and the same is expected for a plant comprising a single mutant csaap2b allele in homozygous form. In a plant comprising a double mutant allele the susceptibility to *P. cubensis* may be even reduced more strongly than in the single mutant plant. This can be tested by combining mutant csaap2a and mutant csaap2b alleles in a single plant, either by directly generating double mutants in a single plant (using e.g. CRISPR constructs with multiple single guide RNAs, sgRNAs, targeting both genes) or by crossing plants comprising single mutant alleles with each other and selecting progeny comprising both mutant alleles, preferably comprising both mutant alleles in homozygous form.

Thus, in a further aspect the mutant csaap2a and/or csaap2b allele confers reduced susceptibility to the oomycete *Pseudoperonospora cubensis* when the mutant csaap2a and/or csaap2b allele is in homozygous form compared to a plant or plant part homozygous for the wild type allele of the CsAAP2A and CsAAP2B gene.

The reduced susceptibility can be measured in a disease assay by e.g. assessing the *P. cubensis* induced symptom development, especially leaf yellowing/chlorosis and/or pathogen sporulation, at one or more time points after inoculation (e.g. 7 days after inoculation for yellowing and/or e.g. 12 days after inoculation for sporulation), in a plant line or variety comprising the mutant csaap2a allele and/or csaap2b allele in homozygous form, compared to a susceptible control plant line or variety comprising the wild type CsAAP2A allele and wild type CsAAP2B allele in homozygous form when grown under the same conditions. The plant line comprising the mutant csaap2a allele and/or csaap2b allele in homozygous would be considered to have reduced susceptibility when the average symptom development, especially e.g. at least leaf yellowing/chlorosis and/or pathogen sporulation, is significantly less compared to the average leaf yellowing/chlorosis and/or pathogen sporulation in the susceptible control (comprising the wild type CsAAP2A allele and wild type CsAAP2B allele). See Examples for a suitable disease assay for assessing leaf yellowing/chlorosis and/or pathogen sporulation. In the assays also symptoms on a plant line or variety heterozygous for csaap2a and/or csaap2b may be assessed. Such plants may also show e.g. reduced yellowing and/or reduced sporulation compared to the susceptible control, although this may be less strong than in the plants comprising one or both of the mutant alleles in homozygous form.

An endogenous cucumber CsAAP2A gene (or an CsAAP2A allele thereof) is a gene (or allele) encoding a (wild type, functional) CsAAP2A protein which comprises at least 90% or more sequence identity to the cucumber CsAAP2A protein of SEQ ID NO: 1. It comprises an Aa_trans domain as shown in FIG. 1. The presence of an Aa_trans domain can be checked by analysing the amino acid sequence in InterPro, at ebi.ac.uk/interpro/search/sequence-search.

An endogenous cucumber CsAAP2B gene (or an CsAAP2Ballele thereof) is a gene (or allele) encoding a (wild type, functional) CsAAP2B protein which comprises at least 90% or more sequence identity to the cucumber CsAAP2B protein of SEQ ID NO: 2. It comprises an Aa_trans domain as shown in FIG. 1. The presence of a Aa_trans domain can be checked by analysing the amino acid sequence in InterPro, at ebi.ac.uk/interpro/search/sequence-search.

In the plant or plant part comprising said mutant csaap2a allele and/or mutant csaap2b allele, said mutant csaap2a or csaap2b allele results in reduced expression or no expression of the (endogenous, wild type) CsAAP2A gene or CsAAP2B gene, respectively, or said mutant csaap2a or csaap2b allele encodes a protein having a decreased function or a loss-of-function compared to the wild type CsAAP2A or CsAAP2B protein, respectively, i.e. said mutant allele encodes a mutant csaap2a protein or csaap2b protein.

Thus, as a result of the mutation in the endogenous CsAAP2A and/or CsAAP2B allele, there is either less or even no wild type CsAAP2A or CsAAP2B mRNA transcript being produced by the mutant allele (e.g. if the mutation is in a regulatory sequence of the endogenous allele) in the plant cell and plant, or as a result of the mutation a mutant CsAAP2A protein or CsAAP2B protein is produced by the mutant allele, e.g. comprising one or more amino acids replaced, deleted or inserted compared to the functional wild type protein, thereby leading to a reduced function or loss of function of the (mutant) csaap2a and/or csaap2b protein. And consequently, at least when the mutant csaap2a and/or csaap2b allele is in homozygous form in the genome of the plant, the plant will be at least partially resistant against downy mildew/less susceptible to *P. cubensis* than the plant comprising two functional/wild type CsAAP2A alleles and two functional/wild type CsAAP2B alleles.

No expression of the mutant csaap2a or csaap2b allele means that no transcript (mRNA) is being transcribed from the mutant allele, due to e.g. a mutation in the promoter sequence being present. So if the mutant allele is in homozygous form, the wild type mRNA, encoding the functional protein will not be present in plant tissue in which it is otherwise present in the susceptible control (comprising the wild type alleles), such as roots, stems, hypocotyl, cotyledon, leaf and flower. An allele having no expression may also be referred to as a knock-out allele herein.

Reduced (or decreased) expression of the mutant csaap2a allele or of the mutant csaap2b allele means for example that only 50%, or less, of the amount of transcript (mRNA) is transcribed from the mutant allele compared to the wild type allele, or only equal to or less than 40%, 30%, 20%, 10%, or 5% of the amount of transcript (mRNA) is transcribed from the mutant allele compared to the wild type allele. In other words, when the mutant allele is in homozygous form, the wild type mRNA, encoding the functional protein will be present in plant tissue in which it is otherwise present, such as leaves, roots, hypocotyl, cotyledons or stems, but at a significantly lower amount than in a plant which is homozygous for the wild type allele. This will result in significantly less functional wild type protein being present, which in turn results in reduced susceptibility of the plant. An allele having reduced expression may also be referred to as a knock-down allele herein.

The decrease in the expression of csaap2a or csaap2b allele can, for example, be determined by measuring the quantity of RNA transcripts (e.g. mRNA), e.g. by qRT-PCR. Similarly, the decrease in the amount of CsAAP2A or CsAAP2B protein, can, for example, be determined by immunological methods such as Western blot analysis, ELISA (Enzyme Linked Immuno Sorbent Assay) or RIA (Radio Immune Assay). Here, a decrease preferably means a reduction in the amount of CsAAP2A proteins or CsAAP2B protein by at least 50%, in particular by at least 70%, or by at least 85% and particularly by at least 95%.

In another embodiment the cucumber plant or plant part comprises a mutant csaap2a allele, wherein the protein encoded by the mutant csaap2a allele comprising one or more amino acids replaced, inserted or deleted compared to the CsAAP2A wild type protein of SEQ ID NO: 1 (or a functional variant thereof comprising at least 90% sequence identity to SEQ ID NO: 1), especially one or more amino acids replaced, inserted and/or deleted in the conserved Amino Acid Transporter Domain at amino acid 20 to 453 of SEQ ID NO: 1 or in an Amino Acid Transporter Domain comprising at least 95%, 96%, 97%, 98% or 99% sequence identity to amino acid 20 to 453 of SEQ ID NO: 1. Such a protein can have a reduced activity or no activity in vivo.

In another embodiment the cucumber plant or plant part comprises a mutant csaap2b allele, wherein the protein encoded by the mutant csaap2b allele comprising one or more amino acids replaced, inserted or deleted compared to the CsAAP2B wild type protein of SEQ ID NO: 2 (or a functional variant thereof comprising at least 90% sequence identity to SEQ ID NO: 2), especially one or more amino acids replaced, inserted and/or deleted in the conserved Amino Acid Transporter Domain at amino acid 20 to 454 of SEQ ID NO: 2 or in an Amino Acid Transporter Domain comprising at least 95%, 96%, 97%, 98% or 99% sequence identity to amino acid 20 to 454 of SEQ ID NO: 2. Such a protein can have a reduced activity or no activity in vivo.

In one embodiment the plant or plant part comprises either of the mutant alleles (in heterozygous or homozygous form) or comprises both of the mutant alleles (double mutant) (in heterozygous or homozygous form).

In one aspect the mutant csaap2a allele does not comprise a transposable element inserted in the nucleotide sequence of exon 4, encoding amino acids 132 to 201 of the CsAAP2A protein of SEQ ID NO: 1 (as found in PI197088). The exons can be identified by aligning the cDNA (mRNA) with the genomic sequence of the gene, which comprises introns and exons. When a gene is expressed, pre-mRNA, which is the primary transcript and comprises exons and introns, is processed by RNA processing, which results in the intron sequences being removed and the mRNA (messenger RNA) being produced, which is then translated into the protein Amino acids 1 to 21 are encoded by exon 1, 22-99 by exon 2, 100-131 by exon 3, 132-201 by exon 4, 202-248 by exon 5 and 249-466 by exon 6.

In one aspect, the cucumber plant or plant part comprises a mutant csaap2a allele and/ or a mutant csaap2b allele, wherein the mutant csaap2a allele encodes a protein that is truncated compared to the wild type CsAAP2A protein and/or the mutant csaap2b allele encodes a protein that is truncated compared to the wild type CsAAP2B protein. The truncated protein may comprise additional amino acids, for example a frame shift mutation may result in the truncated protein comprising an amino acid sequence which is different from the amino acid sequence of the wild type protein. A truncated protein can have a reduced activity or even no activity in vivo, especially when all or part of the Aa_trans domain is missing and/or is replaced by different amino acids. Thus in one aspect the mutant csaap2a allele encodes a protein that is truncated compared to the wild type CsAAP2A protein and/or the mutant csaap2b allele encodes a protein that is truncated compared to the wild type CsAAP2B protein, wherein at least one, two, three, four, 5, 6, 7, 8, 9, 10, 15, 20, 30, 40, 50 or more amino acids of the Aa_trans domain are missing or are replaced by different amino acids compared to the wild type protein. In one aspect at least 13, 14, 15, 20, 30, 40, 50 or more amino acids of the C-terminal end of the CsAAP2A or CsAAP2B protein are missing or are replaced by one or more different amino acids compared to the wild type protein.

The 2-dimensionl analysis showed that a large part of the CsAAP2A protein and CsAAP2B protein consists of the Aa_trans domain. 3-dimensional analysis predicts that both the CsAAP2A protein and the CsAAP2B protein consists of 67% helix structure and 32% loop structures (coils). This means that any amino acid insertion, deletion or replacement, especially of one or more amino acids in the Aa_trans domain, will likely change the 3-dimensional structure of the protein and reduce its in vivo function or even abolish its in vivo function. For example, a mutation which results in a change of a codon into a STOP codon, will result in a truncated protein.

A mutant csaap2a allele encoding a truncated CsAAP2A protein may, thus be an allele which encodes a protein that lacks at least 13, 14, 15, 20, 30, 40, 50, 60, 70, 80, 90, 100, 120, 130, 140, 150, 160, 170, 180, 190, 200, 250, 300, 350, 400 or even more of the C-terminal amino acids compared to the wild type CsAAP2A protein of SEQ ID NO: 1, or of a variant comprising at least 90%, 91%, 92%, 93%, 94%, 95%, 96%, 97%, 98% or 99% sequence identity to SEQ ID NO: 1. The transposable element insertion found in the cucumber csaap2a allele of PI197088, for example, resulted in amino acids 161-466 of SEQ ID NO: 1 being replaced by 29 other amino acids, i.e. the 306 C-terminal amino acids of SEQ ID NO: 1 were lacking. The truncated csaap2a protein consisting of amino acids 1-160 of SEQ ID NO: 1 (plus 29 other amino acids) was non-functional.

The effect of a mutation in csaap2a on resistance was confirmed in a TILLING mutant comprising a W25STOP mutation in the csaap2a allele in homozygous form (see Examples). In cucumber, therefore, a single mutant in csaap2a confers reduced susceptibility to *P. cubensis*, as shown in the Examples. In the W25STOP mutant, the mutant protein lacks most of the Aa_trans domain, most likely causing a loss-of-function of the mutant protein. This mutant allele (and plants and plant parts comprising it, preferably in homozygous form) is, therefore, one embodiment herein.

A mutant csaap2b allele encoding a truncated CsAAP2B protein may, thus be an allele which encodes a protein that lacks at least 13, 14, 15, 20, 30, 40, 50, 60, 70, 80, 90, 100, 120, 130, 140, 150, 160, 170, 180, 190, 200, 250, 300, 350, 400 or even more of the C-terminal amino acids compared to the wild type CsAAP2B protein of SEQ ID NO: 2, or of a variant comprising at least 90%, 91%, 92%, 93%, 94%, 95%, 96%, 97%, 98% or 99% sequence identity to SEQ ID NO: 2.

Thus in one aspect the mutant allele results in a truncated CsAAP2A protein or a truncated CsAAP2B protein being produced, which truncated protein has decreased function or loss-of-function. A truncation may for example result in the loss of the C-terminal end (carboxyl terminal end) of the protein, whereby part or all of the Aa_trans domain is absent. For example only the N-terminal part (amino terminal part) of the protein may still be present. Mutant alleles which express a truncated CsAAP2A protein or a truncated CsAAP2B protein can be induced whereby, for example, a codon in one of the exons is changed into a premature stop codon or splice-site mutations or frame-shift mutations can also lead to premature stop codons and truncated proteins.

In another aspect the mutant allele results in a mutant CsAAP2A or CsAAP2B protein, which comprises one or more amino acids inserted, replaced and/or deleted compared to the wild type protein. As mentioned, especially insertion, replacement and/or deletion of one or more amino acids in the Aa_trans domain will result in a mutant protein that has decreased function or loss of function, and will, at least in homozygous form in the cucumber plant, reduce susceptibility to *P. cubensis*. In one aspect at least 1, 2, 3, 4, 5, 6, 7, 8, 9 10, or more amino acids of the Aa_trans domain of the CsAAP2A protein or of the CsAAP2B protein are deleted.

Whether the insertion, replacement and/or deletion of one or more amino acids, or a truncation or mutant allele not expressed or having reduced expression as described elsewhere herein, actually results in a reduced susceptibility in vivo can be tested by carrying out a disease assay for a plant comprising the mutant allele (or double mutant) in homozygous form. Optionally the increase in free amino acids following *P. cubensis* infection can be compared between the plant comprising the mutant csaap2a and/or csaap2b allele and the susceptible control comprising the wild type alleles (WT) as described in the Examples. A reduced increase in free amino acids, especially in Ala, Gly, Val, Leu, Ile, Thr, Ser, Pro and/or Gln compared to the increase in the susceptible control (comprising functional wild type CsAAP2A and CsAAP2B alleles) may, in one aspect, indicate that the mutant allele has reduced function or a loss of function in vivo.

In yet another aspect the mutant allele results in reduced expression or no expression of the allele and thus reduced amounts or no protein of the wild type CsAAP2A or CsAAP2B protein being produced in the plant or plant part. For example, the promoter or another regulatory element of the CsAAP2A or CsAAP2B allele may be comprise one or more nucleotides inserted, deleted and/or replaced.

Thus, a mutant allele of a CsAAP2A protein-encoding gene and/or CsAAP2B protein-encoding gene causes a plant to have reduced susceptibility to *P. cubensis*, at least when the plant is homozygous for the mutant allele. Concerning the embodiments of the invention, the mutation in the mutant allele of a CsAAP2A protein-encoding gene and/or CsAAP2B protein encoding gene (i.e. in the mutant csaap2a allele and/or csaap2b allele) can be any mutation, including one or more deletions, truncations, insertions, point mutations, nonsense mutations, missense or non-synonymous mutations, splice-site mutations, frame shift mutations and/or mutations in regulatory sequences (for example in the promoter sequence). In one aspect the mutation in the mutant csaap2a allele and/or csaap2b allele is a point mutation. The mutation can occur in a DNA sequence comprising the coding sequence of a CsAAP2A protein-encoding gene or CsAAP2B protein-encoding gene, or in a RNA sequence encoding a CsAAP2A protein or CsAAP2B protein, or it can occur in the amino acid molecule of the CsAAP2A or CsAAP2B protein.

Concerning a DNA sequence of CsAAP2A protein-encoding gene or CsAAP2B protein-encoding gene, the mutation can occur in the coding sequence (cds, composed of the exons) or it can occur in non-coding sequences like 5'- and 3'-untranslated regions, introns, promoters, enhancers etc. In respect to RNA encoding a CsAAP2A protein or CsAAP2B protein, the mutation can occur in the pre-mRNA or the mRNA. In one aspect the mutant allele results in the protein having a loss-of-function or decrease of function due to one or more amino acids being replaced, inserted and/or deleted, for example resulting in one or more amino acids being replaced, inserted or deleted in the conserved Aa_trans domain. For example, truncation of the protein to cause deletion of the Aa_trans domain, or part thereof, will result in a loss of function or decrease of function of the protein.

A further embodiment of the invention therefore concerns cucumber plant cells or plants according to the invention comprising a mutant allele of a CsAAP2A protein-encoding gene and/or of a CsAAP2B protein-encoding gene, characterized in that the mutant csaap2a allele and/or mutant csaap2b allele comprises or effects one or more of the mutations selected from the group consisting of
  a) a deletion, truncation, insertion, point mutation, nonsense mutation, missense or non-synonymous mutation, splice-site mutation, frame shift mutation in the genomic sequence;
  b) a mutation in one or more regulatory sequences;
  c) a deletion, truncation, insertion, point mutation, nonsense mutation, missense or non-synonymous mutation, splice-site mutation, frame shift mutation in the coding sequence;
  d) a deletion, truncation, insertion, point mutation, nonsense mutation, missense or non-synonymous mutation, splice-site mutation, frame shift mutation in the pre-mRNA or mRNA; and/or
  e) a deletion, truncation, insertion or replacement of one or more amino acids in the CsAAP2A or CsAAP2B protein.

A different embodiment of the invention concerns cucumber plant cells, plant parts or plants comprising or synthesising an mRNA encoding a CsAAP2A protein and/or CsAAP2B protein, wherein the mRNA encoding a CsAAP2A protein or CsAAP2B protein has one or more mutations selected from the group consisting of
  a) a deletion mutation;
  b) a missense or non-synonymous mutation;
  c) a frame shift mutation; and/or
  d) a non-sense mutation.

In another embodiment of the invention, plant cells or plants according to the invention comprise or synthesise an mRNA encoding a CsAAP2A protein and/or CsAAP2B protein having one or more mutations, wherein the mRNA is transcribed from a mutant allele of a CsAAP2A protein-encoding gene and/or from a mutant allele of a CsAAP2B protein-encoding gene. Comprised by these embodiments of the invention are plant cells, plant parts or plants according to the invention comprising or synthesising an mRNA transcribed from a mutant allele of a CsAAP2A protein-encoding gene and/or CsAAP2B protein encoding gene, characterized in that the mRNA comprises a deletion mutation and/or a missense or non-synonymous mutation and/or a frame shift mutation and/or a non-sense mutation, compared to the corresponding (DNA) coding sequence of the mutant allele of the CsAAP2A or CsAAP2B protein-encoding gene from which the mRNA is transcribed. Thus, in one aspect any mutation which affects pre-mRNA splicing is encompassed, i.e. which modifies the normal pre-mRNA splicing process, thereby leading to a different mRNA molecule.

An "mRNA coding sequence" shall have the common meaning herein. An mRNA coding sequence corresponds to the respective DNA coding sequence of a gene/allele apart from that thymine (T) is replaced by uracil (U).

In one aspect the cucumber plant or plant part is homozygous for a mutant csaap2a allele and/or for a mutant csaap2b allele described herein. Because the mutant alleles of both the CsAAP2A gene and the CsAAP2B gene are deemed to be recessive, the reduction in susceptibility is seen phenotypically when the plant is homozygous for one or both of the mutant alleles, although it is not excluded that an effect may also be seen when the plant is heterozygous for one or both mutant alleles.

In one aspect the mutant csaap2a and/or csaap2b allele is an induced mutant allele, while in a different aspect the mutant csaap2a and/or csaap2b allele is a "natural mutant" allele introgressed into cultivated cucumber by e.g. backcrossing.

Mutant alleles can be generated by methods known in the art, such as chemical mutagenesis (e.g. EMS treatment), radiation mutagenesis (UV, gamma rays etc.), targeted mutagenesis, such as Crispr/Cas9 or other Crispr based genome editing techniques or TALENS.

Suitable chemical mutagens include ethyl methanesulfonate (EMS), methylmethane sulfonate (MMS), N-ethyl-N-nitrosurea (ENU), trimethylamine (TEM), N-methyl-N-nitrosourea (MNU), procarbazine, chlorambucil, cyclophosphamide, diethyl sulfate, acrylamide monomer, melphalan, nitrogen mustard, vincristine, dimethylnitrosamine, N-methyl-N'-nitrosoguanidine (MNNG), nitrosoguanidine, 2-aminopurine, 7,12-dimethylbenz(a)anthracene (DMBA), ethylene oxide, hexamethylphosphoramide, bisulfan, diepoxyalkanes, diepoxyoctrane (DEO), diepoxybutane (DEB), 2-methoxy-6-choloro9[3-ethyl-2-chloro-ethyl]aminopropylamine]acridine dihydrochloride (ICR-170), and formaldehyde. Suitable radiation is UV radiation or radioactive radiation.

Biotechnological methods for introducing mutations into a desired gene/allele of a plant cell or plant are known in the art. Therefore, mutant alleles of a CsAAP2A and/or CsAAP2B protein-encoding gene can be produced in plant cells or plants by using these methods. Examples for such technologies are in particular mutagenesis techniques or enzymes which induce double stranded DNA breaks (double stranded DNA break inducing enzyme (DSBI)) in the genome of plants. Known and practised technologies are rare-cleaving endonucleases and custom-tailored rare-cleaving endonucleases including but not limited to homing endonucleases, also called meganucleases, transcription activator-like effectors fused to the catalytic domain of a nuclease (TALENs) and so-called CRISPR systems.

CRISPR systems is used broadly herein, and does not only encompass the use of the Cas9 nuclease (Crispr/Cas9 system), but also other Crispr systems e.g. using other nucleases, such as Cpf1. These techniques can also be referred to as targeted genome editing techniques or gene editing techniques or targeted mutagenesis techniques.

Thus, technologies such as mutagenesis or targeted genome editing techniques are eligible for introducing a mutation into genes in plant cells or plants. Therefore, plant cells and plants according to the invention having a mutant allele of a CsAAP2A and/or CsAAP2B protein-encoding gene, wherein the mutation into the mutant allele was introduced by genome editing techniques, e.g. using rare-cleaving endonucleases or custom-tailored rare-cleaving endonucleases, are also an embodiment of the invention. Concerning custom-tailored rare-cleaving endonucleases the mutation in the mutant allele of CsAAP2A and/or CsAAP2B protein has preferably been introduced by a meganuclease, a TALENs or a CRISPR system. In cucumber broad virus resistance has been generated by targeted mutagenesis using Crispr/Cas9 by disrupting the function of the recessive eIF4E gene, see Chandrasekaran et al. MOLECULAR PLANT PATHOLOGY (2016) 17(7), 1140-1153. The transformed T1 plants were selfed and homozygous non-transgenic T3 progeny were selected comprising the mutant eif4e allele in homozygous form, conferring immunity to CVYV and resistance to ZYMV and PRSMV-W. Use of the Crispr system in cucumber is therefore known to the skilled person.

Thus, in one aspect the mutant csaap2a and/or csaap2b alleles are induced mutants, e.g. induced in a breeding line, an inbred line or variety of cultivated cucumber, or in one aspect the mutant alleles are induced in wild cucumber or wild relatives of cucumber (and the induced mutant alleles can then be backcrossed into cultivated cucumber). In one aspect the mutant alleles are generated by mutagenesis (e.g. chemical or radiation mutagenesis) or by targeted mutagenesis, especially using the CRISPR system (e.g. Crispr/Cas9 or Crispr/Cpf1 or other nucleases). In one aspect the cultivated cucumber plant comprising the mutant csaap2a and/or csaap2b alleles is not a transgenic plant, i.e. non transgenic progeny are selected which do not comprise e.g. the CRISPR construct.

The cultivated cucumber may be of any type, such as pickling cucumbers (e.g. American pickling, European pickling types), slicing cucumbers (e.g. American slicing), long cucumbers, short cucumbers, European greenhouse cucumbers, Beit-Alpha type cucumbers, oriental trellis type cucumbers (also marketed as 'burpless'), Asian cucumbers, which can be further subdivided into different types, such as Indian Mottled cucumber, Chinese Long cucumber, Korean cucumber and Japanese cucumber types.

Mutant alleles can also evolve naturally in populations of wild cucumber or wild relatives of cucumber, such as such as *Cucumis sativus* var. *hardwickii*, *C. sativus* var. *sikkimensis*, or *Cucumis sativus* var. *xishuangbannesis*. In one aspect the mutant csaap2a and/or csaap2b alleles are natural mutant alleles, which have been introgressed into cultivated cucumber. The wild type allele found in cultivated cucumber on chromosome 4 is then replaced with the natural mutant allele, i.e. by meiotic recombination between homologous chromosomes. Wild cucumber accessions can be screened for the presence of such natural mutant alleles and backcrossing to cultivated cucumber can be used to introgress the natural mutant allele into the cultivated cucumber genome.

Thus in one aspect a plant or plant part of the species *Cucumis sativus* var. *sativus* is provided, comprising an introgression fragment from a wild cucumber or wild relative of cucumber on chromosome 4, said introgression fragment comprises a mutant allele of a gene named CsAAP2A, said gene encodes a CsAAP2A protein of SEQ ID NO: 1 or a protein comprising at least 90%, 91%, 92%, 93%, 94% or 95% sequence identity to SEQ ID NO: 1, and/or a mutant allele of a gene named CsAAP2B, said gene encoding a CsAAP2B protein of SEQ ID NO: 2 or a protein comprising at least 90%, 91%, 92%, 93%, 94% or 95% sequence identity to SEQ ID NO: 2, wherein said mutant csaap2a and/or csaap2b allele results in reduced expression or no expression of the mutant allele or encodes a protein having a decreased function or a loss-of-function compared to the wild type protein.

In one aspect the introgression fragment comprises a natural mutant allele, while in another aspect the introgression fragment comprises an induced mutant allele.

In one aspect wild cucumber plants, or wild relatives of cucumber are screened for the presence of a natural mutant csaap2a or csaap2b allele. This can be done by e.g. analysing (directly or indirectly) the genomic DNA, mRNA (or cDNA) or protein of the CsAAP2A or CsAAP2B gene, using e.g. PCR methods or other molecular methods known in the art, such as sequencing, etc. whereby the presence of a mutant csaap2a or csaap2b allele can be determined. The wild cucumber plants or wild relatives of cucumber may be CGN accessions, PI accessions (Plant Introductions), or accessions from various seed bank collections. Once an accession is identified to comprise a mutant csaap2a or csaap2b allele, the accession can be crossed to cultivated cucumber, and the mutant allele can be introgressed into the genome of cultivated cucumber by e.g. backcrossing. The cultivated cucumber introgression line is preferably selfed one or more times to ensure the mutant allele is in homozygous form and the line can then be tested for reduced susceptibility to *P. cubensis* compared to e.g. the original cultivated cucumber (e.g. the recurrent parent) comprising the wild type, functional CsAAP2A and CsAAP2B alleles in homozygous form.

The cultivated cucumber plant described herein, comprising either an induced mutant or a natural mutant csaap2a and/or csaap2b allele in its genome preferably comprises either or both mutant alleles in homozygous form, as the reduced susceptibility against *P. cubensis* is at least seen when the allele is in homozygous form. Plants comprising either or both mutant alleles in heterozygous form are also encompassed herein.

Also encompassed herein is a method for identifying a natural mutant csaap2a and/or a natural mutant csaap2b allele. The method involves determining whether a wild cucumber or wild relative of cucumber comprises a natural mutant allele and optionally transferring the natural mutant allele into cultivated cucumber by traditional breeding techniques. Wild plant accessions are generally very heterogenous and also may comprise various other genes which affect downy mildew resistance. The effect of the mutant allele on the susceptibility of the plant will be difficult to assess in the wild accession and the mutant allele is preferably first transferred into a breeding line, preferably a breeding line which is susceptible to downy mildew. In one embodiment therefore a method for transferring a natural mutant csaap2a and/or a natural mutant csaap2b allele from a wild cucumber plant into a cultivated cucumber plant is provided, comprising a) identifying or providing a wild cucumber comprising a natural mutant csaap2a and/or csaap2b allele b) crossing the mutant allele(s) into cultivated cucumber, preferably a cultivated cucumber line which is susceptible to *P. cubensis*, and c) determining the effect of the mutant allele on the susceptibility to *P. cubensis*.

The same can of course be done for induced mutant alleles, which may be induced in wild cucumber, whereby in step a) one provides or identifies a wild cucumber comprising an induced mutant allele. The method may then be preceded by a step wherein mutations are induced.

The cultivated cucumber plant comprising a mutant csaap2a and/or a mutant csaap2b allele according to the invention may be of any type, e.g. it may be of one of the following cucumber types: pickling cucumbers (e.g. American pickling, European pickling type), slicing cucumbers (e.g. American slicing), long cucumbers, short cucumbers, European greenhouse cucumbers, Beit-Alpha type cucumbers, oriental trellis type cucumbers, Asian cucumbers (e.g. selected from Indian Mottled cucumber, Chinese Long cucumber, Korean cucumber and Japanese cucumber type). In one aspect the cultivated cucumber according to the invention is an inbred line or a F1 hybrid of a pickling cucumber type, slicing cucumber type, long cucumber type, short cucumber type, European greenhouse cucumbers, Beit-Alpha type cucumbers, oriental trellis type cucumbers, Chinese long cucumber type, Korean cucumber type or Japanese cucumber type. In a specific embodiment the cucumber is an inbred line or an F1 hybrid of a long cucumber, especially a European greenhouse cucumber, or a short cucumber.

The cultivated cucumber plant according to the invention may be an inbred line, an OP (open pollinated variety) or an F1 hybrid. In one aspect the F1 hybrid comprises a mutant csaap2a and/or csaap2b allele preferably in homozygous form.

The cultivated cucumber plant preferably has good agronomic and good fruit quality characteristics. The cultivated cucumber plant is in one aspect uniform, both genetically and phenotypically. Especially fruit characteristics are uniform, e.g. regarding shape, skin color, skin thickness, skin ribs, skin toughness, spines (spine color, spine density, etc.), presence/absence of warts, length and diameter at edible and marketable maturity, flavour, etc. Likewise seed characteristics (i.e. characteristics of the seeds from which the plant is grown) are uniform, e.g. seed size, seed color, etc.

Also a seed is provided from which a plant or plant part according to the invention can be grown.

Further a cucumber fruit produced by a plant according to the invention is provided, wherein the fruit comprises the mutant csaap2a and/or csaap2b allele, preferably in homozygous form.

Likewise plant parts of a plant according to the invention are provided, wherein the plant part is a cell, a flower, a pistil, a leaf, a stem, a petiole, a cutting, a tissue, a seed coat, an ovule, pollen, a root, a rootstock, a scion, a fruit, a cotyledon, a hypocotyl, a protoplast, an embryo, an anther. The plant part comprises in its genome a mutant csaap2a and/or a mutant csaap2b allele of the invention, preferably in homozygous form. In one aspect the cell is a non-propagating or a non-regenerable cell. In one aspect the non-propagating or non-re generable cell is part of a tissue or organ of the plant. In a different aspect the non-propagating or non-regenerable cell is in a cell culture or tissue culture.

Also a cell culture or a tissue culture of cells or tissues comprising in its genome a mutant csaap2a and/or a mutant csaap2b allele of the invention is encompassed herein. Further a plant regenerated from such a cell or tissue culture is encompassed.

Further a vegetatively propagated plant propagated from a plant part according to the invention is provided.

Also a food or feed product comprising cells according to the invention are provided, such as parts of cucumber fruits.

In one embodiment a method of cucumber fruit production is provided, said method comprising growing a plant according to the invention, comprising a mutant csaap2a and/or csaap2b allele preferably in homozygous form, said method optionally comprising a reduced treatment with fungicides compared to a susceptible control plant, e.g. a plant comprising a wild type CsAAP2A allele and a wild type CsAAP2B allele in homozygous form, and optionally harvesting the fruits produced by said plants. As the plant is less susceptible to *P. cubensis*, less fungicide treatment (lower amounts and/or less frequent applications of fungicides) is needed.

*P. cubensis* infects cucumbers in both the field and the greenhouse, therefore in the above method plants of the invention are grown either in the field or in greenhouses.

The pathogen has a high potential to become resistant to fungicides, it was for example the first oomycete with documented resistance to metalaxyl and reduced sensitivity to mancozeb. It has also been described to have developed resistance to strobulurin fungicides. Less fungicide treatment will reduce the risk of resistance developing.

As mentioned previously, mutant csaap2a and/or csaap2b alleles can be induced, i.e. they can be generated by mutating the endogenous CsAAP2A and/or CsAAP2B allele in cultivated cucumber seeds or plants or plant parts (or optionally in wild plants) and/or by selecting induced mutants e.g. tissue culture induced mutants or TILLING mutants.

Therefore, methods for producing and/or selecting plants having mutant csaap2a and/or csaap2b alleles, resulting in a knock-down or knock-out of gene expression and consequently less or no wild type protein being produced, or mutant alleles encoding mutant proteins having a decreased function or loss-of-function compared to the wild type protein are encompassed herein. To generate such mutant alleles conventional mutagenic agents, like chemicals or high energy radiation (e.g. x-rays, neutron radiation, gamma radiation or UV radiation) may be used. It is also possible to generate mutant alleles by means of biotechnology methods as described above (e.g. targeted gene editing technology).

In one aspect the invention provides a method for generating and/or identifying a cucumber plant comprising a mutant allele of a gene named CsAAP2A, said gene encodes a CsAAP2A protein of SEQ ID NO: 1 or a protein comprising at least 90%, 91%, 92%, 93%, 94% or 95% sequence identity to SEQ ID NO: 1, comprising identifying or selecting a plant in a mutant cucumber population, or progeny thereof obtained by selfing, comprising a mutant csaap2a allele, or generating a cucumber plant comprising a mutant csaap2a allele using a targeted genome editing technique, such as a Crispr system (e.g. Crispr/Cas9).

In another aspect the invention provides a method for generating a cucumber plant comprising a mutant allele of a gene named CsAAP2B, said gene encodes a CsAAP2B protein of SEQ ID NO: 2 or a protein comprising at least 90%, 91%, 92%, 93%, 94% or 95% sequence identity to SEQ ID NO: 2, comprising identifying or selecting a plant in a mutant cucumber population, or progeny thereof obtained by selfing, comprising a mutant csaap2b allele, or generating a cucumber plant comprising a mutant csaap2b allele using a targeted genome editing technique, such as a Crispr system (e.g. Crispr/Cas9).

A 'mutant cucumber population' or 'population of mutant cucumber plants' refers to a plurality of cucumber seeds or plants or plant parts which have been treated with a conventional mutagenic agents, like chemicals or high energy radiation (e.g. x-rays, neutron radiation, gamma radiation or UV radiation) or progeny thereof obtained by selfing, to ensure that mutations are in homozygous form. These can be plants or seeds or plant parts of a cultivated cucumber breeding line, variety, inbred line or any plurality of cultivated cucumber plants or seeds. Alternatively these may be wild cucumber plants or wild relatives of cucumber.

Cucumber plants according to the invention, comprising reduced susceptibility to *P. cubensis*, can be produced by introducing one or more mutations into an allele of a CsAAP2A protein-encoding gene and/or into an allele of a CsAAP2B protein-encoding gene.

A further embodiment of the present invention, therefore, concerns a method for production of a cucumber plant comprising the steps of
- a) providing a population of mutant cucumber plants,
- b) optionally selecting a plant which is less susceptible to *P. cubensis* than a non-mutated plant,
- c) determining if a plant of the mutant population of a) or selected under b) has a mutation in an allele of a CsAAP2A protein-encoding gene and/or in an allele of a CsAAP2B protein-encoding gene, optionally
- d) growing/cultivating the plants obtained under c).

In one aspect is a method for production of a cucumber plant comprising the steps of
- a) introducing mutations in a population of cucumber plants (and optionally selfing the plants),
- b) optionally selecting a plant which is less susceptible to *P. cubensis* than a non-mutated plant,
- c) determining if the plant selected under b) has a mutation in an allele of a CsAAP2A protein-encoding gene and/or in an allele of a CsAAP2B protein-encoding gene and selecting a plant comprising such a mutation, and optionally
- d) growing/cultivating the plants obtained under c).

However, in one aspect the order of the steps can also be different, comprising:
- a) providing a population of mutant cucumber plants,
- b) determining if a plant of the mutant population of a) has a mutation in an allele of a CsAAP2A protein-encoding gene and/or in an allele of a CsAAP2B protein-encoding gene, optionally
- c) selecting a plant comprising a mutation in an allele of a CsAAP2A protein-encoding gene and/or in an allele of a CsAAP2B protein-encoding gene, and optionally
- d) selfing the plant of b) or c) to generate a plant comprising the mutant allele in homozygous form, and optionally
- e) determining if the plant of step c) or d) is less susceptible to *P. cubensis* than the non-mutated plant.

Or the steps may comprise:
- a) introducing mutations in a population of cucumber plants (and optionally selfing the plants)
- b) determining if a plant of a) has a mutation in an allele of a CsAAP2A protein-encoding gene and/or in an allele of a CsAAP2B protein-encoding gene and optionally
- c) selecting a plant comprising such a mutation, and optionally
- d) selfing the plant of b) or c) to generate a plant comprising the mutant allele in homozygous form, and optionally
- e) determining if the plant of step c) or d) is less susceptible to *P. cubensis* than the non-mutated plant.

A non-mutated plant may be e.g. a susceptible control plant, such as a plant comprising wild type, functional CsAAP2A and CsAAP2B alleles in homozygous form.

Optionally, the methods comprise selecting a plant comprising at least one copy of a mutant allele of a gene encoding a CsAAP2A or CsAAP2B protein. The selected plants are also encompassed herein.

Chemical substances, which can be used to produce chemically induced mutations, and the mutations resulting from the effect of the corresponding mutagens are, for example described in Ehrenberg and Husain, 1981, (Mutation Research 86, 1-113), Müller, 1972 (Biologisches Zentralblatt 91 (1), 31-48). The production of rice mutants using gamma radiation, ethyl methane sulphonate (EMS), N-methyl-N-nitrosurea or sodium azide (NaN$_3$) is described, for example, in Jauhar and Siddiq (1999, Indian Journal of Genetics, 59 (1), 23-28), in Rao (1977, Cytologica 42, 443-450), Gupta and Sharma (1990, Oryza 27, 217-219) and Satoh and Omura (1981, Japanese Journal of Breeding 31 (3), 316-326). The production of wheat mutants using NaN$_3$ or maleic hydrazide is described in Arora et al. (1992, Annals of Biology 8 (1), 65-69). An overview of the production of wheat mutants using different types of energy-rich radiation and chemical substances is presented in Scarascia-Mugnozza et al. (1993, Mutation Breeding Review 10, 1-28). Svec et al. (1998, Cereal Research Communications 26 (4), 391-396) describes the use of N-ethyl-N-nitrosurea for producing mutations in triticale. The use of MMS (methyl methane sulphonic acid) and gamma radiation for the production of millet mutants is described in Shashidhara et al. (1990, Journal of Maharashtra Agricultural Universities 15 (1), 20-23).

All these methods are basically suitable in the method for production of a plant according to the invention for producing mutant alleles in genes encoding a CsAAP2A or CsAAP2B protein.

The plants generated and/or selected by these methods are also an embodiment of the invention. These plants can be used to make breeding lines and varieties comprising the mutant alleles.

Selecting plants having reduced susceptibility to *P. cubensis* can be done in a disease assay as e.g. described in the Examples. As the phenotype is at least seen in homozygous condition, selfing of the plant or the population of mutagenized plants is preferred before phenotyping. Mutations in the appropriate alleles, in particular in alleles of CsAAP2A protein-encoding gene or CsAAP2B protein encoding gene, can be found with the help of methods known to the person skilled in the art. In particular, analyses based on hybridisations with probes (Southern Blot), amplification by means of polymerase chain reaction (PCR), sequencing of related genomic sequences and the search for individual nucleotide exchanges can be used for this purpose. Methods, which allow several plants to be investigated for mutations in certain genes in a short time, are particularly suitable. Such a method, so-called TILLING (Targeting Induced Local Lesions IN Genomes), has been described by McCallum et al. (2000, Plant Physiology 123, 439-442).

Other methods for identifying if a plant cell or plant comprises a mutant allele of a CsAAP2A or CsAAP2B protein-encoding gene comprise sequencing of the respective alleles and SNP marker analyses with methods common in the art and e.g. discussed in Thomson (2014, Plant Breeding and Biotechnology 2,195-212). Also analysis of CsAAP2A or CsAAP2B mRNA being expressed, and optionally quantified, can be used, e.g. to identify mutants having reduced or no gene expression.

These methods are basically suitable for identifying plant cells according to the invention and plants according to the invention having a mutant allele of a CsAAP2A or CsAAP2B protein-encoding gene.

In one aspect, a method for identifying or selecting a cucumber plant or plant part or cell comprising in its genome at least one copy of a mutant allele of CsAAP2A and/or CsAAP2B gene is provided, said method comprising
determining whether the plant or plant part or cell comprises in its genome at least one mutant csaap2a allele and/or csaap2b allele.

The cucumber plant or plant part may be a cultivated plant or a wild cucumber plant or wild relative of cucumber.

This method may involve analysing (directly or indirectly) the gene expression of the csaap2a allele and/or csaap2b allele, and/or the genomic nucleotide sequence of the csaap2a allele and/or csaap2b allele, or the mRNA nucleotide sequence of the csaap2a allele and/or csaap2b allele, or the protein sequence of the CsAAP2A or CsAAP2B protein, or the protein amounts of the CsAAP2A or CsAAP2B protein of the plant or plant part or plant cell, to determine if the gene expression is knocked down or knocked out compared to the wild type plant or plant part or plant cell, or if the encoded protein comprises one or more amino acid insertions, deletions or replacements compared to the wild type CsAAP2A or CsAAP2B protein.

One method for analysing the presence of a mutant csaap2a allele and/or csaap2b allele, is for example to assay the presence of a Single Nucleotide Polymorphism (SNP) between the genomic sequence of the mutant csaap2a allele and/or csaap2b allele and the wild type CsAAP2A and/or CsAAP2B allele, by, for example, designing primers for the SNP and genotyping plants or plant parts for the genotype of that particular SNP. For example a KASP assay can be used for detecting a SNP and thereby the mutant allele. Likewise primers can be designed for allele specific DNA amplification, e.g. distinguishing a wild type allele from a mutant allele. Such PCR primers can be designed based on the differences between the wild type and the mutant allele. So if the mutant allele comprises a deletion of one or more nucleotides, e.g. in a coding sequence, the primers can be designed to differentiate between the presence of the mutant allele and the wild type allele. The skilled person can easily develop a molecular assay to detect a mutant allele. So one aspect of the invention comprises a method for determining whether a cucumber plant, plant part or plant cell comprises one or more copies of a mutant csaap2a allele and/or csaap2b allele by a method selected from analysing one or more nucleotides of the genomic csaap2a allele and/or csaap2b allele, analysing the mRNA (or cDNA) expressed by the csaap2a allele and/or csaap2b allele or analysing the CsAAP2A or CsAAP2B protein amount and/or amino acid sequence (using e.g., antibody based detection).

Thus, a method for determining whether a cucumber plant or plant part comprises at least one copy of a mutant allele of a gene named CsAAP2A is provided, said gene encodes a CsAAP2A protein of SEQ ID NO: 1 or a protein comprising at least 90%, 91%, 92%, 93%, 94% or 95% sequence identity to SEQ ID NO: 1, said method comprising analysing the CsAAP2A DNA, RNA or protein of the plant or plant part. And a method for determining whether a cucumber plant or plant part comprises at least one copy of a mutant allele of a gene named CsAAP2B is provided, said gene encodes a CsAAP2B protein of SEQ ID NO: 2 or a protein comprising at least 90%, 91%, 92%, 93%, 94% or 95% sequence identity to SEQ ID NO: 2, said method comprising analysing the CsAAP2B DNA, RNA or protein of the plant or plant part.

In one aspect, especially in respect of the European Patent Convention, the cucumber plant according to the invention is "not obtained exclusively by an essentially biological process", or in one aspect the mutant csaap2a and/or csaap2b allele is not a natural mutant allele. If such a disclaimer is present in the claim of the European patent, it should be noted that using a cucumber plant comprising a mutant allele (e.g. a commercial variety of the applicant) to cross the mutant allele into a different background of cucumber will still be seen as falling under the claim, even though an exclusively essentially biological process (only crossing and selection) may have been used to transfer the allele into a different background.

The plants which comprise mutant aap2a and/or mutant aap2b alleles, and thereby comprise reduced susceptibility to *P. cubensis*, can be grown in methods for fruit production, whereby in one aspect less fungicides treatment is required during the cultivation period. For example, fewer applications of a fungicide effective against *P. cubensis* and/or lower dosages of active ingredient may be used. This saves costs for growers and is better for the environment. The disease management schemes may thus be adapted accordingly, both in protected environments such as greenhouses or tunnels, or in the open field.

Summary of Various Embodiments for Cucumber:

A plant or plant part of the species *Cucumis sativus* is provided comprising at least one copy of a mutant allele of a gene named CsAAP2A, said gene encodes a CsAAP2A protein of SEQ ID NO: 1 or a protein comprising at least 90%, 91%, 92%, 93%, 94% or 95% sequence identity to SEQ ID NO: 1, wherein said mutant allele results in reduced expression or no expression of the CsAAP2A gene or wherein the mutant allele encodes a protein having a decreased function or a loss-of-function compared to the wild type CsAAP2A protein.

The plant or plant part according to the above embodiment, wherein said mutant allele confers reduced susceptibility to the oomycete *Pseudoperonospora cubensis* when the mutant allele is in homozygous form compared to a plant or plant part homozygous for the wild type allele of the CsAAP2A gene.

The plant or plant part according to any one of the preceding embodiments, wherein said protein comprising one or more amino acids replaced, inserted or deleted compared to the CsAAP2A wild type protein, especially one or more amino acids replaced, inserted or deleted in the conserved Amino Acid Transporter Domain at amino acid 20 to 453 of SEQ ID NO: 1 or in an Amino Acid Transporter Domain comprising at least 95%, 96%, 97%, 98% or 99% sequence identity to amino acid 20 to 453 of SEQ ID NO: 1.

The plant or plant part according to any one of the preceding embodiments, wherein said plant or plant part is a cucumber plant or plant part and wherein said mutant allele is an induced allele or a natural allele.

The plant or plant part according to any one of the preceding embodiments, wherein said plant or plant part is a cucumber plant or plant part and wherein said mutant allele does not comprise a transposable element inserted in the nucleotide sequence encoding exon 4 of the CsAAP2A protein of SEQ ID NO: 1 or of a CsAAP2A protein comprising at least 90% sequence identity to SEQ ID NO: 1.

The plant or plant part according to any one of the preceding embodiments, wherein the mutant allele encodes a protein that is truncated compared to the wild type protein.

The plant or plant part according to any one of the preceding embodiments, wherein said plant or plant part is preferably homozygous for the mutant allele.

The plant or plant part according to any of the preceding embodiments, wherein said plant or plant part further comprises at least one copy of a mutant allele of a gene named CsAAP2B, said gene encodes a CsAAP2B protein of SEQ ID NO: 2 or a protein comprising at least 90%, 91%, 92%, 93%, 94% or 95% sequence identity to SEQ ID NO: 2.

A seed from which a plant or plant part according to any of the preceding embodiments can be grown.

A fruit produced by a plant according to any one of the preceding embodiments, wherein the fruit comprises the mutant csaap2a allele preferably in homozygous form, and optionally further comprises the csaap2b allele, preferably in homozygous form.

The plant part according to any one of the above embodiments, wherein the plant part is a cell, a flower, a pistil, a leaf, a stem, a petiole, a cutting, a tissue, a seed coat, an ovule, pollen, a root, a rootstock, a scion, a fruit, a cotyledon, a hypocotyl, a protoplast, an embryo, an anther.

A vegetatively propagated plant propagated from a plant part according to the above embodiment.

A method of cucumber fruit production, said method comprising growing a plant according to any one of the above embodiments comprising the mutant CsAAP2A allele preferably in homozygous form, said method optionally comprising a reduced treatment with fungicides compared to a susceptible control plant and optionally harvesting the fruits produced by said plants.

A method for generating a cucumber plant comprising a mutant allele of a gene named CsAAP2A, said gene encodes a CsAAP2A protein of SEQ ID NO: 1 or a protein comprising at least 90%, 91%, 92%, 93%, 94% or 95% sequence identity to SEQ ID NO: 1, comprising identifying or selecting a plant in a mutant cucumber population, or progeny thereof obtained by selfing, comprising a mutant csaap2a allele, or generating a cucumber plant comprising a mutant csaap2a allele using a genome editing technique.

A method for determining whether a cucumber plant or plant part comprises at least one copy of a mutant allele of a gene named CsAAP2A, said gene encodes a CsAAP2A protein of SEQ ID NO: 1 or a protein comprising at least 90%, 91%, 92%, 93%, 94% or 95% sequence identity to SEQ ID NO: 1, said method comprising analysing the CsAAP2A DNA, RNA or protein of the plant or plant part.

Summary of various further embodiments for cucumber:

A plant or plant part of the species *Cucumis sativus* is provided comprising at least one copy of a mutant allele of a gene named CsAAP2B, said gene encodes a CsAAP2B protein of SEQ ID NO: 2 or a protein comprising at least 90%, 91%, 92%, 93%, 94% or 95% sequence identity to SEQ ID NO: 2, wherein said mutant allele results in reduced expression or no expression of the CsAAP2B gene or wherein the mutant allele encodes a protein having a decreased function or a loss-of-function compared to the wild type CsAAP2B protein.

The plant or plant part according to the above embodiment, wherein said mutant allele confers reduced susceptibility to the oomycete *Pseudoperonospora cubensis* when the mutant allele is in homozygous form compared to a plant or plant part homozygous for the wild type allele of the CsAAP2B gene.

The plant or plant part according to any one of the preceding embodiments, wherein said protein comprising one or more amino acids replaced, inserted or deleted compared to the CsAAP2B wild type protein, especially one or more amino acids replaced, inserted or deleted in the conserved Amino Acid Transporter Domain at amino acid 20 to 454 of SEQ ID NO: 2 or in an Amino Acid Transporter Domain comprising at least 95%, 96%, 97%, 98% or 99% sequence identity to amino acid 20 to 454 of SEQ ID NO: 2.

The plant or plant part according to any one of the preceding embodiments, wherein said plant or plant part is a cucumber plant or plant part and wherein said mutant allele is an induced allele or a natural allele.

The plant or plant part according to any one of the preceding embodiments, wherein the mutant allele encodes a protein that is truncated compared to the wild type protein.

The plant or plant part according to any one of the preceding embodiments, wherein said plant or plant part is preferably homozygous for the mutant allele.

The plant or plant part according to any of the preceding embodiments, wherein said plant or plant part further comprises at least one copy of a mutant allele of a gene named CsAAP2A, said gene encodes a CsAAP2A protein of SEQ ID NO: 1 or a protein comprising at least 90%, 91%, 92%, 93%, 94% or 95% sequence identity to SEQ ID NO: 1.

A seed from which a plant or plant part according to any of the preceding embodiments can be grown.

A fruit produced by a plant according to any one of the preceding embodiments, wherein the fruit comprises the mutant csaap2b allele preferably in homozygous form, and optionally further comprises the csaap2a allele, preferably in homozygous form.

The plant part according to any one of the above embodiments, wherein the plant part is a cell, a flower, a pistil, a leaf, a stem, a petiole, a cutting, a tissue, a seed coat, an ovule, pollen, a root, a rootstock, a scion, a fruit, a cotyledon, a hypocotyl, a protoplast, an embryo, an anther.

A vegetatively propagated plant propagated from a plant part according to the above embodiment.

A method of cucumber fruit production, said method comprising growing a plant according to any one of the above embodiments comprising the mutant CsAAP2B allele preferably in homozygous form, said method optionally comprising a reduced treatment with fungicides compared to a susceptible control plant and optionally harvesting the fruits produced by said plants.

A method for generating a cucumber plant comprising a mutant allele of a gene named CsAAP2B, said gene encodes a CsAAP2B protein of SEQ ID NO: 2 or a protein comprising at least 90%, 91%, 92%, 93%, 94% or 95% sequence identity to SEQ ID NO: 2, comprising identifying or selecting a plant in a mutant cucumber population, or progeny thereof obtained by selfing, comprising a mutant csaap2b allele, or generating a cucumber plant comprising a mutant csaap2b allele using a genome editing technique.

A method for determining whether a cucumber plant or plant part comprises at least one copy of a mutant allele of a gene named CsAAP2B, said gene encodes a CsAAP2B protein of SEQ ID NO: 2 or a protein comprising at least 90%, 91%, 92%, 93%, 94% or 95% sequence identity to SEQ ID NO: 2, said method comprising analysing the CsAAP2B DNA, RNA or protein of the plant or plant part.

Tomato Plants and Plant Parts

The two putative orthologs of the cucumber CsAAP2A and CsAAP2B genes were found in tomato and were named SlAAP5A and SlAAP5B, respectively. Tomato contained a range of sequences which could all potentially be orthologs of the cucumber genes, which made it difficult to identify the orthologs. Also, the amino acid sequence identity to the cucumber proteins was low, only between 61 and 63% sequence identity and it was therefore questionable if the genes were indeed orthologs and had the same function in tomato plants. However, induced mutations in the tomato alleles were found to result in reduced susceptibility to the oomycete pathogen *Phytophthora infestans*, showing that the alleles play a role in late blight resistance in tomato. Interestingly, SlAAP5A and SlAAP5B were found on different chromosomes, chromosome 6 and chromosome 11, respectively.

Thus, in one aspect a plant or plant part of the species *Solanum lycopersicum* is provided comprising at least one copy of a mutant allele of a gene named SlAAP5A, said gene encodes a SlAAP5A protein of SEQ ID NO: 3 or a protein comprising at least 90%, 91%, 92%, 93%, 94%, 95%, 96%, 97%, 98% or 99% sequence identity to SEQ ID NO: 3, wherein said mutant allele results in reduced expression or no expression of the SlAAP5A gene or wherein the mutant allele encodes a protein having a decreased function or a loss-of-function compared to the wild type SlAAP5A protein.

In another aspect the plant comprises two copies of the mutant slaap5a allele (homozygous).

And in one aspect a plant or plant part of the species *Solanum lycopersicum* is provided comprising at least one copy of a mutant allele of a gene named SlAAP5B, said gene encodes a SlAAP5B protein of SEQ ID NO: 4 or a protein comprising at least 90%, 91%, 92%, 93%, 94%, 95%, 96%, 97%, 98% or 99% sequence identity to SEQ ID NO: 4, wherein said mutant allele results in reduced expression or no expression of the SlAAP5B gene or wherein the mutant allele encodes a protein having a decreased function or a loss-of-function compared to the wild type SlAAP5B protein.

In another aspect the plant comprises two copies of the mutant slaap5b allele (homozygous).

In one aspect a plant or plant part of the species *Solanum lycopersicum* is provided comprising at least one copy of a mutant allele of a gene named SlAAP5A and/or of a mutant allele of a gene named SlAAP5B, wherein said SlAAP5A gene encodes a SlAAP5A protein of SEQ ID NO: 3 or a protein comprising at least 90%, 91%, 92%, 93%, 94%, 95%, 96%, 97%, 98% or 99% sequence identity to SEQ ID NO: 3, and said SlAAP5B gene encodes a SlAAP5B protein of SEQ ID NO: 4 or a protein comprising at least 90%, 91%, 92%, 93%, 94%, 95%, 96%, 97%, 98% or 99% sequence identity to SEQ ID NO: 4, and wherein said mutant slaap5a allele results in reduced expression or no expression of the SlAAP5A gene or wherein the mutant slaap5a allele encodes a protein having a decreased function or a loss-of-function compared to the wild type SlAAP5A protein, and wherein said mutant slaap5b allele results in reduced expression or no expression of the SlAAP5B gene or wherein the mutant slaap5b allele encodes a protein having a decreased function or a loss-of-function compared to the wild type SlAAP5B protein.

In another aspect the mutant slaap5a and/or mutant slaap5b allele is in homozygous form.

Gene expression can be measured as known in the art, e.g. by measuring the mRNA transcript levels by quantitative real-time PCR (qRT-PCR). See for example Berg et al. BMC Plant Biology 2015, 15: 243, page 1-17, see page 15.

A plant may thus either have a mutant slaap5a or a mutant slaap5b allele (i.e. a single mutant allele), or both (double mutant). Five plant lines were double mutants (with both mutant alleles in homozygous form) and these showed a strongly reduced susceptibility to the oomycete *P. infestans* compared to the susceptible control plant lacking any of the mutant alleles (i.e. comprising wild type alleles), as shown in FIGS. 2 and 4. One plant line, line 77, seemed to be a single mutant, comprising only a mutant slaap5b allele in homozygous form (it still has to be confirmed that the SlAAP5A allele present in line 77 is the wild type allele). This line also showed reduced susceptibility to the oomycete *P. infestans* compared to the susceptible control plant, as shown in FIGS. 2 and 4. It could, however, be that line 77 is also a double mutant.

Whether the effect on susceptibility is similar in single mutants and in double mutants will need further analysis. It could, for example, be that in a plant comprising a single mutant allele (in homozygous form) the susceptibility to *P. infestans* is reduced to a lesser extent than seen in the double mutant plants. This can, of course, be tested by comparing single mutants to double mutants, by e.g. generating single mutants (e.g. by random or targeted mutagenesis) and then combining these in a single plant by crossing. Double mutants can also be generated directly, for example double mutants can be generated directly by using e.g. CRISPR constructs with multiple single guide RNAs, sgRNAs, targeting both genes. Double mutants can also be generated by crossing plants comprising single mutant alleles with each other and selecting progeny comprising both mutant alleles, preferably in homozygous form.

Thus, in a further aspect the mutant slaap5a and/or slaap5b allele confers reduced susceptibility to the oomycete *Phytophthora infestans* at least when the mutant slaap5a and/or slaap5b allele is in homozygous form compared to a plant or plant part homozygous for the wild type allele of the SlAAP5A and SlAAP5B gene.

The reduced susceptibility can be measured in a disease assay by e.g. assessing the *P. infestans* induced symptom development, especially average lesion area, at one or more time points after inoculation (e.g. 7 days after inoculation), in a plant line or variety comprising the mutant slaap5a and/or slaap5b allele in homozygous form, compared to a susceptible control plant line or variety (e.g. variety Moneymaker) comprising the wild type SlAAP5A allele and wild type SlAAP5B allele in homozygous form when grown under the same conditions. The plant line comprising the mutant slaap5a and/or slaap5b allele in homozygous form would be considered to have reduced susceptibility when the average symptom development, especially at the average lesion area, is significantly less compared to the average lesion area in the susceptible control (such as variety Moneymaker), e.g. the average lesion area seen in the plant comprising a mutant slaap5a and/or slaap5b allele in homozygous form is reduced by at least 10%, 20%, 30%, 40%, 50%, 60% or more compared to the average lesion area of the control. See Examples for a suitable disease assay for assessing average lesion area. In FIG. 4, the average lesion area of the lines is reduced by 46% (e.g. line 81) to 64% (e.g. line 76) compared to the control (line MM).

In the assays also symptoms on a plant line or variety heterozygous for slaap5a and/or slaap5b may be assessed. Such plants may also show e.g. reduced average lesion area compared to the susceptible control, although this may be less strong than in the plants comprising one or both of the mutant alleles in homozygous form.

An endogenous tomato SlAAP5A gene (or an SlAAP5A allele thereof) is a gene (or allele) encoding a (wild type, functional) SlAAP5A protein which comprises at least 90% or more sequence identity to the tomato SlAAP5A protein of SEQ ID NO: 3. It comprises an Aa_trans domain as shown in FIG. 1. The presence of an Aa_trans domain can be checked by analysing the amino acid sequence in InterPro, at ebi.ac.uk/interpro/search/sequence-search.

An endogenous tomato SlAAP5B gene (or an SlAAP5B allele thereof) is a gene (or allele) encoding a (wild type, functional) SlAAP5B protein which comprises at least 90% or more sequence identity to the tomato SlAAP5B protein of SEQ ID NO: 4. It comprises an Aa_trans domain as shown in FIG. 1. The presence of a Aa_trans domain can be checked by analysing the amino acid sequence in InterPro, at ebi.ac.uk/interpro/search/sequence-search.

In the plant or plant part comprising said mutant slaap5a allele and/or mutant slaap5b allele, preferably in homozygous form, said mutant slaap5a and/or slaap5b allele results in reduced expression or no expression of the (endogenous, wild type) SlAAP5A gene and/or SlAAP5B gene, respectively, or said mutant slaap5a and/or slaap5b allele encodes a protein having a decreased function or a loss-of-function compared to the wild type SlAAP5A or SlAAP5B protein, respectively, i.e. said mutant allele encodes a mutant slaap5a protein or slaap5b protein.

Thus, as a result of the mutation in the endogenous SlAAP5A and/or SlAAP5B allele, there is either less or even no wild type SlAAP5A or SlAAP5B mRNA transcript being produced by the mutant allele (e.g. if the mutation is in a regulatory sequence of the endogenous allele) in the plant cell and plant, or as a result of the mutation a mutant SlAAP5A protein or SlAAP5B protein is produced by the mutant allele, e.g. comprising one or more amino acids replaced, deleted or inserted compared to the functional wild type protein, thereby leading to a reduced function or loss of function of the (mutant) slaap5a or slaap5b protein. And consequently, when the mutant slaap5a and/or slaap5b allele is in homozygous form in the genome of the plant, the plant will be at least partially resistant against *P. infestans*/less susceptible to *P. infestans* than the plant comprising two functional/wild type SlAAP5A alleles and two functional/wild type SlAAP5B alleles.

No expression of the mutant slaap5a or slaap5b allele means that no transcript (mRNA) is being transcribed from the mutant allele, due to e.g. a mutation in the promoter sequence being present. So if the mutant allele is in homozygous form, the wild type mRNA, encoding the functional protein will not be present in plant tissue in which it is otherwise present in the susceptible control (comprising the wild type alleles), such as e.g. roots, seedling, leaf, flower and fruit. An allele having no expression may also be referred to as a knock-out allele herein.

Reduced (or decreased) expression of the mutant slaap5a allele or of the mutant slaap5b allele means for example that only 50%, or less, of the amount of transcript (mRNA) is transcribed from the mutant allele compared to the wild type allele, or only equal to or less than 40%, 30%, 20%, 10%, or 5% of the amount of transcript (mRNA) is transcribed from the mutant allele compared to the wild type allele. In other words, when the mutant allele is in homozygous form, the wild type mRNA, encoding the functional protein will be present in plant tissue in which it is otherwise present, such as e.g. leaves, roots, seedlings, flower and fruit, but at a significantly lower amount than in a plant which is homozygous for the wild type allele. This will result in significantly less functional wild type protein being present, which in turn results in reduced susceptibility of the plant. An allele having reduced expression may also be referred to as a knock-down allele herein.

The decrease in the expression of slaap5a or slaap5b allele can, for example, be determined by measuring the quantity of RNA transcripts (e.g. mRNA), e.g. by qRT-PCR. Similarly, the decrease in the amount of CsAAP2A or CsAAP2B protein, can, for example, be determined by immunological methods such as Western blot analysis, ELISA (Enzyme Linked Immuno Sorbent Assay) or RIA (Radio Immune Assay).

Here, a decrease preferably means a reduction in the amount of SlAAP5A proteins or SlAAP5B protein by at least 50%, in particular by at least 70%, or by at least 85% and particularly by at least 95%.

In another embodiment the tomato plant or plant part comprises a mutant slaap5a allele, wherein the protein encoded by the mutant slaap5a allele comprising one or more amino acids replaced, inserted or deleted compared to the SlAAP5A wild type protein of SEQ ID NO: 3 (or a functional variant thereof comprising at least 90% sequence identity to SEQ ID NO: 3), especially one or more amino acids replaced, inserted and/or deleted in the conserved Amino Acid Transporter Domain at amino acid 26 to 460 of SEQ ID NO: 3 or in an Amino Acid Transporter Domain comprising at least 95%, 96%, 97%, 98% or 99% sequence identity to amino acid 26 to 460 of SEQ ID NO: 3. Such a protein can have a reduced activity or no activity in vivo.

In another embodiment the tomato plant or plant part comprises a mutant slaap5b allele, wherein the protein encoded by the mutant slaap5b allele comprising one or more amino acids replaced, inserted or deleted compared to the SlAAP5B wild type protein of SEQ ID NO: 4 (or a functional variant thereof comprising at least 90% sequence identity to SEQ ID NO: 4), especially one or more amino acids replaced, inserted and/or deleted in the conserved Amino Acid Transporter Domain at amino acid 31 to 464 of SEQ ID NO: 4 or in an Amino Acid Transporter Domain comprising at least 95%, 96%, 97%, 98% or 99% sequence identity to amino acid 31 to 464 of SEQ ID NO: 4. Such a protein can have a reduced activity or no activity in vivo.

In one embodiment the plant or plant part comprises one of the mutant alleles (in homozygous or heterozygous form) or comprises both of the mutant alleles (double mutant) (in homozygous or heterozygous form).

In one aspect, the tomato plant or plant part comprises a mutant slaap5a allele and/ or a mutant slaap5b allele, wherein the mutant slaap5a allele encodes a protein that is truncated compared to the wild type SlAAP5A protein and/or the mutant slaap5b allele encodes a protein that is truncated compared to the wild type SlAAP5B protein. The truncated protein may comprise additional amino acids, for example a frame shift mutation may result in the truncated protein comprising an amino acid sequence which is different from the amino acid sequence of the wild type protein. A truncated protein can have a reduced activity or even no activity in vivo, especially when all or part of the Aa_trans domain is missing and/or is replaced by different amino acids. Thus in one aspect the mutant slaap5a allele encodes a protein that is truncated compared to the wild type SlAAP5A protein and/or the mutant slaap52b allele encodes a protein that is truncated compared to the wild type SlAAP5B protein, wherein at least one, two, three, four, 5, 6, 7, 8, 9, 10, 15, 20, 30, 40, 50 or more amino acids of the Aa_trans domain are missing or are replaced by different amino acids compared to the wild type protein. In one aspect at least 13, 14, 15, 20, 30, 40, 50 or more amino acids of the C-terminal end of the SlAAP5A or SlAAP5B protein are missing or are replaced by one or more different amino acids compared to the wild type protein.

The 2-dimensional analysis showed that a large part of the SlAAP5A protein and of the SlAAP5B protein consists of the Aa_trans domain. 3-dimensional analysis predicts that both the SlAAP5A protein and the SlAAP5B protein consists of 67% helix structure and 32% loop structures (coils). This means that any amino acid insertion, deletion or replacement, especially of one or more amino acids in the Aa_trans domain, will likely change the 3-dimensional structure of the protein and reduce its in vivo function or even abolish its in vivo function. For example, a mutation which results in a change of a codon into a STOP codon, will result in a truncated protein.

A mutant slaap5a allele encoding a truncated SlAAP5A protein may, thus be an allele which encodes a protein that lacks at least 13, 14, 15, 20, 30, 40, 50, 55, 60, 70, 80, 90, 100, 120, 130, 140, 150, 160, 170, 180, 190, 200, 250, 300, 350, 400 or even more of the C-terminal amino acids compared to the wild type SlAAP5A protein of SEQ ID NO: 3, or of a variant comprising at least 90%, 91%, 92%, 93%, 94%, 95%, 96%, 97%, 98% or 99% sequence identity to SEQ ID NO: 3. FIG. 1 and the Examples disclose two mutant slaap5a alleles, encoding a truncated SlAAP5A protein comprising only amino acids 1 to 75, and 1 to 76, of the wild type protein of SEQ ID NO: 3. Thus, amino acids 76 to 471 of SEQ ID NO: 3 were missing, and amino acids 77 to 471 of SEQ ID NO: 3 were missing, respectively, in these mutant proteins, rendering them to have a loss-of-function.

A mutant slaap5b allele encoding a truncated SlAAP5B protein may be an allele which encodes a protein that lacks at least 13, 14, 15, 20, 30, 40, 50, 55, 60, 70, 80, 90, 100, 120, 130, 140, 150, 160, 170, 180, 190, 200, 250, 300, 350, 400 or even more of the C-terminal amino acids compared to the wild type SlAAP5B protein of SEQ ID NO: 4, or of a variant comprising at least 90%, 91%, 92%, 93%, 94%, 95%, 96%, 97%, 98% or 99% sequence identity to SEQ ID NO: 4. FIG. 1 and the Examples disclose several mutant slaap5b alleles, encoding a truncated SlAAP5B protein comprising only amino acids 1-315, 1-421, 1-296 or 1-316 of the wild type protein of SEQ ID NO: 4. Thus, amino acids 316-476, 422-476, 297-476 or 317-476 of SEQ ID NO: 4 were missing, respectively, in these mutant proteins, rendering them to have a loss-of-function. Even though these truncated proteins differ in the number of amino acids of the Aa_trans domain which are missing, all of them resulted in a loss-of-function, likely because the protein cannot adopt it's 3-D structure. Thus, even when only 43 amino acids at the end of the Aa_trans domain are missing (i.e. the 55 C-terminal amino acids of the protein are missing) the protein lost its in vivo function.

Thus, in one aspect the mutant allele results in a truncated SlAAP5A protein or a truncated SlAAP5B protein being produced, which truncated protein has decreased function or loss-of-function. A truncation may for example result in the loss of the C-terminal end (carboxyl terminal end) of the protein, whereby part or all of the Aa_trans domain is absent. For example only the N-terminal part (amino terminal part) of the protein may still be present. Mutant alleles which express a truncated SlAAP5A protein or a truncated SlAAP5B protein can be induced whereby, for example, a codon in one of the exons is changed into a premature stop codon or splice-site mutations or frame-shift mutations can also lead to premature stop codons and truncated proteins.

In another aspect the mutant allele results in a mutant SlAAP5A or SlAAP5B protein, which comprises one or more amino acids inserted, replaced and/or deleted compared to the wild type protein. As mentioned, especially insertion, replacement and/or deletion of one or more amino acids in the Aa_trans domain will result in a mutant protein that has decreased function or loss of function, and will, in homozygous form in the tomato plant, reduce susceptibility to P. infestans. One example of a line comprising an allele encoding a mutant slaap5a protein is shown in FIG. 1, wherein the 5 amino acids in bold are deleted. In one aspect at least 1, 2, 3, 4, 5, 6, 7, 8, 9, 10 or more amino acids of the Aa_trans domain of the SlAAP5A or SlAAP5B protein are deleted.

Whether the insertion, replacement and/or deletion of one or more amino acids, or a truncation or mutant allele not expressed or having reduced expression as described elsewhere herein, actually results in a reduced susceptibility in vivo can be tested by carrying out a disease assay for a plant comprising the mutant allele (or double mutant) preferably in homozygous form. Optionally the increase in free amino acids following P. infestans infection can be compared between the plant comprising the mutant slaap5a and/or slaap5b allele (preferably in homozygous form) and the susceptible control comprising the wild type alleles (WT) as described in the Examples. A reduced increase in free amino acids, especially in Ala, Gly, Val, Leu, Ile, Thr, Ser, Pro and/or Gln compared to the increase in the susceptible control (comprising functional wild type SlAAP5A and SlAAP5B alleles) may in one aspect indicates that the mutant allele has reduced function or a loss of function in vivo.

In yet another aspect the mutant allele results in reduced expression or no expression of the allele and thus reduced amounts or no protein of the wild type SlAAP5A or SlAAP5B protein being produced in the plant or plant part. For example, the promoter or another regulatory element of the SlAAP5A or SlAAP5B allele may be comprise one or more nucleotides inserted, deleted and/or replaced.

Thus, a mutant allele of a SlAAP5A protein-encoding gene and/or SlAAP5B protein-encoding gene causes a plant to have reduced susceptibility to P. infestans, at least when the plant is homozygous for the mutant allele. Concerning the embodiments of the invention, the mutation in the mutant allele of a SlAAP5A protein-encoding gene and/or SlAAP5B protein encoding gene (i.e. in the mutant slaap5a allele and/or slaap5b allele) can be any mutation, including one or more deletions, truncations, insertions, point mutations, nonsense mutations, missense or non-synonymous mutations, splice-site mutations, frame shift mutations and/or mutations in regulatory sequences (for example in the promoter sequence).

In one aspect the mutation in the mutant slaap5a allele and/or slaap5b is a point mutation. The mutation can occur in a DNA sequence comprising the coding sequence of a SlAAP5A protein-encoding gene or SlAAP5B protein-encoding gene, or in a RNA sequence encoding a SlAAP5A protein or SlAAP5B protein, or it can occur in the amino acid molecule of the SlAAP5A or SlAAP5B protein.

Concerning a DNA sequence of SlAAP5A protein-encoding gene or SlAAP5B protein-encoding gene, the mutation can occur in the coding sequence (cds, composed of the exons) or it can occur in non-coding sequences like 5'- and 3'-untranslated regions, introns, promoters, enhancers etc. In respect to RNA encoding a SlAAP5A protein or SlAAP5B protein, the mutation can occur in the pre-mRNA or the mRNA. In one aspect the mutant allele results in the protein having a loss-of-function or decrease of function due to one or more amino acids being replaced, inserted and/or deleted, for example resulting in one or more amino acids being replaced, inserted or deleted in the conserved Aa_trans domain. For example, truncation of the protein to cause deletion of the Aa_trans domain, or part thereof, will result in a loss of function or decrease of function of the protein.

A further embodiment of the invention therefore concerns tomato plant cells or plants according to the invention comprising a mutant allele of a SlAAP5A protein-encoding gene and/or of a SlAAP5B protein-encoding gene, characterized in that the mutant slaap5a allele and/or mutant slaap5b allele comprises or effects one or more of the mutations selected from the group consisting of
  a) a deletion, truncation, insertion, point mutation, nonsense mutation, missense or non-synonymous mutation, splice-site mutation, frame shift mutation in the genomic sequence;
  b) a mutation in one or more regulatory sequences;
  c) a deletion, truncation, insertion, point mutation, nonsense mutation, missense or non-synonymous mutation, splice-site mutation, frame shift mutation in the coding sequence;
  d) a deletion, truncation, insertion, point mutation, nonsense mutation, missense or non-synonymous mutation, splice-site mutation, frame shift mutation in the pre-mRNA or mRNA; and/or
  e) a deletion, truncation, insertion or replacement of one or more amino acids in the SlAAP5A or SlAAP5B protein.

A different embodiment of the invention concerns tomato plant cells, plant parts or plants comprising or synthesising an mRNA encoding a SlAAP5A protein and/or SlAAP5B protein, wherein the mRNA encoding a SlAAP5A protein or SlAAP5B protein has one or more mutations selected from the group consisting of
  a) a deletion mutation;
  b) a missense or non-synonymous mutation;
  c) a frame shift mutation; and/or
  d) a non-sense mutation.

In another embodiment of the invention, plant cells or plants according to the invention comprise or synthesise an mRNA encoding a SlAAP5A protein and/or SlAAP5B protein having one or more mutations, wherein the mRNA is transcribed from a mutant allele of a SlAAP5A protein-encoding gene and/or from a mutant allele of a SlAAP5B protein-encoding gene. Comprised by these embodiments of the invention are plant cells, plant parts or plants according to the invention comprising or synthesising an mRNA transcribed from a mutant allele of a SlAAP5A protein-encoding gene and/or SlAAP5B protein encoding gene, characterized in that the mRNA comprises a deletion mutation and/or a missense or non-synonymous mutation and/or a frame shift mutation and/or a non-sense mutation, compared to the corresponding (DNA) coding sequence of the mutant allele of the SlAAP5A or SlAAP5B protein-encoding gene from which the mRNA is transcribed. Thus, in one aspect any mutation which affects pre-mRNA splicing is encompassed, i.e. which modifies the normal pre-mRNA splicing process, thereby leading to a different mRNA molecule.

An "mRNA coding sequence" shall have the common meaning herein. An mRNA coding sequence corresponds to the respective DNA coding sequence of a gene/allele apart from that thymine (T) is replaced by uracil (U).

In one aspect the tomato plant or plant part is homozygous for a mutant slaap5a allele and/or for a mutant slaap5b allele described herein. Because both the SlAAP5A gene and the SlAAP5B gene are deemed to be recessive, the reduction in susceptibility is seen phenotypically when the plant is homozygous for one or both of the mutant alleles, although it is not excluded that an effect may also be seen when the plant is heterozygous for one or both mutant alleles.

In one aspect the mutant slaap5a and/or slaap5b allele is an induced mutant allele, while in a different aspect the mutant slaap5a and/or slaap5b allele is a "natural mutant" allele introgressed into cultivated tomato by e.g. backcrossing.

Mutant alleles can be generated by methods known in the art, such as chemical mutagenesis (e.g. EMS treatment), radiation mutagenesis (UV, gamma rays etc.), targeted mutagenesis, such as Crispr/Cas9 or TALENS.

Biotechnological methods for introducing mutations into a desired gene/allele of a plant cell or plant are known in the art. Therefore, mutant alleles of a SlAAP5A and/or SlAAP5B protein-encoding gene can be produced in plant cells or plants by using these methods. Examples for such technologies are in particular mutagenesis techniques or enzymes which induce double stranded DNA breaks (double stranded DNA break inducing enzyme (DSBI)) in the genome of plants. Known and practised technologies are rare-cleaving endonucleases and custom-tailored rare-cleaving endonucleases including but not limited to homing endonucleases, also called meganucleases, transcription activator-like effectors fused to the catalytic domain of a nuclease (TALENs) and so-called CRISPR systems. CRISPR systems is used broadly herein, and does not only encompass the use of the Cas9 nuclease (Crispr/Cas9 system), but also other Crispr systems e.g. using other nucleases, such as Cpf1. These techniques can also be referred to as targeted genome editing techniques or gene editing techniques or targeted mutagenesis techniques.

Thus, technologies such as mutagenesis or targeted genome editing techniques are eligible for introducing a mutation into genes in plant cells or plants. Therefore, plant cells and plants according to the invention having a mutant allele of a SlAAP5A and/or SlAAP5B protein-encoding gene, wherein the mutation into the mutant allele was introduced by genome editing techniques, e.g. using rare-cleaving endonucleases or custom-tailored rare-cleaving endonucleases, are also an embodiment of the invention. Concerning custom-tailored rare-cleaving endonucleases the mutation in the mutant allele of SlAAP5A and/or SlAAP5B protein has preferably been introduced by a meganuclease, a TALENs or a CRISPR system.

In tomato parthenocarpy has been generated by targeted mutagenesis using Crispr/Cas9 by disrupting the function of the SlIAA9 gene in Micro-Tom and cultivar Alissa Craig (see Ueta et al. 2017, Scientific Reports volume 7, Article number: 507). Use of the Crispr system in tomato is therefore known to the person skilled in the art.

Thus, in one aspect the mutant slaap5a and/or slaap5b alleles are induced mutants, e.g. induced in a breeding line, an inbred line or variety of cultivated tomato. In one aspect the induced mutant allele is induced in a wild tomato or wild relative of tomato. The allele may then be transferred into cultivated tomato by traditional breeding techniques. In one aspect the mutant alleles are generated by mutagenesis (e.g.

chemical or radiation mutagenesis) or by targeted mutagenesis, especially using the CRISPR system (e.g. Crispr/Cas9 or Crispr/Cpf1 or other nucleases). In one aspect the cultivated tomato plant comprising the mutant slaap5a and/or slaap5b alleles is not a transgenic plant, i.e. non-transgenic progeny are selected which do not comprise e.g. the CRISPR construct.

The cultivated tomato plant may be of any type, such as a tomato plant for fresh tomato consumption or a processing tomato plant. Tomato fruits may be of any size and color. Tomato fruits may for example have a shape selected from the group consisting of cherry, bell, blocky, currant, deep round oval or roma, flattened globe, grape, long blocky, long pointed, oxheart, pear, beefsteak, round, small pear, small pointed, stuffer, and plum. In one embodiment the plant of the invention produces tomato fruits for fresh market consumption. In another embodiment the plant of the invention produces tomato fruits for processing. The tomato plant may be determinate or indeterminate.

Apart from the de novo generation of (induced) mutant slaap5a and slaap5b alleles, the invention also enables screening of wild tomato plants (e.g. landraces, PI accessions, CGN accessions, etc.) for the presence of "natural mutant" alleles. Such newly found natural mutant slaap5a and/or slaap5b alleles can then be introgressed into cultivated tomato, to generate cultivated tomato plants comprising reduced susceptibility to *P. infestans*. The invention also relates to method for identifying wild accessions comprising mutant slaap5a and/or slaap5b alleles, comprising screening accessions for mutations in either or both of these alleles.

Thus, mutant alleles can also evolve naturally in populations of wild tomato plants, e.g. wild relatives of tomato. In one aspect the mutant slaap5a and/or slaap5b alleles are natural mutant alleles, which have been introgressed into cultivated tomato. The wild type allele found in cultivated tomato on chromosome 6 or 11 is then replaced with the natural mutant allele, i.e. by meiotic recombination between homologous chromosomes. Wild plants can be screened for the presence of such natural mutant alleles and backcrossing to cultivated tomato can be used to introgress the natural mutant allele into the cultivated tomato genome.

Thus in one aspect a plant or plant part of the species *Solanum lycopersicum* is provided, comprising an introgression fragment from a wild tomato or wild relative of tomato, said introgression fragment comprises a mutant allele of a gene named SlAAP5A, said gene encodes a SlAAP5A protein of SEQ ID NO: 3 or a protein comprising at least 90%, 91%, 92%, 93%, 94% or 95% sequence identity to SEQ ID NO: 3, and/or a mutant allele of a gene named SlAAP5B, said gene encoding a SlAAP5B protein of SEQ ID NO: 4 or a protein comprising at least 90%, 91%, 92%, 93%, 94% or 95% sequence identity to SEQ ID NO: 4, wherein said mutant slaap5a and/or slaap5b allele results in reduced expression or no expression of the mutant allele or encodes a protein having a decreased function or a loss-of-function compared to the wild type protein.

In one aspect the introgression fragment comprises a natural mutant allele. In another aspect the introgression fragment comprises an induced mutant allele.

In one aspect wild tomato plants, or wild relatives of tomato are screened for the presence of a natural mutant slaap5a or slaap5b allele. This can be done by e.g. analysing (directly or indirectly) the genomic DNA, mRNA (or cDNA) or protein of the SlAAP5A or SlAAP5B gene, using e.g. PCR methods or other molecular methods known in the art, such as sequencing, etc. whereby the presence of a mutant slaap5a or slaap5b allele can be determined. The wild tomato plants or wild relatives of tomato may be CGN accessions, PI accessions (Plant Introductions), or accessions from various seed bank collections. Once an accession is identified to comprise a mutant slaap5a or slaap5b allele, the accession can be crossed to cultivated tomato, and the mutant allele can be introgressed into the genome of cultivated tomato by e.g. backcrossing. The cultivated tomato introgression line is preferably selfed one or more times to ensure the mutant allele is in homozygous form and the line can then be tested for reduced susceptibility to *P. infestans* compared to e.g. the original cultivated tomato plant (e.g. the recurrent parent) comprising the wild type, functional SlAAP5A and SlAAP5B alleles in homozygous form.

The cultivated tomato plant described herein, comprising either an induced mutant or a natural mutant slaap5a and/or slaap5b allele in its genome preferably comprises either or both mutant alleles in homozygous form, as the reduced susceptibility against *P. infestans* is at least seen when the allele is in homozygous form. Plants comprising either or both mutant alleles in heterozygous form are also encompassed herein.

Also encompassed herein is a method for identifying a natural mutant lsaap5a and/or a natural mutant lsaap5b allele. The method involves determining whether a wild tomato or wild relative of tomato comprises a natural mutant allele and optionally transferring the natural mutant allele into cultivated tomato by traditional breeding techniques. Wild plant accessions are generally very heterogenous and also may comprise various other genes which affect *P. infestans* resistance. The effect of the mutant allele on the susceptibility of the plant will be difficult to assess in the wild accession and the mutant allele is preferably first transferred into a breeding line, preferably a breeding line which is susceptible to *P. infestans*. In one embodiment therefore a method for transferring a natural mutant csaap2a and/or a natural mutant csaap2b allele from a wild tomato plant into a cultivated tomato plant is provided, comprising
  a) identifying or providing a wild tomato comprising a natural mutant lsaap5a and/or lsaap5b allele
  b) crossing the mutant allele(s) into cultivated tomato, preferably a cultivated tomato line which is susceptible to *P. infestans*, and
  c) determining the effect of the mutant allele on the susceptibility to *P. infestans*.

The same can of course be done for induced mutant alleles, which may be induced in wild tomato, whereby in step a) one provides or identifies a wild tomato comprising an induced mutant allele. The method may then be preceded by a step wherein mutations are induced.

The cultivated tomato plant comprising a mutant slaap5a and/or a mutant slaap5b allele according to the invention may be of any type, e.g. it may be of one of the following tomato types: fresh tomato, processing tomato, determinate tomato, indeterminate tomato, high-tech tomato (for growth in high tech greenhouses), field grown tomato. In one aspect the cultivated tomato plant according to the invention is an inbred line or a F1 hybrid.

The cultivated tomato plant according to the invention may be an inbred line, an OP (open pollinated variety) or an F1 hybrid. In one aspect the F1 hybrid comprises a mutant slaap5a and/or slaap5b allele in preferably homozygous form.

The cultivated tomato plant preferably has good agronomic and good fruit quality characteristics. The cultivated tomato plant is in one aspect uniform, both genetically and phenotypically, e.g. regarding plant height, leaf size, leaf length, internode length, etc. Especially fruit characteristics are uniform, e.g. regarding total solids, pH, Brix, sugar content, uniformity of fruit size, fruit weight, fruit size, skin colour, fruit flesh colour, fruit per cluster, yield per plant, nutritional value of the fruit, speed of ripening, ease of harvestingetc. Likewise seed characteristics (i.e. characteristics of the seeds from which the plant is grown) are uniform, e.g. seed size, seed color, etc.

Also a seed is provided from which a plant or plant part according to the invention can be grown.

Further a tomato fruit produced by a plant according to the invention is provided, wherein the fruit comprises the mutant slaap5a and/or slaap5b allele, preferably in homozygous form.

Likewise plant parts of a plant according to the invention are provided, wherein the plant part is a cell, a flower, a pistil, a leaf, a stem, a petiole, a cutting, a tissue, a seed coat, an ovule, pollen, a root, a rootstock, a scion, a fruit, a cotyledon, a hypocotyl, a protoplast, an embryo, an anther. The plant part comprises in its genome a mutant slaap5a and/or a mutant slaap5b allele of the invention, preferably in homozygous form. In one aspect the cell is a non-propagating cell. In one aspect the cell is a non-propagating or a non-regenerable cell. In one aspect the non-propagating or non-regenerable cell is part of a tissue or organ of the plant. In a different aspect the non-propagating or non-regenerable cell is in a cell culture or tissue culture.

Also a cell culture or a tissue culture of cells or tissues comprising in its genome a mutant slaap5a and/or a mutant slaap5b allele of the invention is encompassed herein. Further a plant regenerated from such a cell or tissue culture is encompassed.

Further a vegetatively propagated plant propagated from a plant part according to the invention is provided.

Also a food or feed product comprising cells according to the invention are provided, such as parts of tomato fruits.

In one embodiment a method of tomato fruit production is provided, said method comprising growing a plant according to the invention, comprising a mutant slaap5a and/or slaap5b allele preferably in homozygous form, said method optionally comprising a reduced treatment with fungicides compared to a susceptible control plant, e.g. a plant comprising a wild type SlAAP5A allele and a wild type SlAAP5B allele in homozygous form, and optionally harvesting the fruits produced by said plants. As the plant is less susceptible to P. infestans, less fungicide treatment (lower amounts and/or less frequent applications of fungicides) is needed. A reduced treatment with fungicides may be either a lower amount of fungicide being applied, and/or fewer applications of fungicide applied during the cultivation period. This encompasses no fungicide treatment. As the plants, if infected with P. infestans will develop significantly smaller average lesion sizes, any fungicide treatment effective against P. infestans can optionally be reduced or omitted, saving costs. How to reduce the dosage or application schemes of various fungicides effective against P. infestans can be determined by establishing spray guides, as for example published by Meadows et al., 2018 Fungicide Spray Guide for Tomato in North Carolina, found on the world wide web at vegetables.ces.ncsu.edu/wp-content/uploads/2017/12/2018-NCSU-Fungicide-Spray-Guide-for-Tomato-in-North-Carolina.pdf?fwd=no.

P. infestans infects tomato plants in both the field and the greenhouse, therefore in the above method plants of the invention are grown either in the field or in greenhouses.

The pathogen has a high potential to become resistant to fungicides. It has for example been described to have developed resistance to metalaxyl. Less fungicide treatment will reduce the risk of resistance developing.

As mentioned previously, mutant slaap5a and/or slaap5b alleles can be induced, i.e. the can be generated by mutating the endogenous SlAAP5A and/or SlAAP5B allele in cultivated tomato seeds or plants or plant parts (or optionally in wild plants) and/or by selecting induced mutant alleles in e.g. tissue culture or from TILLING populations.

Therefore, methods for producing and/or selecting plants having mutant slaap5a and/or slaap5b alleles, resulting in a knock-down or knock-out of gene expression and consequently less or no wild type protein being produced, or mutant alleles encoding mutant proteins having a decreased function or loss-of-function compared to the wild type protein are encompassed herein. To generate such mutant alleles conventional mutagenic agents, like chemicals or high energy radiation (e.g. x-rays, neutron radiation, gamma radiation or UV radiation) may be used. It is also possible to generate mutant alleles by means of biotechnology methods as described above (e.g. targeted gene editing technology).

In one aspect the invention provides a method for generating and/or identifying a tomato plant comprising a mutant allele of a gene named SlAAP5A, said gene encodes a SlAAP5A protein of SEQ ID NO: 3 or a protein comprising at least 90%, 91%, 92%, 93%, 94% or 95% sequence identity to SEQ ID NO: 3, comprising identifying or selecting a plant in a mutant tomato population, or progeny thereof obtained by selfing, comprising a mutant slaap5a allele, or generating a tomato plant comprising a mutant slaap5a allele using a targeted genome editing technique, such as a Crispr system (e.g. Crispr/Cas9).

In another aspect the invention provides a method for generating a tomato plant comprising a mutant allele of a gene named SlAAP5B, said gene encodes a SlAAP5B protein of SEQ ID NO: 4 or a protein comprising at least 90%, 91%, 92%, 93%, 94% or 95% sequence identity to SEQ ID NO: 4, comprising identifying or selecting a plant in a mutant tomato population, or progeny thereof obtained by selfing, comprising a mutant slaap5b allele, or generating a tomato plant comprising a mutant slaap5b allele using a targeted genome editing technique, such as a Crispr system (e.g. Crispr/Cas9).

In a further aspect the invention provides a method for generating a double mutant tomato plant, i.e. comprising mutant alleles of both SlAAP5A and SlAAP5B genes, comprising identifying or selecting a double mutant plant in a mutant tomato population, or progeny thereof obtained by selfing, or combining single mutant tomato plants by crossing to generate double mutant tomato plants, or generating a double mutant tomato plant comprising a mutant slaap5b allele and a mutant slaap5a allele using a targeted genome editing technique, such as a Crispr system (e.g. Crispr/Cas9), or combining single mutant tomato plants by crossing. Thus double mutant plants can be generated by combining single mutant plants by crossing and selecting progeny comprising both mutant alleles or by directly selecting double mutant plants.

A 'mutant tomato population' or 'population of mutant tomato plants' refers to a plurality of tomato seeds or plants or plant parts which have been treated with a conventional mutagenic agent, like chemicals or high energy radiation (e.g. x-rays, neutron radiation, gamma radiation or UV radiation) or progeny thereof obtained by selfing, to ensure that mutations are in homozygous form. These can be plants or seeds or plant parts of a cultivated tomato breeding line, variety, inbred line or any plurality of cultivated tomato plants or seeds or parts thereof Alternatively the may be wild tomato plants or wild relatives of tomato.

Tomato plants according to the invention, comprising reduced susceptibility to *P. infestans*, can be produced by introducing one or more mutations into an allele of a SlAAP5A protein-encoding gene and/or into an allele of a SlAAP5B protein-encoding gene.

A further embodiment of the present invention, therefore, concerns a method for production of a tomato plant comprising the steps of a) providing a population of mutant tomato plants,
b) optionally selecting a plant which is less susceptible to *P. infestans* than a non-mutated plant,
c) determining if a plant of the mutant population of a) or selected under b) has a mutation in an allele of a SlAAP5A protein-encoding gene and/or in an allele of a SlAAP5B protein-encoding gene, optionally
d) growing/cultivating the plants obtained under c).

In one aspect is a method for production of a tomato plant comprising the steps of a) introducing mutations in a population of tomato plants (and optionally selfing the plants),
b) optionally selecting a plant which is less susceptible to *P. infestans* than a non-mutated plant,
c) determining if the plant selected under b) has a mutation in an allele of a SlAAP5A protein-encoding gene and/or in an allele of a SlAAP5B protein-encoding gene and selecting a plant comprising such a mutation, and optionally
d) growing/cultivating the plants obtained under c).

However, in one aspect the order of the steps can also be different, comprising:

a) providing a population of mutant tomato plants,
b) determining if a plant of the mutant population of a) has a mutation in an allele of a SlAAP5A protein-encoding gene and/or in an allele of a SlAAP5B protein-encoding gene, optionally
c) selecting a plant comprising a mutation in an allele of a SlAAP5A protein-encoding gene and/or in an allele of a SlAAP5B protein-encoding gene, and optionally
d) selfing the plant of b) or c) to generate a plant comprising the mutant allele in homozygous form, and optionally
e) determining if the plant of step c) or d) is less susceptible to P. infestans than a non-mutated plant.

Or the steps may comprise:

a) introducing mutations in a population of tomato plants (and optionally selfing the plants)
b) determining if a plant of a) has a mutation in an allele of a SlAAP5AA protein-encoding gene and/or in an allele of a SlAAP5B protein-encoding gene and optionally
c) selecting a plant comprising such a mutation, and optionally
d) selfing the plant of b) or c) to generate a plant comprising the mutant allele in homozygous form, and optionally
e) determining if the plant of step c) or d) is less susceptible to P. infestans than the non-mutated plant.

A non-mutated plant may be e.g. a susceptible control plant, such as a plant comprising wild type, functional SlAAP5A and SlAAP5B alleles in homozygous form, e.g. cultivar Moneymaker.

Optionally, the methods comprises selecting a plant comprising at least one copy of a mutant allele of a gene encoding a SlAAP5A or SlAAP5B protein. The selected plants are also encompassed.

Chemical substances, which can be used to produce chemically induced mutations, and the mutations resulting from the effect of the corresponding mutagens are, for example described in Ehrenberg and Husain, 1981, (Mutation Research 86, 1-113), Müller, 1972 (Biologisches Zentralblatt 91 (1), 31-48). The production of rice mutants using gamma radiation, ethyl methane sulphonate (EMS), N-methyl-N-nitrosurea or sodium azide ($NaN_3$) is described, for example, in Jauhar and Siddiq (1999, Indian Journal of Genetics, 59 (1), 23-28), in Rao (1977, Cytologica 42, 443-450), Gupta and Sharma (1990, Oryza 27, 217-219) and Satoh and Omura (1981, Japanese Journal of Breeding 31 (3), 316-326). The production of wheat mutants using $NaN_3$ or maleic hydrazide is described in Arora et al. (1992, Annals of Biology 8 (1), 65-69). An overview of the production of wheat mutants using different types of energy-rich radiation and chemical substances is presented in Scarascia-Mugnozza et al. (1993, Mutation Breeding Review 10, 1- 28). Svec et al. (1998, Cereal Research Communications 26 (4), 391-396) describes the use of N-ethyl-N-nitrosurea for producing mutations in triticale. The use of MMS (methyl methane sulphonic acid) and gamma radiation for the production of millet mutants is described in Shashidhara et al. (1990, Journal of Maharashtra Agricultural Universities 15 (1), 20-23).

All these methods are basically suitable in the method for production of a plant according to the invention for producing mutant alleles in genes encoding a SlAAP5A or SlAAP5B protein.

The plants generated and/or selected by these methods are also an embodiment of the invention. These plants can be used to make breeding lines and varieties comprising the mutant alleles.

Selecting plants having reduced susceptibility to *P. infestans* can be done in a disease assay as e.g. described in the Examples. As the phenotype is seen at least in homozygous condition, selfing of the plant or of the population of mutagenized plants is preferred before phenotyping. Mutations in the appropriate alleles, in particular in alleles of SlAAP5A protein-encoding gene or SlAAP5B protein-encoding gene, can be found with the help of methods known to the person skilled in the art. In particular, analyses based on hybridisations with probes (Southern Blot), amplification by means of polymerase chain reaction (PCR), e.g. RT-PCR, sequencing of related genomic sequences and the search for individual nucleotide exchanges can be used for this purpose. Methods, which allow several plants to be investigated for mutations in certain genes in a short time, are particularly suitable. Such a method, so-called TILLING (Targeting Induced Local Lesions IN Genomes), has been described by McCallum et al. (2000, Plant Physiology 123, 439-442).

Other methods for identifying if a plant cell or plant comprises a mutant allele of a SlAAP5A and-or SlAAP5B protein-encoding gene comprise sequencing of the respective alleles and SNP marker analyses with methods common in the art and e.g. discussed in Thomson (2014, Plant Breeding and Biotechnology 2,195-212). Also analysis of SlAAP5A or SlAAP5B mRNA being expressed, and optionally quantified, can be used, e.g. to identify mutants having reduced or no gene expression.

These methods are basically suitable for identifying plant cells according to the invention and plants according to the invention having a mutant allele of a SlAAP5A and-or SlAAP5B protein-encoding gene.

In one aspect, a method for identifying a tomato plant or plant part or cell comprising in its genome at least one copy of a mutant allele of SlAAP5A and/or SlAAP5B gene is provided, said method comprising determining whether the plant, plant part or cell comprises in its genome at least one mutant slaap5a allele and/or slaap5b allele.

The tomato plant or plant part may be a cultivated tomato or a wild tomato or wild relative of tomato.

This method may involve analysing (directly or indirectly) the gene expression of the slaap5a allele and/or slaap5b allele, and/or the genomic nucleotide sequence of the slaap5a allele and/or slaap5b allele, or the mRNA nucleotide sequence of the slaap5a allele and/or slaap5b allele, or the protein sequence of the SlAAP5A or SlAAP5B protein, or the protein amounts of the SlAAP5A or SlAAP5B protein of the plant or plant part or plant cell, to determine if the gene expression is knocked down or knocked out compared to the wild type plant or plant part or plant cell, or if the encoded protein comprises one or more amino acid insertions, deletions or replacements compared to the wild type SlAAP5A or SlAAP5B protein.

One method for analysing the presence of a mutant slaap5a allele and/or slaap5b allele, is for example to assay the presence of a Single Nucleotide Polymorphism (SNP) between the genomic sequence of the mutant slaap5a allele and/or slaap5b allele and the wild type SlAAP5A and/or Slaap5B allele, by, for example, designing primers for the SNP and genotyping plants or plant parts for the genotype of that particular SNP. For example a KASP assay can be used for detecting a SNP and thereby detecting the mutant allele.

Likewise primers can be designed for allele specific DNA amplification, e.g. distinguishing a wild type allele from a mutant allele. Such PCR primers can be designed based on the differences between the wild type and the mutant allele. So if the mutant allele comprises a deletion of one or more nucleotides, e.g. in a coding sequence, the primers can be designed to differentiate between the presence of the mutant allele and the wild type allele. The skilled person can easily develop a molecular assay to detect a mutant allele. So one aspect of the invention comprises a method for determining whether a tomato plant, plant part or plant cell comprises one or more copies of a mutant slaap5a allele and/or slaap5b allele by a method selected from analysing one or more nucleotides of the genomic slaap5a allele and/or slaap5b allele, analysing the mRNA (or cDNA) expressed by the slaap5a allele and/or slaap5b allele or analysing the SlAAP5A or SlAAP5B protein amount and/or amino acid sequence (using e.g., antibody based detection).

Thus, a method for determining whether a tomato plant or plant part comprises at least one copy of a mutant allele of a gene named SlAAP5A is provided, said gene encodes a SlAAP5A protein of SEQ ID NO: 3 or a protein comprising at least 90%, 91%, 92%, 93%, 94% or 95% sequence identity to SEQ ID NO: 3, said method comprising analysing the SlAAP5A DNA, RNA or protein of the plant or plant part. And a method for determining whether a tomato plant or plant part comprises at least one copy of a mutant allele of a gene named SlAAP5B is provided, said gene encodes a SlAAP5B protein of SEQ ID NO: 4 or a protein comprising at least 90%, 91%, 92%, 93%, 94% or 95% sequence identity to SEQ ID NO: 4, said method comprising analysing the SlAAP5B DNA, RNA or protein of the plant or plant part.

In one aspect, especially in respect of the European Patent Convention, the tomato plant according to the invention is "not obtained exclusively by an essentially biological process", or in one aspect the mutant slaap5a and/or slaap5b allele is not a natural mutant allele. If such a disclaimer is present in the claim of the European patent, it should be noted that using a tomato plant comprising a mutant allele (e.g. a commercial variety of the applicant) to cross the mutant allele into a different background of tomato will still be seen as falling under the claim, even though an exclusively essentially biological process (only crossing and selection) may have been used to transfer the allele into a different background.

In one aspect any of the described cucumber or tomato plants and plant parts and cells comprising one or more mutant alleles according to the invention are not transgenic, i.e. they do not comprise a foreign DNA introduced into their genome by transformation. In case of targeted genome editing techniques having been used, the foreign DNA used to generate the mutation(s) has been removed again.

Summary of Various Embodiments for Tomato

In one embodiment a plant or plant part of the species *Solanum lycopersicum* is provided comprising at least one copy of a mutant allele of a gene named SlAAP5B, said gene encodes a SlAAP5B protein of SEQ ID NO: 4 or a protein comprising at least 90%, 91%, 92%, 93%, 94% or 95% sequence identity to SEQ ID NO: 4, wherein said mutant allele results in reduced expression or no expression of the SlAAP5B gene or wherein the mutant allele encodes a protein having a decreased function or a loss-of-function compared to the wild type SlAAP5B protein.

The plant or plant part according to the above embodiment, wherein said mutant allele confers reduced susceptibility to the oomycete *Phytophthora infestans* at least when the mutant allele is in homozygous form compared to a plant or plant part homozygous for the wild type allele of the SlAAP5B gene.

The plant or plant part according to any one of the preceding embodiments, wherein said protein comprising one or more amino acids replaced, inserted or deleted compared to the SlAAP5B wild type protein, especially one or more amino acids replaced, inserted or deleted in the conserved Amino Acid Transporter Domain at amino acid 31 to 464 of SEQ ID NO: 4 or in an Amino Acid Transporter Domain comprising at least 95%, 96%, 97%, 98% or 99% sequence identity to amino acid 31 to 464 of SEQ ID NO: 4.

The plant or plant part according to any one of the preceding embodiments wherein the mutant allele is an induced allele or a natural mutant allele.

The plant or plant part according to any one of the preceding embodiments wherein the mutant allele encodes a protein that is truncated compared to the wild type protein.

The plant or plant part according to any one of the preceding embodiments, wherein said plant or plant part is preferably homozygous for the mutant allele.

The plant or plant part according to any of the preceding embodiments, wherein said plant or plant part further comprises at least one copy of a mutant allele of a gene named SlAAP5A, said gene encodes a SlAAP5A protein of SEQ ID NO: 3 or a protein comprising at least 90%, 91%, 92%, 93%, 94% or 95% sequence identity to SEQ ID NO: 3.

A seed from which a plant or plant part according to any of the preceding embodiments can be grown.

A fruit produced by a plant according to any one of the preceding embodiments, wherein the fruit comprises the mutant slaap5b allele preferably in homozygous form, and optionally comprises a mutant slaap5a allele, preferably in homozygous form.

The plant part according to any one of the preceding embodiments, wherein the plant part is a cell, a flower, a pistil, a leaf, a stem, a petiole, a cutting, a tissue, a seed coat, an ovule, pollen, a root, a rootstock, a scion, a fruit, a cotyledon, a hypocotyl, a protoplast, an embryo, an anther.

A vegetatively propagated plant propagated from a plant part according to the above embodiment.

A method of tomato fruit production, said method comprising growing a plant according to any one of the preceding embodiments comprising the mutant slaap5b allele in preferably homozygous form, said method comprising a reduced treatment with fungicides compared to a susceptible control plant and optionally harvesting the fruits produced by said plants. A reduced treatment with fungicides may be either a lower amount of fungicide being applied, and or fewer applications of fungicide applied during the cultivation period. This encompasses no fungicide treatment. As the plants, if infected with P. infestans will develop significantly smaller average lesion sizes, any fungicide treatment effective against P. infestans can optionally be reduced or omitted, saving costs.

A method for generating a tomato plant comprising a mutant allele of a gene named SlAAP5B, said gene encodes a SlAAP5B protein of SEQ ID NO: 4 or a protein comprising at least 90%, 91%, 92%, 93%, 94% or 95% sequence identity to SEQ ID NO: 4, comprising identifying or selecting a plant in a mutant tomato population, or progeny thereof obtained by selfing, comprising a mutant slaap5b allele, or generating a tomato plant comprising a mutant slaap5b allele using a targeted genome editing technique.

A method for determining whether a tomato plant or plant part comprises at least one copy of a mutant allele of a gene named SlAAP5B, said gene encodes a SlAAP5B protein of SEQ ID NO: 4 or a protein comprising at least 90%, 91%, 92%, 93%, 94% or 95% sequence identity to SEQ ID NO: 4, said method comprising analysing the SlAAP5B DNA, RNA or protein of the plant or plant part.

Summary of Further Embodiments for Tomato

In one embodiment a plant or plant part of the species Solanum lycopersicum is provided comprising at least one copy of a mutant allele of a gene named SlAAP5A, said gene encodes a SlAAP5A protein of SEQ ID NO: 3 or a protein comprising at least 90%, 91%, 92%, 93%, 94% or 95% sequence identity to SEQ ID NO: 3, wherein said mutant allele results in reduced expression or no expression of the SlAAP5B gene or wherein the mutant allele encodes a protein having a decreased function or a loss-of-function compared to the wild type SlAAP5A protein.

The plant or plant part according to the above embodiment, wherein said mutant allele confers reduced susceptibility to the oomycete Phytophthora infestans at least when the mutant allele is in homozygous form compared to a plant or plant part homozygous for the wild type allele of the SlAAP5Agene.

The plant or plant part according to any one of the preceding embodiments, wherein said protein comprising one or more amino acids replaced, inserted or deleted compared to the SlAAP5A wild type protein, especially one or more amino acids replaced, inserted or deleted in the conserved Amino Acid Transporter Domain at amino acid 26 to 460 of SEQ ID NO: 3 or in an Amino Acid Transporter Domain comprising at least 95%, 96%, 97%, 98% or 99% sequence identity to amino acid 26 to 460 of SEQ ID NO: 3.

The plant or plant part according to any one of the preceding embodiments wherein the mutant allele is an induced allele or a natural mutant allele.

The plant or plant part according to any one of the preceding embodiments wherein the mutant allele encodes a protein that is truncated compared to the wild type protein.

The plant or plant part according to any one of the preceding embodiments, wherein said plant or plant part is preferably homozygous for the mutant allele.

The plant or plant part according to any of the preceding embodiments, wherein said plant or plant part further comprises at least one copy of a mutant allele of a gene named SlAAP5B, said gene encodes a SlAAP5B protein of SEQ ID NO: 4 or a protein comprising at least 90%, 91%, 92%, 93%, 94% or 95% sequence identity to SEQ ID NO: 4.

A seed from which a plant or plant part according to any of the preceding embodiments can be grown.

A fruit produced by a plant according to any one of the preceding embodiments, wherein the fruit comprises the mutant slaap5a allele preferably in homozygous form and optionally comprises a mutant slaap5b allele, preferably in homozygous form.

The plant part according to any one of the preceding embodiments, wherein the plant part is a cell, a flower, a pistil, a leaf, a stem, a petiole, a cutting, a tissue, a seed coat, an ovule, pollen, a root, a rootstock, a scion, a fruit, a cotyledon, a hypocotyl, a protoplast, an embryo, an anther.

A vegetatively propagated plant propagated from a plant part according to the above embodiment.

A method of tomato fruit production, said method comprising growing a plant according to any one of the preceding embodiments comprising the mutant slaap5a allele preferably in homozygous form, said method in one aspect comprising a reduced treatment with fungicides, or a reduced requirement for fungicide treatment, compared to a susceptible control plant and optionally harvesting the fruits produced by said plants. A reduced treatment with fungicides may be either a lower amount of fungicide being applied, and or fewer applications of fungicide applied during the cultivation period. This encompasses no fungicide treatment. As the plants, if infected with P. infestans will develop significantly smaller average lesion sizes, any fungicide treatment effective against P. infestans can optionally be reduced or omitted, saving costs.

A method for generating a tomato plant comprising a mutant allele of a gene named SlAAP5A, said gene encodes a SlAAP5A protein of SEQ ID NO: 3 or a protein comprising at least 90%, 91%, 92%, 93%, 94% or 95% sequence identity to SEQ ID NO: 3, comprising identifying or selecting a plant in a mutant tomato population, or progeny thereof obtained by selfing, comprising a mutant slaap5a allele, or generating a tomato plant comprising a mutant slaap5a allele using a targeted genome editing technique.

A method for determining whether a tomato plant or plant part comprises at least one copy of a mutant allele of a gene named SlAAP5A, said gene encodes a SlAAP5A protein of SEQ ID NO: 3 or a protein comprising at least 90%, 91%, 92%, 93%, 94% or 95% sequence identity to SEQ ID NO: 3, said method comprising analysing the SlAAP5A DNA, RNA or protein of the plant or plant part.

The specific mutant alleles described herein, e.g. in FIG. 1 or the Examples, are also an embodiment of the invention.

Genetically Modified Plants

In another aspect also genetically modified (transgenic) cucumber and tomato plants, plant parts and plant cells are provided, in which the endogenous gene expression of the CsAAP2A and/or CsAAP2B gene, or the endogenous SlAAP5A and/or SlAAP5B gene is knocked down or knocked out. For example gene silencing constructs can be made and the plant can be transformed with such construct to generate such plants using methods known in the art.

SEQUENCE DESCRIPTION

SEQ ID NO: 1 depicts a functional, wild type CsAAP2A protein.
SEQ ID NO: 2 depicts a functional, wild type CsAAP2B protein.
SEQ ID NO: 3 depicts a functional, wild type SlAAP5A protein.
SEQ ID NO: 4 depicts a functional, wild type SlAAP5B protein.
SEQ ID NO: 5 depicts the CsAAP2A cDNA encoding the protein of SEQ ID NO: 1.
SEQ ID NO: 6 depicts the CsAAP2B cDNA encoding the protein of SEQ ID NO: 2.
SEQ ID NO: 7 depicts the SlAAP5A cDNA encoding the protein of SEQ ID NO: 3.
SEQ ID NO: 8 depicts the SlAAP5B cDNA encoding the protein of SEQ ID NO: 4.
SEQ ID NO: 9 depicts a mutant SlAAP5B protein.
SEQ ID NO: 10 depicts a mutant SlAAP5B protein.
SEQ ID NO: 11 depicts a mutant SlAAP5B protein.
SEQ ID NO: 12 depicts a mutant SlAAP5B protein.
SEQ ID NO: 13 depicts a mutant SlAAP5B protein.
SEQ ID NO: 14 depicts a mutant SlAAP5B protein.
SEQ ID NO: 15 depicts a mutant SlAAP5A protein.
SEQ ID NO: 16 depicts a mutant SlAAP5A protein.
SEQ ID NO: 17 and 18 depicts a primer pair for quantification of CsAAP2A expression.
SEQ ID NO: 19 and 20 depicts a primer pair for quantification of CsAAP2B expression.
SEQ ID NO: 21 depicts a mutant SlAAP5A protein.

EXAMPLES

Example 1—*P. cubensis* Disease Assay 1.1 Plant Material Used:

Plant introduction line PI197088, highly resistant to DM caused by *P. cubensis*, originating from Assam, India, 1951 and obtained from the United States National Plant Germplasm System (NPGS). Breeding line HS279 is a pickling type cucumber, susceptible to DM, with good horticultural characteristics.

From a cross between these genotypes, F3BC3S3 populations were developed using HS279 as recurrent parent.

By repeated backcrossing using marker assisted selection (MAS) we obtained near isogenic lines (NILs), each having small PI 197088-derived introgressions on chromosome 4, in the susceptible background genotype. Instead of a single QTL (DM4.1) three individual loci could be distinguished within a 12 Mb interval, which were named DM4.1.1, DM4.1.2 and DM4.1.3. The individual effects of each of these three QTL on the disease phenotype is markedly different: the first QTL, DM4.1.1, decreased the amount of disease-induced necrosis, or "collapsing", although this effect was not possible to score in absence of the two other DM resistance QTLs. The second QTL, DM4.1.2, decreased the amount of sporulation of the pathogen. The third QTL, DM4.1.3, had a recessively inherited effect on pathogen-induced chlorosis (yellowing), as shown herein below.

1.2 *Pseudoperonospora cubensis* Inoculum Maintenance and Preparation:

An isolate of *P. cubensis* obtained from an infected cucumber field in Haelen, the Netherlands, was maintained on fully expanded cucumber leaves, healthy in appearance before inoculation. Detached leaves were kept in closed boxes containing water-soaked paper towels, and inoculated with a spore suspension developed as described below. Boxes containing inoculated cucumber leaves were kept in a climate chamber under 18° C. (day) and 15° C. (night), with a 16/8h day/night cycle for ten days. Heavily infected detached leaves were preserved at −20° C. as inoculum source for <6 months. Spore suspensions were produced by washing spores from frozen infected leaves using tap water, and filtering through cheesecloth. The spore concentration was measured using a haemocytometer, and adjusted to $3*10^4$ spores/ml.

1.3 Plant Inoculation and Symptom Assessment:

Six near isogenic lines (NILs) comprising only the QTL DM4.1.3 in homozygous form (10 plants per line) and the recurrent parent HS279 (53 plants), were grown in climate chambers with temperatures of 22° C. (day) and 17° C. (night), with a 16/8h day/night cycle, and a relative humidity of 80%.

Cucumber plants for *P. cubensis* disease tests were grown in plastic tents, which were closed the day before inoculation to ensure a high relative humidity. When plants were 2.5 weeks old, both sides of cucumber leaves ($1^{st}$ true leaf) were sprayed with spore suspension prepared as described above. After inoculation, plants were left in darkness at 18/15° C. (day/night) for 24 hours in closed plastic tents. At seven days post inoculation, yellowing (chlorosis), of the inoculated leaves were assessed by eye on a 1-9 scale, 9 being fully green and 1 being fully yellow.

1.4 Results:

Each plant was scored for yellowing (chlorosis) and the number of plants with a score were counted:

| Plant line | No of plants with score 3 | No of plants with score 4 | No of plants with score 5 | No of plants with score 6 | No of plants with score 7 | No of plants with score 8 | No of plants with score 9 | Average score of the line |
| --- | --- | --- | --- | --- | --- | --- | --- | --- |
| NIL-A | | | 5 | 5 | | | | 5.5 |
| NIL-B | | | | 2 | | 8 | | 6.8 |
| NIL-C | | | 5 | | | 5 | | 6.5 |
| NIL-D | | | | 10 | | | | 6.0 |
| NIL-E | | | 2 | 8 | | | | 5.8 |
| NIL-F | | | 2 | 8 | | | | 5.8 |
| HS279 | 2 | 48 | 3 | | | | | 4.0 |

The NIL comprising QTL 4.1.3 in homozygous form therefore showed less yellowing at 7 days after inoculation than the susceptible recurrent parent HS279.

Example 2—*P. cubensis* Induced Chlorosis and Sporulation

Plant Material Used:

A NIL comprising QTL DM4.1.3 in homozygous form (Hom.), in heterozygous form (Het.) and lacking QTL DM4.1.3 (Abs.) and the recurrent parent HS279, as well as a NIL comprising the entire QTL4.1 region (NIL DM 4.1) and PI197088 were grown. Eight plants per genotype were grown.

The plants were grown in plastic tents, which were closed the day before inoculation to ensure a high relative humidity. When plants were 2.5 weeks old, both sides of cucumber leaves (1$^{st}$ true leaf) were sprayed with spore suspension prepared as described above, except that the spore concentration was adjusted to 1×10$^4$ spores/ml. After inoculation, plants were left in darkness at 18/15° C. (day/night) for 24 hours in closed plastic tents. At seven days post inoculation (dpi), yellowing (chlorosis), of the inoculated leaves were assessed by eye on a 1-9 scale, 9 being fully green and 1 being fully yellow. At 12 dpi sporulation was assessed on a scale of 1 to 9, 9 being fully resistant (no sporulation) and 1 being fully susceptible (high sporulation).

The average score of the 8 lines per genotype was determined and a Kruscal-Wallis test (p<0.05) was used to analyse statistically significant differences.

Results:

The Results are shown in FIG. 3. Bars represent average phenotype scores on a 1-9 scale, ranging from susceptible to resistant. Error bars represent standard deviation. Bars with different letters are statistically significant different from one another (Kruscal-Wallis, p<0.05).

The NIL comprising QTL 4.1.3 in homozygous form (Hom.) showed significantly less yellowing/chlorosis at 7 days after inoculation than the NIL comprising QTL 4.1.3 in heterozygous form (Het.) and the NIL lacking QTL 4.1.3 (Abs.). The average yellowing score of both these NILs did not differ significantly from that of the susceptible recurrent parent line HS279. This shows that the effect on the reduction in yellowing/chlorosis is only seen when the QTL 4.1.3 is in homozygous form.

The NIL comprising QTL 4.1.3 in homozygous form (Hom.) also showed significantly less sporulation (measured at 12 dpi) than the susceptible line HS279 and than the NIL lacking QTL 4.1.3 (Abs.). Plants heterozygous for QTL 4.1.3 (Het.) had average sporulation scores in between the homozygous (Hom.) and the plants lacking QTL4.1.3 (Abs), but were not significantly different to either of them.

Example 3—Identification of the CsAAP2A Gene Responsible for NIL QTL4.1.3

In order to identify candidate genes for QTL DM4.1.3, RNA was extracted from three leaves of both NIL DM4.1.3 and the susceptible parent HS279 three days after inoculation with *Pseudoperonospora cubensis*. RNAseq data were generated using a BGISEQ-500 platform, generating 100 bp paired end reads. After filtering the raw data to remove low-quality reads, ca. 50 million reads were obtained per sample. The reads were aligned to the cucumber reference genome (Chinese Long inbred line 9930 v2; Huang et al.: The genome of the cucumber, *Cucumis sativus* L. Nat Genet 2009, 41:1275-1281). Ca. 91% of the reads could be aligned to the reference genome for each of the samples.

Based on fine-mapping data in BC3S3 populations, the interval of QTL DM4.1.3 was confined to Chr4:18,842,456-19,799,960. This interval contains 95 predicted genes, based on the annotated cucumber genome (Chinese long inbred line 9930 v2). 18 genes within the interval were found to be differentially expressed between genotypes NIL DM4.1.3 and HS279. Furthermore, non-synonymous polymorphisms between the two genotypes in the interval of QTL DM4.1.3 were determined.

An Amino Acid Permease (AAP) gene (gene ID: Csa4M573860.1) was selected as a promising candidate gene, based on the finding that this gene was downregulated by a factor 100 in NIL DM4.1.3 compared to HS279, which was highly significant according to the DESeq2 analysis (Benjamini-Hochberg corrected p value=3.07*10$^{-28}$).

TABLE 1

| | differential expression between HS279 and NIL DM4.1.3 | | | | |
|---|---|---|---|---|---|
| Gene ID | Annotation | AE HS279 | AE DM4.1.3 | Fold change | p value |
| Csa4M573860.1 | Amino acid permease | 213 | 2 | 0.01 | 3.07*10$^{-28}$ |

In order to investigate the reason why the AAP gene was very lowly expressed in NIL DM4.1.3, genomic DNA was isolated from both genotypes NIL DM4.1 and susceptible parent HS279. Whole genome sequencing data were obtained using BGISEQ-500 technology, generating 100 bp paired end reads. The alignment of reads to the reference genome in the genomic locus of AAP (Chr4:18,882,370-18,886,704) was manually inspected. Several indications were found of a structural variation in the fourth exon of the AAP gene in genotype NIL DM4.1: double coverage of an eleven bp stretch of the exon, alignment problems of reads at either side of this eleven bp sequence, and flanking reads with mate pairs aligning to different regions of the cucumber reference genome. These three observations led us to hypothesize that there might be an insertion of a transposable element (TE) at this location in the DM 4.1.3 allele of the AAP gene.

To test this hypothesis, PCR reactions were performed on DNA isolated from resistant donor PI 197088, susceptible recurrent parent HS279, partial DM-resistant NIL DM4.1 and partial resistant NIL DM4.1.3, using a primer pair flanking exon four of the AAP gene. Cloning and Sanger sequencing of resulting PCR products revealed the presence of a 7,688 bp insertion in the resistant genotypes compared to the susceptible HS279. This insertion had all the hallmarks of an autonomous Mu-like DNA transposon:

The insertion was flanked by a duplication of 11 bp of the AAP gene (Target site duplication, TSD).

The first and the last 118 bp of the insert are inverted copies of one another (terminal inverted repeats, TIR).

The transposon appeared to contain a 2206 bp long MuDRA transposase gene consisting of a single exon, with high sequence homology (90% identical nucleotide sequences) to the MuDRA transposase characterized by van Leeuwen et al. in the melon CUMULE (Cucumis Mutator-Like Element) transposon.

Whereas the insertion of the CUMULE transposon apparently led to abolishment of AAP expression (Table 1 above), the effect of the insertion on the predicted protein sequence was determined. It was found that the insertion of the TE led to truncation of the AAP protein after amino acid 160, followed by 29 other amino acids. Thus the last 306 amino acids of the wild type protein of 466 amino acids were missing. This indicates that even residual AAP expression will not encode a functional AAP protein, and the TE-allele of the AAP gene is a loss-of-function allele.

Thus, a TE insertion in exon 4 of the endogenous AAP gene was causing the reduced susceptibility of the NIL DM4.1.3. The AAP gene was named CsAAP2A.

Using BLASTp, an additional AAP gene was found on chromosome 4, named CsAAP2B, which encoded an amino acid transporter protein that had high sequence identity to CsAAP2A, see FIG. 1.

Example 4—Amino Acid Profiling of Cucumber Leaves with/without QTL DM4.1.3

As a knock-out in an amino acid transporter gene (CsAAP2A) was identified as being responsible for reduced susceptibility in NIL 4.1.3, it was hypothesized that the knock-out of the gene may lead to lower amino acids levels in leaves, thereby reducing the feeding of the pathogen. In view of this hypothesis, total free amino acids were extracted from leaves of eight individuals from NIL DM4.1.3, as well as from eight individuals of susceptible parent HS279, seven days after inoculation with P. cubensis, as well as eight individuals of mock-inoculated controls of both genotypes. Free amino acid concentrations in leaf extracts were quantified using GC-FID.

Generally, it was found that leaves of both genotypes inoculated with P. cubensis had higher amino acid concentrations compared to mock-inoculated leaves. In P. cubensis inoculated leaves of genotype NIL DM4.1.3, the concentration of several amino acids was found to be lower than in inoculated leaves of the susceptible parent, indicating that the QTL DM4.1.3 partially prevents the increase in amino acids. Differences due to genotype, treatment and the interaction were all found to be statistically significant (Two-way MANOVA, $p<0.05$). Between subject effects were tested post hoc for each of the individual amino acids, revealing that for nine out of the 19 quantified amino acids (Ala, Gly, Val, Leu, Ile, Thr, Ser, Pro, Gln) there was a significant genotype*treatment interaction ($p<0.05$). For five other amino acids (Asn, Met, Glu, Phe, Trp) there was a significant main effect of the treatment ($p<0.05$) but no significant effect of the genotype ($p>0.05$). For the remaining five amino acids (Asp, Cys, Lys, His, Tyr), no significant differences in concentration were observed ($p>0.05$).

Obligate biotrophic pathogens rely on their host to provide them with amino acids, therefore they are dependent on host-encoded transporters in order to transfer amino acids from source tissues to infected cells. Herein it was found that free amino acid concentrations were higher in leaves inoculated with P. cubensis compared to mock-inoculated controls, suggesting that the pathogen manipulates the plant to increase amino acid transport towards infected leaves, thereby creating an artificial sink.

When comparing cucumber plants with and without the mutation in CsAAP2A, it was found that there were no significant differences in amino acid concentration between the genotypes in mock-inoculated plants, with the exception of methionine. However, in P. cubensis inoculated plants the observed increase in amino acids was lower in plants with the mutant csaap2a allele compared to the susceptible control plants comprising the WT allele, an effect which was significant for nine amino acids (Ala, Gly, Val, Leu, Ile, Thr, Ser, Pro, Gln). This provides a working hypothesis for the role of CsAAP2A in cucumber-downy mildew interactions: the CsAAP2A gene is involved in amino acid loading of infected leaves, and consequently a loss-of-function mutation leads to decreased amino acid transport, resulting to a decrease in fitness for the pathogen.

Example 5—Expression Profile of Cucumber CsAAP2A and CsAAP2B Genes in Different Tissues and in *Pseudoperonospora cubensis* Inoculated Leaves A previously described RNA-seq dataset consisting of gene expression data from a variety of cucumber tissues of reference accession 'Chinese Long 9930' was analysed to study tissue-specific expression patterns of CsAAP2A and CsAAP2B genes. It was found that CsAAP2A and CsAAP2B genes were abundantly transcribed in stem tissue, at a slightly lower level in root and hypocotyl tissue, and were barely detectable in cotyledons, leaves, flowers, and fruit.

To determine the effects of P. cubensis on CsAAP2A and CsAAP2B gene expression, cucumber leaves of both genotypes HS279 and NIL DM4.1.3 inoculated with P. cubensis or mock-treated leaves were sampled at 1, 3, 5 and 7 days post inoculation (dpi). RNA was isolated, and qRT-PCR was performed on cDNA samples using primers specific for each of the genes.

Method:

For expression analysis, plants of genotypes HS279 and NIL DM4.1.3 were inoculated with P. cubensis as described above, or mock treated. At one, three, five and seven days post treatment, leaf samples were taken of three individual plants per genotype/treatment, and immediately frozen in liquid nitrogen. RNA isolation, cDNA synthesis and qRT-PCR were performed as previously described (Berg et al. BMC Plant Biol 2015, 15, supra). For quantification of AAP expression, we used the following primer sequences (F is Forward, R is Reverse):

```
qPCR-CsAAP2A-F
                                    (SEQ ID NO: 17)
CGACGATGATGGACACCCAA qPCR-CsAAP2A-R
                                    (SEQ ID NO: 18)
TGACCGATGAAGGCGAACAA qPCR-CsAAP2B-F
                                    (SEQ ID NO: 19)
TCTCCCTCTTCTCATCTCGCA qPCR-CsAAP2B-R
                                    (SEQ ID NO: 20)
TGAAGTGCCCCAATGAACCC
```

Primer pairs specific for the cucumber reference gene TIP41, as described by Warzybok et al. (PLoS One 2013, 8), were used for normalization of expression. Two technical replicates were taken for each sample/gene combination. Ct values per sample were normalised by subtracting the geometric mean of the Ct values for TIP41, giving deltaCt, abbreviated as dCt. dCt values were subsequently normalized by subtracting the average dCt value for each gene in mock-inoculated HS279 plants at 1 dpi, giving ddCt. Averages and standard deviations of ddCt values were calculated over three biological replicates. Normality of ddCt distributions was tested using Shapiro-Wilk tests (P>0.05). Differences in ddCt value between time points were analysed with two-way ANOVA tests. Homogeneity of variances were tested using Levene's test. If ANOVA tests showed a significant (p<0.05) treatment×time point interaction effect, one-way ANOVA tests were carried out to test for significance of simple main effects of treatment per time point(p <0.05). All statistical analyses were performed using SPSS v23 software (IBM). Relative transcript abundances were calculated as $2^{-ddCt}$ for plotting.

Results:

In genotype HS279, significant treatment×time point interaction effects were found (Two-way ANOVA, p<0.05). For CsAAP2A and CsAAP2B a significant reduction in expression (One-way ANOVA, p<0.05) was found in *P. cubensis* inoculated leaves compared to mock-treated leaves, starting at 3 dpi for CsAAP2A and at 5dpi for CsAAP2B.

In genotype NIL DM4.1.3, significant treatment×time point interaction effects were again found (Two-way ANOVA, p<0.05), and a significant reduction in expression (One-way ANOVA, p<0.05) was found for CsAAP2B at 5 dpi. Expression of CsAAP2A was at every time point and in mock treated as well as *P. cubensis* inoculated leaves reduced by 100-1000 fold in NIL DM4.1.3 compared to HS279, consistent with RNAseq data (Table 1), due to the TE insertion in the gene.

Example 6—Tomato SlAAP5A and SlAAP5B

In tomato two orthologs, named herein SlAAP5A and SlAAP5B, were identified by phylogenetic analysis, clustering in the same clade, clade 3, as CsAAP2A and CsAAP2B, even in the same sub-clade, subclade 3A. Phylogenetic clusters are shown in Chapter 5, FIG. 5 of the PhD thesis of Jeroen Berg, with 2 tomato AAP sequences clustering in Glade 1, none in clade 2, two in clade 3 and 3 in clade 4. The phylogenetic analysis, therefore, suggests that out of the seven AAP genes present in tomato, the tomato genes SlAAP5A and SlAAP5B are the tomato orthologs of the cucumber CsAAP2A and CsAAP2B genes.

| Gene name* | Gene ID | Clade | Species | Protein size |
|---|---|---|---|---|
| SlAAP6C | Solyc01g106800.2.1 | 4B | Tomato | 466 |
| SlAAP6A | Solyc04g077050.2.1 | 4B | Tomato | 482 |
| SlAAP5A | Solyc06g060110.2.1 | 3A | Tomato | 472 |
| SlAAP7A | Solyc07g066010.2.1 | 1A | Tomato | 457 |
| SlAAP7B | Solyc07g066020.2.1 | 1A | Tomato | 471 |
| SlAAP5B | Solyc11g005070.1.1 | 3A | Tomato | 477 |
| SlAAP6B | Solyc12g088190.1.1 | 4B | Tomato | 489 |

*gene names based on phylog. analysis

To verify the in vivo function, mutants in SlAAP5A and SlAAP5B were generated in *Solanum lycopersicum* Moneymaker (MM).

Table 2 shows the mutant lines, comprising mutant alleles in homozygous form. In all lines the mutation in slaap5b results in a truncation of the protein relative to the wild type protein, with additional amino acids replacing the missing part of the wild type (WT) protein (between square brackets), except in line 84, where no additional amino acids are present. Lines 80 and 81 further contain mutant alleles of the slaap5a gene in homozygous form, wherein 5 amino acids are missing (amino acids 75 to 79 of SEQ ID NO: 3). Also lines 84 and 85 further contain mutant alleles of the slaap5a gene in homozygous form. These also encode a truncated protein compared to the wild type protein, and a few additional amino acid residues replace the missing part of the wild type protein. Likewise line 76 contains a mutant slaap5a allele. As can be seen in FIG. 1, where small arrows indicate the amino acid residue where the truncation is, all mutant protein lack part of the Aa_trans domain, which is a transmembrane domain. The mutant proteins are therefore expected to have a reduced function or loss of function in vivo.

TABLE 2

| | SlAAP5A wild type allele (WT) or slaap5a mutant protein, encoded by a slaap5a mutant allele | slaap5b mutant protein encoded by a slaap5b mutant allele |
|---|---|---|
| Line 76 | Mutant slaap5a allele | MGDSTNFAAKHPVSINITES KLFDDDGRIKRSGSVWTASA HIITAVIGSGVLSLAWAVAQ LGWIAGPIVMLLFSFVTYYT SSLLSDCYRSGDPLFGKRNY TYMDVVQANLSGLQVKICGW IQYVNLFGVAIGYTIASSIS LMAVKRSDCFHKHGHKAPCL QPNTPYMIIFGVIEIIFSQI PDFDQIWWLSIVAAVMSFTY STIGLGLGIAHVAETGKIGG SLTGVSIGTVTEMQKVWRTF QALGAIAFAYSYSLILIEIQ DTIKSPPSEAKTMKNATIIS VSVTTVFYMLCGCFGYAAFG DHAPDNLLTGFGFYD[TRYSQ HSHLRSSCRCIPGLLPTPFC FH]* (SEQ ID NO: 9) |
| Line 77 | Probably WT SlA4P5A allele, but needs confirmation | MGDSTNFAAKHPVSINITES KLFDDDGRIKRSGSVWTASA HIITAVIGSGVLSLAWAVAQ LGWIAGPIVMLLFSFVTYYT |

TABLE 2-continued

| | S1AAP5A wild type allele (WT) or slaap5a mutant protein, encoded by a slaap5a mutant allele | slaap5b mutant protein encoded by a slaap5b mutant allele |
|---|---|---|
| | | SSLLSDCYRSGDPLFGKRNY TYMDVVQANLSGLQVKICGW IQYVNLFGVAIGYTIASSIS LMAVKRSDCFHKHGHKAPCL QPNTPYMIIFGVIEIIFSQI PDFDQIWWLSIVAAVMSFTY STIGLGLGIAHVAETGKIGG SLTGVSIGTVTEMQKVWRTF QALGAIAFAYSYSLILIEIQ DTIKSPPSEAKTMKNATIIS VSVTTVFYMLCGCFGYAAFG DHAPDNLLTGFGFYD[TRYSQ HSHLRSSCRCIPGLLPTPFC FH]* (SEQ ID NO: 10) |
| Line 80 | MADKPHQVFEVYGESKCFDD DGRIKRTGSVWTASAHIITA VIGSGVLSLAWATAQLGWVA GPTVLLLFSFVTYYSDCYRT GDPVTGKRNYTYMDAVRANL GGFQVKICGVIQYANLFGVA IGYTIASSISMVAVNRSNCF HKQGHHAACNVSSTPYMIMF GVMEIIFSQIPDFDQISWLS IVAAVMSFTYSTIGLGLGVA QVAETGKIEGSLTGISIGTE VTEMQKIWRSFQALGAIAFA YSYSLILIEIQDTLKSPPAE AKTMKRATLISVAVTTVFYM LCGCFGYAAFGDQSPGNLLT GFGFYNPYWLLDIANIAIVV HLVGAYQVYCQPLFAFVEKT AAEWYPDSKIITKEIDVPIP GFKPFKLNLFRLVWRTIFVI ITTVISMLMPFFNDVVGILG AFGFWPLTVYFPVEMYIVQK RITKWSARWICLQILSGACL VISIAAAAGSFAGVVSDLKV YRPFQS (SEQ ID NO: 21) | MGDSTNFAAKHPVSINITES KLFDDDGRIKRSGSVWTASA HIITAVIGSGVLSLAWAVAQ LGWIAGPIVMLLFSFVTYYT SSLLSDCYRSGDPLFGKRNY TYMDVVQANLSGLQVKICGW IQYVNLFGVAIGYTIASSIS LMAVKRSDCFHKHGHKAPCL QPNTPYMIIFGVIEIIFSQI PDFDQIWWLSIVAAVMSFTY STIGLGLGIAHVAETGKIGG SLTGVSIGTVTEMQKVWRTF QALGAIAFAYSYSLILIEIQ DTIKSPPSEAKTMKNATIIS VSVTTVFYMLCGCFGYAAFG DHAPDNLLTGFGFYDPYWLL DIANIAIFVHLVGAYQVYCQ PLFAFIEKTAAEWYPNSKII TKNISVPIPGFKSYNIYLFR LVWRTIFVHSTIISMLLPF FSDIVGILGAFGFWPLTVYY P[SGNIHCAKEDTKME]* (SEQ ID NO: 11) |
| Line 81 | MADKPHQVFEVYGESKCFDD DGRIKRTGSVWTASAHIITA VIGSGVLSLAWATAQLGWVA GPTVLLLFSFVTYYSDCYRT GDPVTGKRNYTYMDAVRANL GGFQVKICGVIQYANLFGVA IGYTIASSISMVAVNRSNCF HKQGHHAACNVSSTPYMIMF GVMEIIFSQIPDFDQISWLS IVAAVMSFTYSTIGLGLGVA QVAETGKIEGSLTGISIGTE VTEMQKIWRSFQALGAIAFA YSYSLILIEIQDTLKSPPAE AKTMKRATLISVAVTTVFYM LCGCFGYAAFGDQSPGNLLT GFGFYNPYWLLDIANIAIVV HLVGAYQVYCQPLFAFVEKT AAEWYPDSKIITKEIDVPIP GFKPFKLNLFRLVWRTIFVI ITTVISMLMPFFNDVVGILG AFGFWPLTVYFPVEMYIVQK RITKWSARWICLQILSGACL VISIAAAAGSFAGVVSDLKV YRPFQS (SEQ ID NO: 21) | MGDSTNFAAKHPVSINITES KLFDDDGRIKRSGSVWTASA HIITAVIGSGVLSLAWAVAQ LGWIAGPIVMLLFSFVTYYT SSLLSDCYRSGDPLFGKRNY TYMDVVQANLSGLQVKICGW IQYVNLFGVAIGYTIASSIS LMAVKRSDCFHKHGHKAPCL QPNTPYMIIFGVIEIIFSQI PDFDQIWWLSIVAAVMSFTY STIGLGLGIAHVAETGKIGG SLTGVSIGTVTEMQKVWRTF QALGAIAFAYSYSLILIEIQ DTIKSPPSEAKTMKNATIIS VSVTTVFYMLCGCFGY[TRFT ANPFLLSLKKQQQNGTLTVK SSPRILVCQSLALNRTTFTY SDP (SEQ ID NO: 12) |
| Line 84 | MADKPHQVFEVYGESKCFDD DGRIKRTGSVWTASAHIITA VIGSGVLSLAWATAQLGWVA GPTVLLLFSFVTYYT[TGPVI QLPEKEIILIWMLFEPI]* (SEQ ID NO: 15) | MGDSTNFAAKHPVSINITES KLFDDDGRIKRSGSVWTASA HIITAVIGSGVLSLAWAVAQ LGWIAGPIVMLLFSFVTYYT SSLLSDCYRSGDPLFGKRNY TYMDVVQANLSGLQVKICGW IQYVNLFGVAIGYTIASSIS LMAVKRSDCFHKHGHKAPCL QPNTPYMIIFGVIEIIFSQI |

TABLE 2-continued

| SlAAP5A wild type allele (WT) or slaap5a mutant protein, encoded by a slaap5a mutant allele | slaap5b mutant protein encoded by a slaap5b mutant allele |
|---|---|
| | PDFDQIWWLSIVAAVMSFTY<br>STIGLGLGIAHVAETGKIGG<br>SLTGVSIGTVTEMQKVWRTF<br>QALGAIAFAYSYSLILIEIQ<br>DTIKSPPSEAKTMKNATIIS<br>VSVTTVFYMLCGCFGYAAFG<br>DHAPDNLLTGFGFYDP*<br>(SEQ ID NO: 13) |
| Line 85  MADKPHQVFEVYGESKCFDD<br>DGRIKRTGSVWTASAHIITA<br>VIGSGVLSLAWATAQLGWVA<br>GPTVLLLFSFVTYYTS[DFAF<br>RLLPDR]*<br>(SEQ ID NO: 16) | MGDSTNFAAKHPVSINITES<br>KLFDDDGRIKRSGSVWTASA<br>HIITAVIGSGVLSLAWAVAQ<br>LGWIAGPIVMLLFSFVTYYT<br>SSLLSDCYRSGDPLFGKRNY<br>TYMDVVQANLSGLQVKICGW<br>IQYVNLFGVAIGYTIASSIS<br>LMAVKRSDCFHKHGHKAPCL<br>QPNTPYMIIFGVIEIIFSQI<br>PDFDQIWWLSIVAAVMSFTY<br>STIGLGLGIAHVAETGKIGG<br>SLTGVSIGTVTEMQKVWRTF<br>QALGAIAFAYSYSLILIEIQ<br>DTIKSPPSEAKTMKNATIIS<br>VSVTTVFYMLCGCFGYAAFG<br>DHAPDNLLTGFGFYDP[FLAT<br>RYSQHSHLRSSCRCIPGLLP<br>TPFCFH]*<br>(SEQ ID NO: 14) |

Mutations in the slaap5a Allele:

In line 80 and in line 81 the mutant slaap5a allele had 15 nucleotides deleted (nucleotides 222 to 236 of SEQ ID NO: 7), resulting in a deletion of 5 amino acids of the wild type protein of SEQ ID NO: 3, namely amino acids 75 to 79 are missing.

In line 85, the mutant slaap5a allele contained a single nucleotide insertion (Adenine) after nucleotide 229 of SEQ ID NO: 7 (wild type cDNA of Slaap5a), resulting in the truncated protein comprising only amino acids 1 to 76 of SEQ ID NO: 3 (wild type SlAAP5A protein).

In line 84, the mutant slaap5a allele had nucleotides 226 to 247 of the wild type cDNA of SEQ ID NO: 7 deleted, resulting in the truncated protein comprising only amino acids 1 to 75 of SEQ ID NO: 3.

In line 76 a mutant slaap5a allele is present. The mutation is in the same region as for the other lines above, leading to a truncated protein.

Mutations in the slaap5b Allele:

In line 76 and 77, 11 nucleotides (nucleotides 946 to 956) were deleted with respect to the wild type SlAAP5B cDNA of SEQ ID NO: 8. The truncated protein comprises amino acids 1 to 315 of SEQ ID NO: 4 (wild type SlAAP5B protein).

In line 80 a single nucleotide, Cytosine, was inserted after nucleotide 1260 of SEQ ID NO: 8. The truncated protein comprises amino acids 1 to 421 of SEQ ID NO: 4 (wild type SlAAP5B protein).

In Line 81

In line 81 nucleotides 887 to 1001 of the wild type cDNA sequence of SEQ ID NO: 8 were deleted. The truncated protein comprises amino acids 1 to 296 of SEQ ID NO: 4 (wild type SlAAP5B protein).

In Line 84

In line 84 a number of nucleotides are inserted after nucleotide 950 of SEQ ID 8 (wild type cDNA of SlAAP5B). The truncated protein comprises amino acids 1 to 316 of SEQ ID NO: 4 (wild type SlAAP5B protein).

In Line 85

In line 85 a Thymine (T) is inserted after nucleotide 947 of SEQ ID 8 (wild type cDNA of SlAAP5B). The truncated protein comprises amino acids 1 to 316 of SEQ ID NO: 4 (wild type SlAAP5B protein).

To test the in vivo function, a disease assay for late blight of tomato (*P. infestans*) was carried out.

Four plants per line were grown, in addition to four plants of the variety Moneymaker, in plastic tents.

*P. infestans* isolate 88069 (mating type 1, race 1.3.4.7) was grown on Rye Sucrose Agar for 10 to 14 days to sporulate. An inoculum comprising a zoospore concentration of $1\times10^5$ spores/ml in water was made. Drops of 10 µl inoculum were placed on the underside of the leaves with a pipette.

Lesion are was measured 7 days after inoculation on the underside of the leaves, using an electronic caliper. The diameter of each lesion was measured twice, and the lesion area was calculated (pi×radius 1×radius 2). Per plant line between 23 and 28 lesions were measured and the lesion areas calculated. The average lesion area was calculated for each line.

The average lesion area ($mm^2$) of each line and of Moneymaker (MM) is shown in FIG. 2.

The mutant lines all showed a reduction in lesion area by 27% to 48% compared to Moneymaker, comprising wild type alleles of SlAAP5A and SlAAP5B. Interestingly, the four lines which were double mutants, lines 80, 81, 84 and 85, did not show a larger lesion area reduction than (presumed) the single SlAAP5B mutants, lines 76 and 77, although sequencing has yet to confirm that the SlAAP5A allele is indeed wild type in these two lines.

Example 7

The above experiment was repeated with a more aggressive isolate of *P. infestans*. As shown in FIG. 4, lesion area was reduced even more than in the previous experiment. The mutant lines all showed a reduction in lesion area by 46% to 64% compared to Moneymaker (MM), comprising wild type alleles of SlAAP5A and SlAAP5B.

Example 8

A mutant TILLING population of cucumber was screened for mutations in CsAAP2A and CsAAP2B alleles. Cucumber plants comprising the following mutations were found.

| Gene | Mutation | Amino Acid substitution | Sown | Phenotype |
|---|---|---|---|---|
| CsAAP2A | G/A | W25Stop | Yes | Reduces yellowing and sporulation |
| CsAAP2A | G/A | G160E | Not yet | Not tested yet |
| CsAAP2A | G/A | V58I | Not yet | Not tested yet |
| CsAAP2A | G/A | V162M | Not yet | Not tested yet |
| CsAAP2A | C/A | L196I | Not yet | Not tested yet |
| CsAAP2A | G/A | G51E | Yes | Not tested yet |
| CsAAP2A | C/T | L83F | Not yet | Not tested yet |

-continued

| Gene | Mutation | Amino Acid substitution | Sown | Phenotype |
|---|---|---|---|---|
| CsAAP2B | | W176STOP | Yes | No reduction of yellowing and sporulation seen in this background compared to the control |

A *P. cubensis* disease assay was carried out for mutant line comprising a mutant csaap2a allele comprising the W25Stop mutation using an assay similar to the disease assay described in Example 1, except that phenotyping was done at 7 days following inoculation for both yellowing and for sporulation. The same scales were used. The number of plants with each score were recorded. As shown in the table below, the plant comprising the csaap2a W25 STOP mutant allele in homozygous form has significantly less yellowing and less sporulation than the wild type, confirming that csaap2a mutants confer a reduction in susceptibility to *P. cubensis*.

| score | Yellowing | | | Sporulation | | | | | |
|---|---|---|---|---|---|---|---|---|---|
| | Score 6 | Score 7 | Average score yellowing | Score 2 | Score 3 | Score 4 | Score 5 | Score 8 | Average score sporulation |
| Azygous/WT | 12 | | 6.0 | 2 | 7 | 2 | 1 | | 3.2 |
| Heterozygous for W25Stop | 14 | | 6.0 | | 14 | | | | 3.0 |
| Homozygous for W25Stop | 1 | 23 | 7.0 | 2 | 10 | 10 | | 2 | 4.1 |
| Parent line - WT | 4 | | 6.0 | | 4 | | | | 3.0 |

In the same assay also the csaap2b mutant comprising the W176STOP mutation was tested. However no difference in susceptibility could be seen for this mutant allele in this background. It therefore needs further analysis to determine whether this mutant in a different background or other mutants in csaap2b have an effect on susceptibility.

The invention claimed is:

1. A plant or plant part of the species *Cucumis sativus* comprising at least one copy of a mutant csaap2a allele of a gene named CsAAP2A, said gene encodes the CsAAP2A protein of SEQ ID NO: 1, wherein said mutant csaap2a allele results in no expression of the CsAAP2A gene or wherein the mutant allele encodes a protein having a loss-of-function compared to the wild type CsAAP2A protein, and wherein said mutant allele is not the mutant allele as found in accession PI197088.

2. The plant or plant part according to claim 1, wherein said mutant csaap2a allele does not comprise a transposable element inserted in the nucleotide sequence of exon 4 of the allele.

3. The plant or plant part according to claim 1, wherein the mutant csaap2a is a mutant allele generated by chemical mutagenesis, radiation mutagenesis, tissue culture or targeted genome editing techniques.

4. The plant or plant part according to claim 1, wherein the mutant csaap2a is a mutant allele generated by a CRISPR based technique.

5. The plant or plant part according to claim 1, wherein said mutant csaap2a allele is in homozygous form.

6. The plant according to claim 5, wherein said plant comprises reduced susceptibility to *Pseudoperonospora cubensis*.

7. The plant according to claim 5, wherein said plant comprises reduced leaf yellowing and/or reduced sporulation caused by the oomycete *Pseudoperonospora cubensis* compared to a plant comprising the wild type CsAAP2A allele.

8. The plant or plant part according to claim 1, wherein said mutant csaap2a allele encodes a CsAAP2A protein which is truncated compared the wild type CsAAP2A protein, whereby at least 13 amino acids of the C-terminal end of the protein are missing or are replaced by one or more different amino acids compared to the wild type protein.

9. The plant or plant part according to claim 1, wherein said mutant csaap2a allele encodes a CsAAP2A protein which is truncated compared to the wild type CsAAP2A protein, whereby part or all of the Amino Acid Transporter domain of the protein is missing compared to the wild type protein.

10. A cucumber seed from which a plant according to claim 1 can be grown.

11. A cucumber fruit produced by a plant according to claim 1 and wherein said fruit comprises at least one copy of said mutant csaap2a allele.

12. The plant part according to claim 1, wherein said plant part is selected from a cell, a flower, a pistil, a leaf, a stem, a petiole, a cutting, a root, a cotyledon, a hypocotyl, an embryo, a seed coat, a pollen grain and an anther.

* * * * *

SEQUENCE LISTING

```
<160> NUMBER OF SEQ ID NOS: 21

<210> SEQ ID NO 1
<211> LENGTH: 466
<212> TYPE: PRT
<213> ORGANISM: artificial
<220> FEATURE:
<223> OTHER INFORMATION: Cucumber AAP2A protein

<400> SEQUENCE: 1

Met Ala Val Leu Pro Leu Asn Asp Ser Ser Ser Phe Asp Asp Asp Gly
1               5                   10                  15

His Pro Lys Arg Thr Gly Thr Leu Trp Thr Ala Ser Ala His Ile Ile
                20                  25                  30

Thr Thr Val Ile Gly Ser Gly Val Leu Ser Leu Ala Trp Ala Ile Ala
                35                  40                  45

Gln Leu Gly Trp Ile Val Gly Pro Ser Val Met Leu Leu Phe Ala Phe
    50                  55                  60

Ile Gly His Tyr Thr Ser Cys Leu Leu Ala Asp Cys Tyr Arg Ser Gly
```

```
            65                  70                  75                  80

Asp Pro Leu Thr Gly Lys Arg Asn Pro Thr Tyr Met His Ala Val Arg
                85                  90                  95

Ser Leu Leu Gly Glu Ala His Met Val Ala Cys Gly Val Met Gln Asn
               100                 105                 110

Ile Asn Leu Met Gly Ile Thr Ile Gly Tyr Gln Ile Ala Ser Ser Ile
               115                 120                 125

Ser Met Met Ala Ile Lys Arg Ser Asn Cys Phe His Ser Ser Gly Gly
       130                 135                 140

Lys Asn Pro Cys His Ile Ser Ser Asn Pro Phe Met Met Ser Phe Gly
145                 150                 155                 160

Val Val Glu Ile Ile Leu Ser Gln Ile Pro Asn Phe Asp Gln Ile Trp
               165                 170                 175

Trp Leu Ser Thr Leu Ala Ala Ile Met Ser Phe Thr Tyr Ser Phe Ile
               180                 185                 190

Gly Leu Ser Leu Gly Ile Ala Lys Val Ala Glu Ser Gly Arg Phe Lys
           195                 200                 205

Gly Thr Ile Ser Gly Val Ser Val Gly Ser Ile Ser Lys Thr Glu Lys
           210                 215                 220

Lys Leu Arg Ser Phe Gln Ala Leu Gly Asp Ile Ala Phe Ala Tyr Ser
225                 230                 235                 240

Phe Ala Ile Val Leu Ile Glu Ile Gln Asp Thr Ile Lys Cys Pro Pro
               245                 250                 255

Ser Glu Ala Lys Thr Met Lys Lys Ala Thr Arg Phe Ser Ile Ile Leu
               260                 265                 270

Thr Thr Leu Phe Tyr Ile Leu Cys Gly Cys Ser Gly Tyr Ala Ala Phe
           275                 280                 285

Gly Asn Asn Ala Pro Gly Asn Leu Leu Thr Gly Phe Gly Phe Tyr Asn
           290                 295                 300

Pro Phe Trp Leu Ile Asp Ile Ala Asn Val Ala Ile Val His Leu
305                 310                 315                 320

Val Gly Ala Tyr Gln Val Leu Ser Gln Pro Ile Phe Ala Phe Val Glu
               325                 330                 335

Lys Lys Ala Ala Gln Ala Trp Pro Glu Ser Pro Phe Ile Thr Lys Glu
               340                 345                 350

Tyr Lys Leu Ser Ile Ser Ser His Ser Tyr Asn Ile Asn Leu Phe
           355                 360                 365

Arg Leu Ile Trp Arg Ser Leu Phe Val Cys Phe Thr Thr Ile Ala
       370                 375                 380

Met Leu Ile Pro Phe Phe Asn Asp Ile Val Gly Ile Gly Ala Leu
385                 390                 395                 400

Gln Phe Trp Pro Leu Thr Val Tyr Phe Pro Ile Gln Met Tyr Ile Val
               405                 410                 415

Gln Lys Lys Ile Arg Gln Trp Ser Val Lys Trp Ile Cys Val Gln Thr
           420                 425                 430

Met Ser Met Gly Cys Leu Leu Val Ser Leu Ala Ala Ala Val Gly Ser
           435                 440                 445

Ile Ser Gly Val Met Leu Asp Leu Lys Val Tyr Lys Pro Phe Lys Thr
           450                 455                 460

Met Tyr
465

<210> SEQ ID NO 2
```

```
<211> LENGTH: 467
<212> TYPE: PRT
<213> ORGANISM: artificial
<220> FEATURE:
<223> OTHER INFORMATION: Cucumber AAP2B protein

<400> SEQUENCE: 2

Met Ala Val Leu Pro Val Asn Asp Ser Ala Ser Phe Asp Asp Asp Gly
1               5                   10                  15

Cys Pro Lys Arg Thr Gly Thr Phe Trp Thr Ala Ser Ala His Ile Ile
            20                  25                  30

Thr Ala Val Ile Gly Ser Gly Val Leu Ser Leu Ala Trp Ala Ile Ala
        35                  40                  45

Gln Leu Gly Trp Ile Ala Gly Pro Ser Val Met Ile Leu Phe Ala Phe
    50                  55                  60

Ile Gly Tyr Tyr Thr Ser Cys Leu Leu Ala Asp Cys Tyr Arg Ser Gly
65                  70                  75                  80

Asp Pro Val Asn Gly Lys Arg Asn Pro Thr Tyr Met His Ala Val Arg
                85                  90                  95

Ser Leu Leu Gly Glu Thr His Met Val Ala Cys Gly Ile Met Gln Tyr
            100                 105                 110

Ile Asn Leu Ile Gly Ile Thr Ile Gly Tyr Thr Ile Ala Ser Ser Ile
        115                 120                 125

Ser Met Met Ala Ile Lys Arg Ser Asn Cys Phe His Ser Ser Gly Gly
    130                 135                 140

Lys Asn Pro Cys His Ile Ser Ser Asn Pro Phe Met Leu Ser Phe Gly
145                 150                 155                 160

Ile Val Glu Ile Ile Leu Ser Gln Ile Pro Asn Phe Asp Gln Ile Trp
                165                 170                 175

Trp Leu Ser Ile Val Ala Ala Ile Met Ser Phe Thr Tyr Ser Ser Ile
            180                 185                 190

Gly Leu Thr Leu Gly Ile Ala Lys Val Ala Glu Ser Gly Ser Phe Lys
        195                 200                 205

Gly Thr Leu Ser Gly Ile Thr Val Gly Thr Val Thr Gln Ser Glu Lys
    210                 215                 220

Ile Trp Arg Ser Phe Gln Ala Leu Gly Asp Ile Ala Phe Ala Ser Ser
225                 230                 235                 240

Phe Ala Ile Val Leu Ile Glu Val Gln Asp Thr Ile Arg Ser Pro Pro
                245                 250                 255

Ser Glu Thr Lys Thr Met Lys Lys Ala Ala Gly Phe Ser Ile Thr Leu
            260                 265                 270

Thr Thr Ile Phe Tyr Met Leu Cys Gly Cys Met Gly Tyr Ala Ala Phe
        275                 280                 285

Gly Asn Thr Ala Pro Gly Asn Leu Leu Thr Gly Phe Gly Phe Tyr Asn
    290                 295                 300

Pro Phe Trp Leu Leu Asp Ile Ala Asn Val Ser Ile Val Val His Leu
305                 310                 315                 320

Val Gly Ala Tyr Gln Val Phe Ser Gln Pro Val Tyr Ala Phe Val Glu
                325                 330                 335

Lys Lys Val Gln Thr Trp Pro Asp Thr Pro Phe Pro Thr Lys Glu
            340                 345                 350

Tyr Lys Leu Ser Leu Phe Ser Ser Arg Ser Ser Tyr Asn Val Asn Leu
        355                 360                 365

Phe Arg Leu Val Trp Arg Thr Leu Phe Val Cys Phe Thr Ile Val
    370                 375                 380
```

```
Ala Met Leu Leu Pro Phe Phe Asn Asp Ile Val Gly Phe Ile Gly Ala
385                 390                 395                 400

Leu Gln Phe Trp Pro Met Thr Val Tyr Phe Pro Val Gln Met Tyr Val
            405                 410                 415

Val Gln Lys Lys Val Pro Lys Trp Ser Val Lys Trp Ile Cys Val Gln
        420                 425                 430

Thr Met Ser Met Gly Cys Leu Leu Ile Ser Leu Ala Ala Ala Val Gly
        435                 440                 445

Ser Ile Ser Gly Ile Met Leu Asp Leu Asn Val Tyr Lys Pro Phe Lys
    450                 455                 460

Thr Met Tyr
465
```

<210> SEQ ID NO 3
<211> LENGTH: 471
<212> TYPE: PRT
<213> ORGANISM: artificial
<220> FEATURE:
<223> OTHER INFORMATION: Tomato AAP5A protein

<400> SEQUENCE: 3

```
Met Ala Asp Lys Pro His Gln Val Phe Glu Val Tyr Gly Glu Ser Lys
1               5                   10                  15

Cys Phe Asp Asp Asp Gly Arg Ile Lys Arg Thr Gly Ser Val Trp Thr
            20                  25                  30

Ala Ser Ala His Ile Ile Thr Ala Val Ile Gly Ser Gly Val Leu Ser
        35                  40                  45

Leu Ala Trp Ala Thr Ala Gln Leu Gly Trp Val Ala Gly Pro Thr Val
50                  55                  60

Leu Leu Leu Phe Ser Phe Val Thr Tyr Tyr Thr Ser Ala Leu Leu Ser
65                  70                  75                  80

Asp Cys Tyr Arg Thr Gly Asp Pro Val Thr Gly Lys Arg Asn Tyr Thr
                85                  90                  95

Tyr Met Asp Ala Val Arg Ala Asn Leu Gly Gly Phe Gln Val Lys Ile
            100                 105                 110

Cys Gly Val Ile Gln Tyr Ala Asn Leu Phe Gly Val Ala Ile Gly Tyr
        115                 120                 125

Thr Ile Ala Ser Ser Ile Ser Met Val Ala Val Asn Arg Ser Asn Cys
    130                 135                 140

Phe His Lys Gln Gly His His Ala Ala Cys Asn Val Ser Ser Thr Pro
145                 150                 155                 160

Tyr Met Ile Met Phe Gly Val Met Glu Ile Ile Phe Ser Gln Ile Pro
                165                 170                 175

Asp Phe Asp Gln Ile Ser Trp Leu Ser Ile Val Ala Ala Val Met Ser
            180                 185                 190

Phe Thr Tyr Ser Thr Ile Gly Leu Gly Leu Gly Val Ala Gln Val Ala
        195                 200                 205

Glu Thr Gly Lys Ile Glu Gly Ser Leu Thr Gly Ile Ser Ile Gly Thr
    210                 215                 220

Glu Val Thr Glu Met Gln Lys Ile Trp Arg Ser Phe Gln Ala Leu Gly
225                 230                 235                 240

Ala Ile Ala Phe Ala Tyr Ser Tyr Ser Leu Ile Leu Ile Glu Ile Gln
                245                 250                 255

Asp Thr Leu Lys Ser Pro Pro Ala Glu Ala Lys Thr Met Lys Arg Ala
            260                 265                 270
```

```
Thr Leu Ile Ser Val Ala Val Thr Thr Val Phe Tyr Met Leu Cys Gly
            275                 280                 285

Cys Phe Gly Tyr Ala Ala Phe Gly Asp Gln Ser Pro Gly Asn Leu Leu
290                 295                 300

Thr Gly Phe Gly Phe Tyr Asn Pro Tyr Trp Leu Leu Asp Ile Ala Asn
305                 310                 315                 320

Ile Ala Ile Val Val His Leu Val Gly Ala Tyr Gln Val Tyr Cys Gln
                325                 330                 335

Pro Leu Phe Ala Phe Val Glu Lys Thr Ala Ala Glu Trp Tyr Pro Asp
            340                 345                 350

Ser Lys Ile Ile Thr Lys Glu Ile Asp Val Pro Ile Pro Gly Phe Lys
            355                 360                 365

Pro Phe Lys Leu Asn Leu Phe Arg Leu Val Trp Arg Thr Ile Phe Val
370                 375                 380

Ile Ile Thr Thr Val Ile Ser Met Leu Met Pro Phe Phe Asn Asp Val
385                 390                 395                 400

Val Gly Ile Leu Gly Ala Phe Gly Phe Trp Pro Leu Thr Val Tyr Phe
                405                 410                 415

Pro Val Glu Met Tyr Ile Val Gln Lys Arg Ile Thr Lys Trp Ser Ala
            420                 425                 430

Arg Trp Ile Cys Leu Gln Ile Leu Ser Gly Ala Cys Leu Val Ile Ser
            435                 440                 445

Ile Ala Ala Ala Ala Gly Ser Phe Ala Gly Val Val Ser Asp Leu Lys
450                 455                 460

Val Tyr Arg Pro Phe Gln Ser
465                 470

<210> SEQ ID NO 4
<211> LENGTH: 476
<212> TYPE: PRT
<213> ORGANISM: artificial
<220> FEATURE:
<223> OTHER INFORMATION: Tomato AAP5B protein

<400> SEQUENCE: 4

Met Gly Asp Ser Thr Asn Phe Ala Ala Lys His Pro Val Ser Ile Asn
1               5                   10                  15

Ile Thr Glu Ser Lys Leu Phe Asp Asp Gly Arg Ile Lys Arg Ser
            20                  25                  30

Gly Ser Val Trp Thr Ala Ser Ala His Ile Ile Thr Ala Val Ile Gly
            35                  40                  45

Ser Gly Val Leu Ser Leu Ala Trp Ala Val Ala Gln Leu Gly Trp Ile
50                  55                  60

Ala Gly Pro Ile Val Met Leu Leu Phe Ser Phe Val Thr Tyr Tyr Thr
65                  70                  75                  80

Ser Ser Leu Leu Ser Asp Cys Tyr Arg Ser Gly Asp Pro Leu Phe Gly
                85                  90                  95

Lys Arg Asn Tyr Thr Tyr Met Asp Val Val Gln Ala Asn Leu Ser Gly
            100                 105                 110

Leu Gln Val Lys Ile Cys Gly Trp Ile Gln Tyr Val Asn Leu Phe Gly
            115                 120                 125

Val Ala Ile Gly Tyr Thr Ile Ala Ser Ser Ile Ser Leu Met Ala Val
        130                 135                 140

Lys Arg Ser Asp Cys Phe His Lys His Gly His Lys Ala Pro Cys Leu
145                 150                 155                 160
```

```
Gln Pro Asn Thr Pro Tyr Met Ile Ile Phe Gly Val Ile Glu Ile Ile
                165                 170                 175
Phe Ser Gln Ile Pro Asp Phe Asp Gln Ile Trp Trp Leu Ser Ile Val
            180                 185                 190
Ala Ala Val Met Ser Phe Thr Tyr Ser Thr Ile Gly Leu Gly Leu Gly
        195                 200                 205
Ile Ala His Val Ala Glu Thr Gly Lys Ile Gly Ser Leu Thr Gly
    210                 215                 220
Val Ser Ile Gly Thr Val Thr Glu Met Gln Lys Val Trp Arg Thr Phe
225                 230                 235                 240
Gln Ala Leu Gly Ala Ile Ala Phe Ala Tyr Ser Tyr Ser Leu Ile Leu
                245                 250                 255
Ile Glu Ile Gln Asp Thr Ile Lys Ser Pro Pro Ser Glu Ala Lys Thr
            260                 265                 270
Met Lys Asn Ala Thr Ile Ile Ser Val Ser Val Thr Thr Val Phe Tyr
        275                 280                 285
Met Leu Cys Gly Cys Phe Gly Tyr Ala Ala Phe Gly Asp His Ala Pro
    290                 295                 300
Asp Asn Leu Leu Thr Gly Phe Gly Phe Tyr Asp Pro Tyr Trp Leu Leu
305                 310                 315                 320
Asp Ile Ala Asn Ile Ala Ile Phe Val His Leu Val Gly Ala Tyr Gln
                325                 330                 335
Val Tyr Cys Gln Pro Leu Phe Ala Phe Ile Glu Lys Thr Ala Ala Glu
            340                 345                 350
Trp Tyr Pro Asn Ser Lys Ile Ile Thr Lys Asn Ile Ser Val Pro Ile
        355                 360                 365
Pro Gly Phe Lys Ser Tyr Asn Ile Tyr Leu Phe Arg Leu Val Trp Arg
    370                 375                 380
Thr Ile Phe Val Ile Ile Ser Thr Ile Ile Ser Met Leu Leu Pro Phe
385                 390                 395                 400
Phe Ser Asp Ile Val Gly Ile Leu Gly Ala Phe Gly Phe Trp Pro Leu
                405                 410                 415
Thr Val Tyr Tyr Pro Val Glu Ile Tyr Ile Val Gln Lys Lys Ile Pro
            420                 425                 430
Lys Trp Ser Arg Lys Trp Phe Gly Leu Gln Ile Leu Ser Val Thr Cys
        435                 440                 445
Leu Ile Val Ser Ile Ala Ala Ala Val Gly Ser Phe Ala Gly Val Val
    450                 455                 460
Ser Asp Leu Lys Val Tyr Lys Pro Phe Lys Phe Thr
465                 470                 475

<210> SEQ ID NO 5
<211> LENGTH: 1401
<212> TYPE: DNA
<213> ORGANISM: artificial
<220> FEATURE:
<223> OTHER INFORMATION: Cucumber AAP2A cDNA

<400> SEQUENCE: 5
atggctgtgc ttcccctcaa cgactcttct agcttcgacg atgatggaca cccaaaacga      60
accggtacgc tttggacggc aagtgctcac ataatcacta cggttattgg ttcgggtgtg     120
ttatcgttag catgggcgat tgctcagcta gggtggattg tcggtccctc cgtcatgttg     180
ttgttcgcct tcatcggtca ctacacctca tgcttgcttg ccgactgcta tgctccggt      240
```

```
gatcctctta ctggaaagag aaaccctact tacatgcatg ccgttcgctc cctccttggt    300
gaagctcata tggtggcatg tggagtaatg cagaacataa acttgatggg aataacaatt    360
ggatatcaga ttgcgtcctc aatcagtatg atggcaatta aaaggtcaaa ttgctttcat    420
agtagtggtg gaaaaaatcc atgtcatatt tcaagcaacc cattcatgat gtcttttgga    480
gttgtggaaa taattctatc tcaaattcca aattttgatc agatttggtg gctctctaca    540
ctcgctgcta tcatgtcttt tacttattct ttcattggcc tttcccttgg aatagccaaa    600
gtggcagaaa gtgggagatt taaggaaca attagtggag taagtgtggg atcgataagt    660
aaaaccgaaa agaaattgag aagttttcaa gcacttggag atattgcttt tgcttattct    720
tttgcaattg tccttattga aattcaggat acaataaagt gtccaccatc agaagcgaag    780
acaatgaaga aagcaacaag gtttagcatt atattgacca ccttattcta catactatgc    840
gggtgcagtg gttatgcagc tttcggcaac aatgccccag gaaatctctt aactggcttt    900
ggcttctaca atccctttg gctcatcgac attgccaatg tcgccatcgt tgttcacctt    960
gtgggcgcct accaagtcct tagccagccc atctttgcct ttgtggaaaa gaaggctgcc   1020
caagcatggc ccgagtcacc cttcatcact aaagaataca agctctccat ctcctcttct   1080
cactcctaca acatcaacct cttccgactc atttggaggt cccttttcgt ctgcttcacc   1140
accaccattg ctatgttaat ccctttcttc aacgacatcg ttggaattat cggggctctc   1200
caattctggc ccttgacagt ttattttcct attcagatgt atattgtcca gaaaagata    1260 agacaatgga gtgtcaagtg gatttgtgtt caaactatga gcatgggatg ccttttggtg   1320
tctcttgctg ctgctgttgg ctccattagc ggtgtcatgc ttgatctcaa ggtttataag   1380
cctttcaaga caatgtattg a                                             1401
```

<210> SEQ ID NO 6
<211> LENGTH: 1404
<212> TYPE: DNA
<213> ORGANISM: artificial
<220> FEATURE:
<223> OTHER INFORMATION: Cucumber AAP2B cDNA

<400> SEQUENCE: 6

```
atggccgtgc ttcccgtcaa tgactccgct agcttcgacg atgatggttg ccccaaacga     60
accggtacgt tttggacggc aagtgctcat ataataactg cggtcattgg ttcgggtgtg    120
ttatcattgg catgggcgat tgcgcaactc ggatggatcg ccggtccttc agtgatgata    180
ctgtttgctt tcataggtta ctatacctct tgtttgctcg ctgattgcta tcgctccggc    240
gacccggtca atggcaagag aaaccccact tacatgcatg cagttcgctc ccttcttggt    300
gagacacaca tggtggcatg tggaataatg cagtacataa acttgatcgg aataacaatt    360
ggatatacaa ttgcctcgtc aatcagcatg atggcaatta acggtcaaa ttgctttcat    420 agcagtggag gaaaaaatcc atgtcatatt tcaagcaatc cattcatgtt gtcttttgga    480
attgtggaaa tcattttatc tcaaattcca aattttgatc agatttggtg gctctccatt    540
gttgctgcta tcatgtcttt tacctattca tccattggcc ttacccttgg catagccaaa    600
gttgcagaaa gtgggagttt taaggaaca cttagtggaa taactgtggg aacagtaact    660
caaagtgaaa agatatggag aagtttccaa gcacttggcg atattgcttt tgcttcttct    720
tttgcaattg tccttattga agttcaggat acaattagaa gtccaccttc agaaacaaag    780
acaatgaaga aagcagcagg attcagcatt acattaacca ccatattcta catgctatgt    840
ggatgcatgg gctatgcagc ctttggcaac acagccccg  gtaaccttt aactggcttt     900
```

```
ggcttctaca accccttttg gctcctcgac atcgccaatg tctccattgt tgttcacctc      960
gttggggcct accaagtctt tagccaaccc gtctatgcct ttgttgagaa gaaggttgtc     1020
caaacatggc cagacacccc cttcttcacc aaagagtaca agctctccct cttctcatct     1080
cgcagctcct acaatgtcaa cctctttcga ctggtatgga gaactctttt tgtctgcttc     1140
accaccatcg tcgccatgtt gctcccttc ttcaatgaca tcgttgggtt cattggggca      1200
cttcaatttt ggccgatgac tgtctatttt ccagtccaga tgtatgttgt tcagaagaag     1260
gtacctaaat ggagtgtgaa gtggatttgt gtgcagacta tgagcatggg atgcctttg     1320 atctctcttg ctgcagctgt gggctctatt agtggtatca tgcttgatct caatgtttat     1380
aagcctttca agacaatgta ttga                                            1404

<210> SEQ ID NO 7
<211> LENGTH: 1416
<212> TYPE: DNA
<213> ORGANISM: artificial
<220> FEATURE:
<223> OTHER INFORMATION: Tomato AAP5A cDNA

<400> SEQUENCE: 7
atggcagata aaccacatca agtatttgag gtttatggtg aatcgaaatg ttttgatgac      60
gatggtcgta tcaaaaggac tgggtctgtt tggacggcaa gtgctcacat cataactgct     120
gtgataggat caggagtttt atcattggct tgggctactg ctcagcttgg atgggtagct     180
gggccaactg tattgctact tttctccttt gttacttact atacctctgc tttgctttcc     240
gattgttacc ggaccggtga tccagttacc ggaaaaagaa attatactta tatggatgct     300
gttcgagcca atctaggtgg atttcaggtt aagatttgtg gtgtgattca gtatgcaaat     360 cttttttggag ttgcaattgg ttataccata gcgtcttcca ttagtatggt ggctgtgaat     420
aggtctaatt gtttccataa acaaggtcat catgctgctt gcaatgtttc aagtactccc     480
tatatgatca tgtttggtgt gatggaaatt atcttctcac aaatcccgga tttcgatcag     540
atttcttggc tttcgattgt tgctgctgtt atgtcgttta cttactctac aattggtctt     600
ggcttaggag ttgctcaagt tgcagaaaca ggaaaaattg aaggaagttt aactgggatt     660
agcattggaa ctgaagtaac tgaaatgcag aagatttgga gaagctttca agctcttgga     720
gctatagctt ttgcttattc ctactcccta atccttatcg aaattcagga tacactcaaa     780
tcaccaccag cagaagcaaa gacaatgaaa agggcaacac taattagtgt ggcagttaca     840
acagtattct acatgctttg tggttgcttt gggtatgcag cattcggaga tcaatcccct     900
ggaaacctac taacaggatt cggattctac aaccccctatt ggcttcttga catcgcgaac     960
atagccatcc ttgttcacct agtaggtgca taccaagttt actgtcaacc cttttcgcc    1020 tttgttgaaa aaacagcagc tgaatggtac cctgacagca aaatcataac aaaagaaatc     1080
gatgtcccaa tcccgggatt caaaccttc aagctcaacc ttttccgtct agtctggagg     1140
acaatattcg tgatcatcac cacagtcata tcaatgttga tgcccttctt taacgacgtc     1200
gttggcattc ttggagcatt tggatttttgg ccacttacag tatacttccc agtggaaatg     1260
tacattgtgc aaaagagaat taccaaatgg agtgcaagat ggatatgtct acaaatactt     1320
agtggtgctt gccttgttat ctcaattgct gcagctgctg gttcttttgc tggagttgtt     1380
tctgatttaa agtttacag gccttttcag agttaa                                1416

<210> SEQ ID NO 8
```

<211> LENGTH: 1431
<212> TYPE: DNA
<213> ORGANISM: artificial
<220> FEATURE:
<223> OTHER INFORMATION: Tomato AAP5B cDNA

<400> SEQUENCE: 8

```
atgggagatt ctacgaattt tgcagcaaaa catcctgttt ctatcaatat aactgaatcc      60
aagcttttg acgacgatgg gcgtatcaaa agaagtggaa gtgtttggac tgcaagtgct     120
catatcataa ctgctgtgat tggttcaggc gttttatctt tggcttgggc tgtagctcaa     180
cttggttgga ttgctggtcc tattgttatg cttttattct cttttgttac ttattcacc      240
tcttctctgc tctccgattg ttaccgctcc ggcgacccac ttttcggcaa gagaaactat     300
acttacatgg atgttgtaca agcaaatctc agtggcttac aggtaaagat tgtggatgg      360
attcagtatg tgaatctgtt tggagttgct attgggtaca caattgcttc ttcaattagc     420
ctgatggctg ttaaaaggtc agattgtttt cataaacatg gtcataaagc accttgttta     480
caaccaaata ctccatatat gatcatattt ggagtaatag aaatcatctt ctcacaaata     540
ccagatttg atcaaatttg gtggctttca attgttgctg ctgtaatgtc tttcacttac     600
tccaccatcg gcttaggttt aggcattgct catgtagcag aaactggaaa aattggtggg     660
agtttaactg gagtgagcat tggaactgtg actgaaatgc aaaaagtttg gagaactttt     720
caagcacttg gagctattgc ttttgcttat tcttactccc tcatccttat cgagattcag     780
gatacaatca aatccccacc tcagaagcc aagacaatga aaatgcaac tataattagt      840
gtatcagtaa caacagtttt ctacatgcta tgtggttgtt ttggctatgc agcatttgga     900
gaccatgctc ctgacaattt actaactggt tttggatttt acgacccta ttggctacta      960
gatatagcca acatagccat cttcgttcat cttgtaggtg cataccaggt ttactgccaa    1020
ccccttttg ctttcattga aaaaacagca gcagaatggt accctaacag taaaatcatc    1080
accaagaata ttagtgtgcc aatccctggc tttaaatcgt acaacattta cctattcaga    1140
ctagtttgga ggacgatctt tgttatcata tccactatca tctctatgtt gttgccattc    1200
ttcagcgaca tcgttggaat acttggagca tttggatttt ggccgttgac tgtttattat    1260
ccagtggaaa tatacattgt gcaaaagaag ataccaaaat ggagtagaaa atggtttggt    1320
cttcaaattc tgagtgttac ttgtcttatt gtctcaattg ctgcagctgt tggttctttt    1380
gctggtgttg tatctgatct taaagtttac aagcctttca aatttactta g             1431
```

<210> SEQ ID NO 9
<211> LENGTH: 342
<212> TYPE: PRT
<213> ORGANISM: artificial
<220> FEATURE:
<223> OTHER INFORMATION: Solanum lycopersicum mutant AAP5B protein

<400> SEQUENCE: 9

```
Met Gly Asp Ser Thr Asn Phe Ala Ala Lys His Pro Val Ser Ile Asn
1               5                   10                  15

Ile Thr Glu Ser Lys Leu Phe Asp Asp Asp Gly Arg Ile Lys Arg Ser
            20                  25                  30

Gly Ser Val Trp Thr Ala Ser Ala His Ile Ile Thr Ala Val Ile Gly
        35                  40                  45

Ser Gly Val Leu Ser Leu Ala Trp Ala Val Ala Gln Leu Gly Trp Ile
    50                  55                  60

Ala Gly Pro Ile Val Met Leu Leu Phe Ser Phe Val Thr Tyr Tyr Thr
```

Ser Ser Leu Leu Ser Asp Cys Tyr Arg Ser Gly Asp Pro Leu Phe Gly
            65                  70                  75                  80

Lys Arg Asn Tyr Thr Tyr Met Asp Val Val Gln Ala Asn Leu Ser Gly
            85                  90                  95

Leu Gln Val Lys Ile Cys Gly Trp Ile Gln Tyr Val Asn Leu Phe Gly
        100                 105                 110

Val Ala Ile Gly Tyr Thr Ile Ala Ser Ser Ile Ser Leu Met Ala Val
        115                 120                 125

Lys Arg Ser Asp Cys Phe His Lys His Gly His Lys Ala Pro Cys Leu
130                 135                 140

Gln Pro Asn Thr Pro Tyr Met Ile Ile Phe Gly Val Ile Glu Ile Ile
145                 150                 155                 160

Phe Ser Gln Ile Pro Asp Phe Asp Gln Ile Trp Trp Leu Ser Ile Val
            165                 170                 175

Ala Ala Val Met Ser Phe Thr Tyr Ser Thr Ile Gly Leu Gly Leu Gly
        180                 185                 190

Ile Ala His Val Ala Glu Thr Gly Lys Ile Gly Gly Ser Leu Thr Gly
        195                 200                 205

Val Ser Ile Gly Thr Val Thr Glu Met Gln Lys Val Trp Arg Thr Phe
210                 215                 220

Gln Ala Leu Gly Ala Ile Ala Phe Ala Tyr Ser Tyr Ser Leu Ile Leu
225                 230                 235                 240

Ile Glu Ile Gln Asp Thr Ile Lys Ser Pro Pro Ser Glu Ala Lys Thr
            245                 250                 255

Met Lys Asn Ala Thr Ile Ile Ser Val Ser Val Thr Val Phe Tyr
        260                 265                 270

Met Leu Cys Gly Cys Phe Gly Tyr Ala Ala Phe Gly Asp His Ala Pro
        275                 280                 285

Asp Asn Leu Leu Thr Gly Phe Gly Phe Tyr Asp Thr Arg Tyr Ser Gln
290                 295                 300

His Ser His Leu Arg Ser Ser Cys Arg Cys Ile Pro Gly Leu Leu Pro
305                 310                 315                 320

Thr Pro Phe Cys Phe His
            325                 330                 335

340

<210> SEQ ID NO 10
<211> LENGTH: 342
<212> TYPE: PRT
<213> ORGANISM: artificial
<220> FEATURE:
<223> OTHER INFORMATION: Solanum lycopersicum mutant AAP5B protein

<400> SEQUENCE: 10

Met Gly Asp Ser Thr Asn Phe Ala Ala Lys His Pro Val Ser Ile Asn
1               5                   10                  15

Ile Thr Glu Ser Lys Leu Phe Asp Asp Gly Arg Ile Lys Arg Ser
            20                  25                  30

Gly Ser Val Trp Thr Ala Ser His Ile Ile Thr Ala Val Ile Gly
        35                  40                  45

Ser Gly Val Leu Ser Leu Ala Trp Ala Val Ala Gln Leu Gly Trp Ile
        50                  55                  60

Ala Gly Pro Ile Val Met Leu Leu Phe Ser Phe Val Thr Tyr Tyr Thr
65                  70                  75                  80

Ser Ser Leu Leu Ser Asp Cys Tyr Arg Ser Gly Asp Pro Leu Phe Gly

```
                        85                  90                  95
Lys Arg Asn Tyr Thr Tyr Met Asp Val Val Gln Ala Asn Leu Ser Gly
                100                 105                 110

Leu Gln Val Lys Ile Cys Gly Trp Ile Gln Tyr Val Asn Leu Phe Gly
                115                 120                 125

Val Ala Ile Gly Tyr Thr Ile Ala Ser Ser Ile Ser Leu Met Ala Val
            130                 135                 140

Lys Arg Ser Asp Cys Phe His Lys His Gly His Lys Ala Pro Cys Leu
145                 150                 155                 160

Gln Pro Asn Thr Pro Tyr Met Ile Ile Phe Gly Val Ile Glu Ile Ile
                165                 170                 175

Phe Ser Gln Ile Pro Asp Phe Asp Gln Ile Trp Trp Leu Ser Ile Val
                180                 185                 190

Ala Ala Val Met Ser Phe Thr Tyr Ser Thr Ile Gly Leu Gly Leu Gly
                195                 200                 205

Ile Ala His Val Ala Glu Thr Gly Lys Ile Gly Gly Ser Leu Thr Gly
                210                 215                 220

Val Ser Ile Gly Thr Val Thr Glu Met Gln Lys Val Trp Arg Thr Phe
225                 230                 235                 240

Gln Ala Leu Gly Ala Ile Ala Phe Ala Tyr Ser Tyr Ser Leu Ile Leu
                245                 250                 255

Ile Glu Ile Gln Asp Thr Ile Lys Ser Pro Pro Ser Glu Ala Lys Thr
                260                 265                 270

Met Lys Asn Ala Thr Ile Ile Ser Val Ser Val Thr Thr Val Phe Tyr
                275                 280                 285

Met Leu Cys Gly Cys Phe Gly Tyr Ala Ala Phe Gly Asp His Ala Pro
                290                 295                 300

Asp Asn Leu Leu Thr Gly Phe Gly Phe Tyr Asp Thr Arg Tyr Ser Gln
305                 310                 315                 320

His Ser His Leu Arg Ser Ser Cys Arg Cys Ile Pro Gly Leu Leu Pro
                325                 330                 335

Thr Pro Phe Cys Phe His
                340

<210> SEQ ID NO 11
<211> LENGTH: 435
<212> TYPE: PRT
<213> ORGANISM: artificial
<220> FEATURE:
<223> OTHER INFORMATION: Solanum lycopersicum mutant AAP5B protein

<400> SEQUENCE: 11

Met Gly Asp Ser Thr Asn Phe Ala Ala Lys His Pro Val Ser Ile Asn
1               5                   10                  15

Ile Thr Glu Ser Lys Leu Phe Asp Asp Gly Arg Ile Lys Arg Ser
                20                  25                  30

Gly Ser Val Trp Thr Ala Ser Ala His Ile Ile Thr Ala Val Ile Gly
                35                  40                  45

Ser Gly Val Leu Ser Leu Ala Trp Ala Val Ala Gln Leu Gly Trp Ile
            50                  55                  60

Ala Gly Pro Ile Val Met Leu Leu Phe Ser Phe Val Thr Tyr Tyr Thr
65                  70                  75                  80

Ser Ser Leu Leu Ser Asp Cys Tyr Arg Ser Gly Asp Pro Leu Phe Gly
                85                  90                  95

Lys Arg Asn Tyr Thr Tyr Met Asp Val Val Gln Ala Asn Leu Ser Gly
```

100                 105                 110
Leu Gln Val Lys Ile Cys Gly Trp Ile Gln Tyr Val Asn Leu Phe Gly
            115                 120                 125

Val Ala Ile Gly Tyr Thr Ile Ala Ser Ser Ile Ser Leu Met Ala Val
        130                 135                 140

Lys Arg Ser Asp Cys Phe His Lys His Gly His Lys Ala Pro Cys Leu
145                 150                 155                 160

Gln Pro Asn Thr Pro Tyr Met Ile Ile Phe Gly Val Ile Glu Ile Ile
                165                 170                 175

Phe Ser Gln Ile Pro Asp Phe Asp Gln Ile Trp Trp Leu Ser Ile Val
            180                 185                 190

Ala Ala Val Met Ser Phe Thr Tyr Ser Thr Ile Gly Leu Gly Leu Gly
        195                 200                 205

Ile Ala His Val Ala Glu Thr Gly Lys Ile Gly Gly Ser Leu Thr Gly
    210                 215                 220

Val Ser Ile Gly Thr Val Thr Glu Met Gln Lys Val Trp Arg Thr Phe
225                 230                 235                 240

Gln Ala Leu Gly Ala Ile Ala Phe Ala Tyr Ser Tyr Ser Leu Ile Leu
                245                 250                 255

Ile Glu Ile Gln Asp Thr Ile Lys Ser Pro Pro Ser Glu Ala Lys Thr
            260                 265                 270

Met Lys Asn Ala Thr Ile Ile Ser Val Ser Val Thr Thr Val Phe Tyr
        275                 280                 285

Met Leu Cys Gly Cys Phe Gly Tyr Ala Ala Phe Gly Asp His Ala Pro
    290                 295                 300

Asn Leu Leu Thr Gly Phe Gly Phe Tyr Asp Pro Tyr Trp Leu Leu
305                 310                 315                 320

Asp Ile Ala Asn Ile Ala Ile Phe Val His Leu Val Gly Ala Tyr Gln
                325                 330                 335

Val Tyr Cys Gln Pro Leu Phe Ala Phe Ile Glu Lys Thr Ala Ala Glu
            340                 345                 350

Trp Tyr Pro Asn Ser Lys Ile Ile Thr Lys Asn Ile Ser Val Pro Ile
        355                 360                 365

Pro Gly Phe Lys Ser Tyr Asn Ile Tyr Leu Phe Arg Leu Val Trp Arg
    370                 375                 380

Thr Ile Phe Val Ile Ser Thr Ile Ile Ser Met Leu Leu Pro Phe
385                 390                 395                 400

Phe Ser Asp Ile Val Gly Ile Leu Gly Ala Phe Gly Phe Trp Pro Leu
                405                 410                 415

Thr Val Tyr Tyr Pro Ser Gly Asn Ile His Cys Ala Lys Glu Asp Thr
            420                 425                 430

Lys Met Glu
        435

<210> SEQ ID NO 12
<211> LENGTH: 342
<212> TYPE: PRT
<213> ORGANISM: artificial
<220> FEATURE:
<223> OTHER INFORMATION: Solanum lycopersicum mutant AAP5B protein

<400> SEQUENCE: 12

Met Gly Asp Ser Thr Asn Phe Ala Ala Lys His Pro Val Ser Ile Asn
1               5                   10                  15

Ile Thr Glu Ser Lys Leu Phe Asp Asp Asp Gly Arg Ile Lys Arg Ser

```
            20                  25                  30
Gly Ser Val Trp Thr Ala Ser Ala His Ile Ile Thr Ala Val Ile Gly
        35                  40                  45

Ser Gly Val Leu Ser Leu Ala Trp Ala Val Ala Gln Leu Gly Trp Ile
    50                  55                  60

Ala Gly Pro Ile Val Met Leu Leu Phe Ser Phe Val Thr Tyr Tyr Thr
65                  70                  75                  80

Ser Ser Leu Leu Ser Asp Cys Tyr Arg Ser Gly Asp Pro Leu Phe Gly
                85                  90                  95

Lys Arg Asn Tyr Thr Tyr Met Asp Val Val Gln Ala Asn Leu Ser Gly
            100                 105                 110

Leu Gln Val Lys Ile Cys Gly Trp Ile Gln Tyr Val Asn Leu Phe Gly
        115                 120                 125

Val Ala Ile Gly Tyr Thr Ile Ala Ser Ser Ile Ser Leu Met Ala Val
    130                 135                 140

Lys Arg Ser Asp Cys Phe His Lys His Gly His Lys Ala Pro Cys Leu
145                 150                 155                 160

Gln Pro Asn Thr Pro Tyr Met Ile Ile Phe Gly Val Ile Glu Ile Ile
                165                 170                 175

Phe Ser Gln Ile Pro Asp Phe Asp Gln Ile Trp Trp Leu Ser Ile Val
            180                 185                 190

Ala Ala Val Met Ser Phe Thr Tyr Ser Thr Ile Gly Leu Gly Leu Gly
        195                 200                 205

Ile Ala His Val Ala Glu Thr Gly Lys Ile Gly Gly Ser Leu Thr Gly
    210                 215                 220

Val Ser Ile Gly Thr Val Thr Glu Met Gln Lys Val Trp Arg Thr Phe
225                 230                 235                 240

Gln Ala Leu Gly Ala Ile Ala Phe Ala Tyr Ser Tyr Ser Leu Ile Leu
                245                 250                 255

Ile Glu Ile Gln Asp Thr Ile Lys Ser Pro Pro Ser Glu Ala Lys Thr
            260                 265                 270

Met Lys Asn Ala Thr Ile Ile Ser Val Ser Val Thr Thr Val Phe Tyr
        275                 280                 285

Met Leu Cys Gly Cys Phe Gly Tyr Thr Arg Phe Thr Ala Asn Pro Phe
    290                 295                 300

Leu Leu Ser Leu Lys Lys Gln Gln Asn Gly Thr Leu Thr Val Lys
305                 310                 315                 320

Ser Ser Pro Arg Ile Leu Val Cys Gln Ser Leu Ala Leu Asn Arg Thr
                325                 330                 335

Thr Phe Thr Tyr Ser Asp
            340

<210> SEQ ID NO 13
<211> LENGTH: 316
<212> TYPE: PRT
<213> ORGANISM: artificial
<220> FEATURE:
<223> OTHER INFORMATION: Solanum lycopersicum mutant AAP5B protein

<400> SEQUENCE: 13

Met Gly Asp Ser Thr Asn Phe Ala Ala Lys His Pro Val Ser Ile Asn
1               5                   10                  15

Ile Thr Glu Ser Lys Leu Phe Asp Asp Gly Arg Ile Lys Arg Ser
            20                  25                  30

Gly Ser Val Trp Thr Ala Ser Ala His Ile Ile Thr Ala Val Ile Gly
```

Ser Gly Val Leu Ser Leu Ala Trp Ala Val Ala Gln Leu Gly Trp Ile
            35                  40                  45
Ala Gly Pro Ile Val Met Leu Leu Phe Ser Phe Val Thr Tyr Tyr Thr
 65                  70                  75                  80
Ser Ser Leu Leu Ser Asp Cys Tyr Arg Ser Gly Asp Pro Leu Phe Gly
                 85                  90                  95
Lys Arg Asn Tyr Thr Tyr Met Asp Val Val Gln Ala Asn Leu Ser Gly
                100                 105                 110
Leu Gln Val Lys Ile Cys Gly Trp Ile Gln Tyr Val Asn Leu Phe Gly
            115                 120                 125
Val Ala Ile Gly Tyr Thr Ile Ala Ser Ser Ile Ser Leu Met Ala Val
130                 135                 140
Lys Arg Ser Asp Cys Phe His Lys His Gly His Lys Ala Pro Cys Leu
145                 150                 155                 160
Gln Pro Asn Thr Pro Tyr Met Ile Ile Phe Gly Val Ile Glu Ile Ile
                165                 170                 175
Phe Ser Gln Ile Pro Asp Phe Asp Gln Ile Trp Trp Leu Ser Ile Val
            180                 185                 190
Ala Ala Val Met Ser Phe Thr Tyr Ser Thr Ile Gly Leu Gly Leu Gly
            195                 200                 205
Ile Ala His Val Ala Glu Thr Gly Lys Ile Gly Gly Ser Leu Thr Gly
210                 215                 220
Val Ser Ile Gly Thr Val Thr Glu Met Gln Lys Val Trp Arg Thr Phe
225                 230                 235                 240
Gln Ala Leu Gly Ala Ile Ala Phe Ala Tyr Ser Tyr Ser Leu Ile Leu
                245                 250                 255
Ile Glu Ile Gln Asp Thr Ile Lys Ser Pro Pro Ser Glu Ala Lys Thr
            260                 265                 270
Met Lys Asn Ala Thr Ile Ile Ser Val Ser Val Thr Thr Val Phe Tyr
            275                 280                 285
Met Leu Cys Gly Cys Phe Gly Tyr Ala Ala Phe Gly Asp His Ala Pro
290                 295                 300
Asp Asn Leu Leu Thr Gly Phe Gly Phe Tyr Asp Pro
305                 310                 315

<210> SEQ ID NO 14
<211> LENGTH: 346
<212> TYPE: PRT
<213> ORGANISM: artificial
<220> FEATURE:
<223> OTHER INFORMATION: Solanum lycopersicum mutant AAP5B protein

<400> SEQUENCE: 14

Met Gly Asp Ser Thr Asn Phe Ala Ala Lys His Pro Val Ser Ile Asn
 1               5                  10                  15
Ile Thr Glu Ser Lys Leu Phe Asp Asp Gly Arg Ile Lys Arg Ser
                 20                  25                  30
Gly Ser Val Trp Thr Ala Ser His Ile Ile Thr Ala Val Ile Gly
            35                  40                  45
Ser Gly Val Leu Ser Leu Ala Trp Ala Val Ala Gln Leu Gly Trp Ile
            50                  55                  60
Ala Gly Pro Ile Val Met Leu Leu Phe Ser Phe Val Thr Tyr Tyr Thr
 65                  70                  75                  80
Ser Ser Leu Leu Ser Asp Cys Tyr Arg Ser Gly Asp Pro Leu Phe Gly

```
                    85                  90                  95
Lys Arg Asn Tyr Thr Tyr Met Asp Val Val Gln Ala Asn Leu Ser Gly
                100                 105                 110

Leu Gln Val Lys Ile Cys Gly Trp Ile Gln Tyr Val Asn Leu Phe Gly
            115                 120                 125

Val Ala Ile Gly Tyr Thr Ile Ala Ser Ser Ile Ser Leu Met Ala Val
        130                 135                 140

Lys Arg Ser Asp Cys Phe His Lys His Gly His Lys Ala Pro Cys Leu
145                 150                 155                 160

Gln Pro Asn Thr Pro Tyr Met Ile Ile Phe Gly Val Ile Glu Ile Ile
                165                 170                 175

Phe Ser Gln Ile Pro Asp Phe Asp Gln Ile Trp Trp Leu Ser Ile Val
            180                 185                 190

Ala Ala Val Met Ser Phe Thr Tyr Ser Thr Ile Gly Leu Gly Leu Gly
        195                 200                 205

Ile Ala His Val Ala Glu Thr Gly Lys Ile Gly Gly Ser Leu Thr Gly
    210                 215                 220

Val Ser Ile Gly Thr Val Thr Glu Met Gln Lys Val Trp Arg Thr Phe
225                 230                 235                 240

Gln Ala Leu Gly Ala Ile Ala Phe Ala Tyr Ser Tyr Ser Leu Ile Leu
                245                 250                 255

Ile Glu Ile Gln Asp Thr Ile Lys Ser Pro Pro Ser Glu Ala Lys Thr
            260                 265                 270

Met Lys Asn Ala Thr Ile Ile Ser Val Ser Val Thr Thr Val Phe Tyr
        275                 280                 285

Met Leu Cys Gly Cys Phe Gly Tyr Ala Ala Phe Gly Asp His Ala Pro
    290                 295                 300

Asp Asn Leu Leu Thr Gly Phe Gly Phe Tyr Asp Pro Phe Leu Ala Thr
305                 310                 315                 320

Arg Tyr Ser Gln His Ser His Leu Arg Ser Ser Cys Arg Cys Ile Pro
                325                 330                 335

Gly Leu Leu Pro Thr Pro Phe Cys Phe His
            340                 345

<210> SEQ ID NO 15
<211> LENGTH: 97
<212> TYPE: PRT
<213> ORGANISM: artificial
<220> FEATURE:
<223> OTHER INFORMATION: Solanunum lycopersicum mutant AAP5A protein

<400> SEQUENCE: 15

Met Ala Asp Lys Pro His Gln Val Phe Glu Val Tyr Gly Glu Ser Lys
1               5                   10                  15

Cys Phe Asp Asp Asp Gly Arg Ile Lys Arg Thr Gly Ser Val Trp Thr
            20                  25                  30

Ala Ser Ala His Ile Ile Thr Ala Val Ile Gly Ser Gly Val Leu Ser
        35                  40                  45

Leu Ala Trp Ala Thr Ala Gln Leu Gly Trp Val Ala Gly Pro Thr Val
    50                  55                  60

Leu Leu Leu Phe Ser Phe Val Thr Tyr Tyr Thr Thr Gly Pro Val Ile
65                  70                  75                  80

Gln Leu Pro Glu Lys Glu Ile Ile Leu Ile Trp Met Leu Phe Glu Pro
                85                  90                  95

Ile
```

<210> SEQ ID NO 16
<211> LENGTH: 86
<212> TYPE: PRT
<213> ORGANISM: artificial
<220> FEATURE:
<223> OTHER INFORMATION: Solanum lycopersicum mutant AAP5A protein

<400> SEQUENCE: 16

Met Ala Asp Lys Pro His Gln Val Phe Glu Val Tyr Gly Glu Ser Lys
1               5                   10                  15

Cys Phe Asp Asp Asp Gly Arg Ile Lys Arg Thr Gly Ser Val Trp Thr
            20                  25                  30

Ala Ser Ala His Ile Ile Thr Ala Val Ile Gly Ser Gly Val Leu Ser
        35                  40                  45

Leu Ala Trp Ala Thr Ala Gln Leu Gly Trp Val Ala Gly Pro Thr Val
    50                  55                  60

Leu Leu Leu Phe Ser Phe Val Thr Tyr Tyr Thr Ser Asp Phe Ala Phe
65                  70                  75                  80

Arg Leu Leu Pro Asp Arg
                85

<210> SEQ ID NO 17
<211> LENGTH: 20
<212> TYPE: DNA
<213> ORGANISM: artificial
<220> FEATURE:
<223> OTHER INFORMATION: primer

<400> SEQUENCE: 17
cgacgatgat ggacacccaa                                        20

<210> SEQ ID NO 18
<211> LENGTH: 20
<212> TYPE: DNA
<213> ORGANISM: artificial
<220> FEATURE:
<223> OTHER INFORMATION: primer

<400> SEQUENCE: 18
tgaccgatga aggcgaacaa                                        20

<210> SEQ ID NO 19
<211> LENGTH: 21
<212> TYPE: DNA
<213> ORGANISM: artificial
<220> FEATURE:
<223> OTHER INFORMATION: primer

<400> SEQUENCE: 19
tctccctctt ctcatctcgc a                                      21

<210> SEQ ID NO 20
<211> LENGTH: 20
<212> TYPE: DNA
<213> ORGANISM: artificial
<220> FEATURE:
<223> OTHER INFORMATION: primer

<400> SEQUENCE: 20
tgaagtgccc caatgaaccc                                        20

<210> SEQ ID NO 21

```
<211> LENGTH: 466
<212> TYPE: PRT
<213> ORGANISM: artificial
<220> FEATURE:
<223> OTHER INFORMATION: Solanum lycopersicum mutant slaap5a protein

<400> SEQUENCE: 21
```

Met Ala Asp Lys Pro His Gln Val Phe Glu Val Tyr Gly Glu Ser Lys
1               5                   10                  15

Cys Phe Asp Asp Gly Arg Ile Lys Arg Thr Gly Ser Val Trp Thr
                20                  25                  30

Ala Ser Ala His Ile Ile Thr Ala Val Ile Gly Ser Gly Val Leu Ser
                35                  40                  45

Leu Ala Trp Ala Thr Ala Gln Leu Gly Trp Val Ala Gly Pro Thr Val
            50                  55                  60

Leu Leu Leu Phe Ser Phe Val Thr Tyr Tyr Ser Asp Cys Tyr Arg Thr
65                  70                  75                  80

Gly Asp Pro Val Thr Gly Lys Arg Asn Tyr Thr Tyr Met Asp Ala Val
                    85                  90                  95

Arg Ala Asn Leu Gly Gly Phe Gln Val Lys Ile Cys Gly Val Ile Gln
                100                 105                 110

Tyr Ala Asn Leu Phe Gly Val Ala Ile Gly Tyr Thr Ile Ala Ser Ser
                115                 120                 125

Ile Ser Met Val Ala Val Asn Arg Ser Asn Cys Phe His Lys Gln Gly
130                 135                 140

His His Ala Ala Cys Asn Val Ser Ser Thr Pro Tyr Met Ile Met Phe
145                 150                 155                 160

Gly Val Met Glu Ile Ile Phe Ser Gln Ile Pro Asp Phe Asp Gln Ile
                165                 170                 175

Ser Trp Leu Ser Ile Val Ala Ala Val Met Ser Phe Thr Tyr Ser Thr
                180                 185                 190

Ile Gly Leu Gly Leu Gly Val Ala Gln Val Ala Glu Thr Gly Lys Ile
                195                 200                 205

Glu Gly Ser Leu Thr Gly Ile Ser Ile Gly Thr Glu Val Thr Glu Met
210                 215                 220

Gln Lys Ile Trp Arg Ser Phe Gln Ala Leu Gly Ala Ile Ala Phe Ala
225                 230                 235                 240

Tyr Ser Tyr Ser Leu Ile Leu Ile Glu Ile Gln Asp Thr Leu Lys Ser
                245                 250                 255

Pro Pro Ala Glu Ala Lys Thr Met Lys Arg Ala Thr Leu Ile Ser Val
                260                 265                 270

Ala Val Thr Thr Val Phe Tyr Met Leu Cys Gly Cys Phe Gly Tyr Ala
            275                 280                 285

Ala Phe Gly Asp Gln Ser Pro Gly Asn Leu Leu Thr Gly Phe Gly Phe
            290                 295                 300

Tyr Asn Pro Tyr Trp Leu Leu Asp Ile Ala Asn Ile Ala Ile Val Val
305                 310                 315                 320

His Leu Val Gly Ala Tyr Gln Val Tyr Cys Gln Pro Leu Phe Ala Phe
                325                 330                 335

Val Glu Lys Thr Ala Ala Glu Trp Tyr Pro Asp Ser Lys Ile Ile Thr
                340                 345                 350

Lys Glu Ile Asp Val Pro Ile Pro Gly Phe Lys Pro Phe Lys Leu Asn
                355                 360                 365

Leu Phe Arg Leu Val Trp Arg Thr Ile Phe Val Ile Ile Thr Thr Val
                370                 375                 380

-continued

```
Ile Ser Met Leu Met Pro Phe Phe Asn Asp Val Val Gly Ile Leu Gly
385             390             395             400

Ala Phe Gly Phe Trp Pro Leu Thr Val Tyr Phe Pro Val Glu Met Tyr
                405             410             415

Ile Val Gln Lys Arg Ile Thr Lys Trp Ser Ala Arg Trp Ile Cys Leu
        420             425             430

Gln Ile Leu Ser Gly Ala Cys Leu Val Ile Ser Ile Ala Ala Ala Ala
        435             440             445

Gly Ser Phe Ala Gly Val Val Ser Asp Leu Lys Val Tyr Arg Pro Phe
        450             455             460

Gln Ser
465
```